(12) United States Patent
Tzannes et al.

(10) Patent No.: US 9,042,245 B2
(45) Date of Patent: May 26, 2015

(54) NETWORK MEASUREMENTS AND DIAGNOSTICS

(75) Inventors: Marcos C. Tzannes, Orinda, CA (US); Michael A. Tzannes, Lexington, MA (US)

(73) Assignee: BROADCOM CORPORATION, Irvine, CA (US)

( * ) Notice: Subject to any disclaimer, the term of this patent is extended or adjusted under 35 U.S.C. 154(b) by 569 days.

(21) Appl. No.: 13/146,445

(22) PCT Filed: Feb. 8, 2010

(86) PCT No.: PCT/US2010/023464
§ 371 (c)(1),
(2), (4) Date: Aug. 30, 2011

(87) PCT Pub. No.: WO2010/091340
PCT Pub. Date: Aug. 12, 2010

(65) Prior Publication Data
US 2012/0026908 A1 Feb. 2, 2012

Related U.S. Application Data

(60) Provisional application No. 61/150,636, filed on Feb. 6, 2009, provisional application No. 61/150,595, filed on Feb. 6, 2009, provisional application No. 61/150,612, filed on Feb. 6, 2009, provisional (Continued)

(51) Int. Cl.
*H04L 12/24* (2006.01)
*H04L 12/26* (2006.01)

(52) U.S. Cl.
CPC ............... *H04L 41/12* (2013.01); *H04L 41/22* (2013.01); *H04L 43/0829* (2013.01); *H04L 43/0894* (2013.01); *H04L 43/10* (2013.01); *Y04S 40/168* (2013.01); *Y04S 40/164* (2013.01)

(58) Field of Classification Search
CPC ......................................................... H04L 12/26
USPC .................................................. 370/252, 253
See application file for complete search history.

(56) References Cited

U.S. PATENT DOCUMENTS 6,687,232 B1  2/2004 Farnsworth
2004/0218530 A1 11/2004 Magal et al.

(Continued)

FOREIGN PATENT DOCUMENTS

WO    WO 2007/107895    9/2007

OTHER PUBLICATIONS

Draft ITU Recommendation G.hn—version 2.5, Study Group 15, TD 95R1 (WP 1/15), International Telecommunication Union, Dec. 2008, 166 pages.*

(Continued)

*Primary Examiner* — Jae Y Lee
(74) *Attorney, Agent, or Firm* — Oblon, McClelland, Maier & Neustadt, L.L.P.

(57) ABSTRACT

A network diagnostics equipped device(s), such as a Domain Master, node, test and measurement system, transceiver, or the like, is configured to be capable of performing one or more of data rate measurements in a network, Signal-to-Noise Ratio per subcarrier (SNRps) measurements in a network, Bit Allocation Value per subcarrier (BATVps) measurements in a network, Channel Attenuation per subcarrier (CATps) measurements in a network, Quiet Line Noise per subcarrier (QLNps) measurements in a network and Nonlinear Noise per subcarrier (NLNps) measurements in a network. The above information can be further used to address network performance issues as well as to map and assist with identification of one or more problems within the network.

19 Claims, 14 Drawing Sheets

Related U.S. Application Data application No. 61/150,646, filed on Feb. 6, 2009, provisional application No. 61/150,642, filed on Feb. 6, 2009, provisional application No. 61/150,604, filed on Feb. 6, 2009.

(56) References Cited

U.S. PATENT DOCUMENTS

| | | | | |
|---|---|---|---|---|
| 2005/0169189 | A1 | 8/2005 | Fuehrer et al. | |
| 2006/0013129 | A1* | 1/2006 | Sterenson et al. | 370/229 |
| 2007/0091807 | A1 | 4/2007 | Yoshikawa | |
| 2008/0013473 | A1* | 1/2008 | Proctor et al. | 370/315 |
| 2008/0025223 | A1 | 1/2008 | Karacali-Akyamac et al. | |
| 2008/0037570 | A1* | 2/2008 | Kim et al. | 370/406 |
| 2008/0239980 | A1 | 10/2008 | Niculescu | |
| 2008/0267073 | A1 | 10/2008 | Thaler | |

OTHER PUBLICATIONS

ITU-T Recommendation G.9960, "Unified high-speed wire-line based home networking transceivers—Foundation," International Telecommunication Union, Oct. 2009, 112 pages.

ITU-T Recommendation G.997.1, "Physical layer management for digital subscriber line (DSL) transceivers," International Telecommunication Union, Apr. 2009, 128 pages.

UNSOY, Performance Monitoring and Evaluation of DataPac Network, National Telecommunications Conference, New Orleans, LA, Nov. 29-Dec. 3, 1981, pp. F6.5.01-F6.5.05.

International Search Report and Written Opinion for International (PCT) Patent Application No. PCT/US2010/023464, mailed Aug. 27, 2010.

International Preliminary Report on Patentability for International (PCT) Patent Application No. PCT/US2010/23464, mailed Aug. 18, 2011.

International Search Report and Written Opinion for International (PCT) Patent Application No. PCT/US2010/023465, mailed Aug. 27, 2010.

International Preliminary Report on Patentability for International (PCT) Patent Application No. PCT/US2010/023465, mailed Aug. 18, 2011.

Invitation to Pay Additional Fees and, where Applicable, Protest Fee for International (PCT) Application No. PCT/US2010/023464, mailed Jun. 21, 2010.

Fees and, where Applicable, Protest Fee for International (PCT) Application No. PCT/US2010/023465, mailed Jun. 22, 2010.

Communication Pursuant to Rules 161(1) and 162 EPC for European Patent Application No. 10704285.5, mailed Oct. 11, 2011.

* cited by examiner

NETWORK MEASUREMENTS AND DIAGNOSTICS

RELATED APPLICATION DATA

This application is a national stage application under 35 U.S.C. 371 of PCT Application No. PCT/US2010/023464, having an international filing date of Feb. 8, 2010, which designated the United States, which PCT application claims the benefit of and priority under 35 U.S.C. §119(e) to U.S. Patent Application No. 61/150,595, filed Feb. 6, 2009, entitled "Data Rate Measurements For Home Networks," U.S. Patent Application No. 61/150,604, filed Feb. 6, 2009, entitled "Signal To Noise Ratio Measurements For Home Networks," U.S. Patent Application No. 61/150,636, filed Feb. 6, 2009, entitled "Bit Allocation Table Measurements For Home Networks," U.S. Patent Application No. 61/150,642, filed Feb. 6, 2009, entitled "Channel Attenuation Measurements For Home Networks," U.S. Patent Application No. 61/150,612, filed Feb. 6, 2009, entitled "Quiet Line Noise Measurements For Home Networks," and U.S. Patent Application No. 61/150,646, filed Feb. 6, 2009, entitled "Non-Linear Noise Measurements For Home Networks," all of which are incorporated herein by reference in their entirety.

FIELD OF THE INVENTION

An exemplary aspect of this invention relates to network diagnostics. More specifically, an exemplary embodiment of this invention relates to diagnostics in a home network or in an access network, such as a powerline access network used for smart grid/home grid applications.

SUMMARY

A first exemplary aspect of this invention relates to a device, such as a Domain Master, node, test and measurement system, transceiver or node, or the like, for performing one or more of data rate measurements in a home network and/or access network, Signal-to-Noise Ratio per subcarrier (SNRps) measurements in a home network and/or access network, Bit Allocation Value per subcarrier (BATVps) measurements in a home network and/or access network, Channel Attenuation per subcarrier (CATps) measurements in a home network and/or access network, Quiet Line Noise per subcarrier (QLNps) measurements in a home network and/or access network, Non-Linear Noise (NLN) per subcarrier (NLNps) measurements in a home network and/or access network and measuring and/or detecting neighboring network interference in a home network and/or access network.

In a first exemplary embodiment, the system utilizes the measured data rate information to detect and diagnose problems in a network and to optimize or improve the performance of a network. For example, if a network is experiencing high packet loss or limited coverage, the data rate information can be used to detect, identify and correct the problem(s). Additionally, data rate information can be used by a Domain Master (or any device that manages or configures the network) to optimize or improve network performance. For example, the data rate measurements can be used by a device that manages or configures the network to determine how to allocate time slots using Time Division Multiple Access (TMDA) and frequency bands using Frequency Division Multiple Access (FDMA) or a combination of FDMA and TDMA. For example if TDMA is used, time slots can be allocated for transmission and/or reception to nodes in the network based on the data rate measurements. For example if FMDA is used, frequency can be allocated for transmission and/or reception to nodes in the network based on the data rate measurements. For example, the data rate parameters can be used by the Domain Master to determine the placement and duration of TXOPs (Transmission Opportunities) in a MAC cycle and determine a Media Access Plan (MAP) as defined in the draft ITU recommendation G.hn (or G.9960), which is incorporated herein by reference in its entirety. For reference, and in particular, a number of the terms and acronyms used herein can be found in the G.9960 specification.

As discussed, the system also allows for making SNRps measurements in a home or access network. The SNR per subcarrier parameter can be an array of values that represents the ratio (e.g. in dB) of the received signal power and the received noise power for each subcarrier. Also described are methods for utilizing the measured SNRps information to detect and diagnose problems in a network and to optimize or improve the performance of a network. For example, if a network is experiencing high packet loss or limited coverage, the SNRps information can be used to detect, identify and correct the problem(s). Additionally, SNRps information can be used by a Domain Master (or any device that manages or configures the network) to optimize or improve the network performance. For example, the SNRps measurements can be used by a device that manages or configures the network to determine how to allocate time slots using Time Division Multiple Access (TMDA) and frequency bands using Frequency Division Multiple Access (FDMA) or a combination of FDMA and TDMA. For example if TDMA is used, time slots can be allocated for transmission and/or reception to nodes in the network based on the SNRps measurements. For example if FMDA is used, frequency can be allocated for transmission and/or reception to nodes in the network based on the SNRps measurements. For example, the SNRps measurements can be used by the Domain Master to determine the placement and duration of TXOPs in a MAC cycle and determine the Media Access Plan (MAP) as defined in the draft ITU recommendation G.hn (or G.9960).

The system also allows for making bit allocation value per subcarrier measurements in a home network or access network. The bit allocation table value per subcarrier parameter can be an array of integer values that represents a number of bits (e.g. maximum or minimum) that can be loaded onto each subcarrier. Associated with the measurement of this information is the ability to use BATVps to detect and diagnose problems in a network and to optimize or improve the performance of a network. For example, if a network is experiencing high packet loss or limited coverage, the BATVps information can be used to detect, identify and correct the problem(s). Additionally, BATVps information can be used by a Domain Master (or any device that manages or configures the network) to optimize network performance. For example, the BATVps measurements can be used by a device that manages or configures the network to determine how to allocate time slots using Time Division Multiple Access (TMDA) and frequency bands using Frequency Division Multiple Access (FDMA) or a combination of FDMA and TDMA. For example if TDMA is used, time slots can be allocated for transmission and/or reception to nodes in the network based on the BATVps measurements. For example if FMDA is used, frequency can be allocated for transmission and/or reception to nodes in the network based on the BATVps measurements. For example, the BATVps parameters can be used by the Domain Master to determine the placement and duration of TXOPs in a MAC cycle and determine the Media Access Plan as defined in the ITU recommendation G.hn (or G.9960).

The channel attenuation per subcarrier measurements can also be utilized in a similar manner. More specifically, the channel attenuation per subcarrier parameter can be an array of values that represents the attenuation (e.g. in dB) caused by the channel for signals transmitted on a subcarrier. The systems can also measure the CATps information to detect and diagnose problems in a network and to optimize or improve the performance of a network. For example, if a network is experiencing high packet loss or limited coverage, the CATps information can be used to detect, identify and correct the problem(s). Additionally, CATps information can be used by a Domain Master (or any device that manages or configures the network) to optimize network performance. For example, the CATps measurements can be used by a device that manages or configures the network to determine how to allocate time slots using Time Division Multiple Access (TMDA) and frequency bands using Frequency Division Multiple Access (FDMA) or a combination of FDMA and TDMA. For example if TDMA is used, time slots can be allocated for transmission and/or reception to nodes in the network based on the CATps measurements. For example if FMDA is used, frequency can be allocated for transmission and/or reception to nodes in the network based on the CATps measurements. For example, the CATps parameters can be used by the Domain Master to determine the placement and duration of TXOPs in a MAC cycle and determine a Media Access Plan as defined in a draft ITU recommendation G.hn (or G.9960).

While the above described exemplary systems include capabilities for making data rate measurements, SNRps measurements, BATVps measurements, and CATps measurements, QLNps measurements and NLNps measurements it should be fully appreciated that the systems can be subdivided into respective parts that allows for, for example, the system to be directed to one or more of the above described measurement techniques. For example, the system may only be directed to one of the above-described measurement techniques. In an alternative embodiment, the system may be directed to two or more of the above-described measurement techniques, and the corresponding modules associated therewith.

Another exemplary aspect of this invention relates to a device, such as a Domain Master, node, test and measurement system, transceiver or node, or the like, for performing Quiet Line Noise per subcarrier (QLNps) measurements in a home network and/or access network.

In an exemplary embodiment, the system quiet line noise information to detect and diagnose problems in a network and to optimize or improve the performance of a network. The Quiet Line Noise per subcarrier parameter can be an array of values that represents the RMS level of the noise (in dBm/Hz) for each subcarrier when all nodes in a network are not transmitting, i.e., are quiet. The measured QLNps information can also be used to detect and diagnose problems in a network and to optimize the performance of a network. For example, if a network is experiencing high packet loss or limited coverage, the QLNps information can be used to detect, identify and correct the problem(s). Additionally, QLNps information can be used by a Domain Master (or any device that manages or configures the network) to optimize, modify or improve network performance. For example, the QLNps measurements can be used by a device that manages or configures the network to determine how to allocate time slots using Time Division Multiple Access (TMDA) and frequency bands using Frequency Division Multiple Access (FDMA) or a combination of FDMA and TDMA. For example if TDMA is used, time slots can be allocated for transmission and/or reception to nodes in the network based on the QLNps measurements. For example if FMDA is used, frequency can be allocated for transmission and/or reception to nodes in the network based on the QLNps measurements. For example, the QLNps parameters can be used by the Domain Master to determine the placement and duration of TXOPs (Transmission Opportunities) in a MAC cycle and determine a Media Access Plan (MAP) as defined in the draft ITU recommendation G.hn (or G.9960), filed herewith, and which is incorporated herein by reference in its entirety. For reference, a number of the terms and acronyms used herein can be found in the G.9960 specification.

While the above described exemplary system and techniques include capabilities for making QLNps measurements, it should be fully appreciated that the system can be subdivided into respective parts.

A first exemplary aspect of this invention relates to a device, such as a Domain Master, node, test and measurement system, transceiver or node, or the like, for performing Non-Linear Noise (NLN) per subcarrier (NLNps) measurements in a home network and/or access network.

In an exemplary embodiment, the system utilizes the measured NLNps information to detect and diagnose problems in a network and to optimize or improve the performance of a network. For example, if a network is experiencing high packet loss or limited coverage, the NLNps information can be used to detect, identify and correct the problem(s). Additionally, NLNps information can be used by a Domain Master (or any device that manages or configures the network) to optimize or improve network performance. For example, the NLN measurements can be used by a device that manages or configures the network to determine how to allocate time slots using Time Division Multiple Access (TMDA) and frequency bands using Frequency Division Multiple Access (FDMA) or a combination of FDMA and TDMA. For example if TDMA is used, time slots can be allocated for transmission and/or reception to nodes in the network based on the NLNps measurements. For example if FMDA is used, frequency can be allocated for transmission and/or reception to nodes in the network based on the NLNps measurements. For example, the NLNps parameters can be used by the Domain Master to determine the placement and duration of TXOPs (Transmission Opportunities) in a MAC cycle and determine a Media Access Plan (MAP) as defined in the draft ITU recommendation G.hn (or G.9960), filed herewith, and which is incorporated herein by reference in its entirety. For reference, a number of the terms and acronyms used herein can be found in the G.9960 specification.

In another exemplary embodiment, dual ended measurements (where a transmitting transceiver transmits signals to a different receiving transceiver) or single ended measurements (where a transceiver simultaneously sends and receives signals to perform measurements of the channel) are done to measure crosstalk (or interference) between different media types in network, such as G.hn network, that comprises more than one media type. For example, if a network uses power lines and coaxial cable, or power line and telephone wire (or any combination of power lines, coaxial cable, telephone wires, optical fiber and plastic optical fiber) a test may be performed that measures the impact (or crosstalk) of signals from one medium onto the other medium.

While the above described exemplary systems include capabilities for making measurements it should be fully appreciated that the systems can be subdivided into respective parts.

An exemplary aspect of the invention is thus directed toward network diagnostics.

An additional aspect of the invention is directed toward home and/or access network diagnostics.

Still further aspects of the invention are related to data rate measurements for home and/or access networks.

Even further aspects of the invention are related to SNRps measurements for home and/or access networks.

Even further aspects of the invention are related to BATVps measurements for home and/or access networks.

Additional aspects of the invention are related to CATps measurements for home and/or access networks.

Aspects of the invention are also directed toward a method of measuring data rate in a network that divides transmission time into a plurality of time slots (or time periods or time interval) including transmitting or receiving a message indicating one or more time slots to be used for data rate measurement, transmitting or receiving a signal to be used for data rate measurement during the one or more time slots and measuring one or more data rates during the one or more time slots using the signal. In certain cases, the signal is a predefined signal that is known in advance by the transmitter and/or the receiver.

An additional aspect of the invention is related to a data rate measurement parameter that is represented as a plurality of data rate values in a network that divides transmission time into a plurality of time slots, where each data rate value represents the data rate that is achievable in one of the plurality of time slots.

Even further aspects of the invention are related to a method of determining a media access plan, in a network that divides transmission time into a plurality of TXOPs (or time slots or time intervals), including using a plurality of data rate values to allocate TXOPs to ports in the network, wherein each data rate value represents the data rate that is achievable by a port in the network in one of the plurality of TXOPs.

Additional aspects relate to a method of determining a media access plan, in a network that divides transmission time into a plurality of TXOPs, including using a plurality of data rate values to allocate TXOPs to ports in the network, wherein each data rate value represents the data rate that is achievable by a port in the network in one of the plurality of TXOPs for receiving data from one of the plurality of transmitting nodes or for transmitting data from one of the plurality of nodes.

An additional aspect is a diagnostic mode, in a network that divides transmission time into a plurality of time slots, including transmitting or receiving a message indicating entry into a diagnostic mode, transmitting or receiving in a signal to be used for data rate measurement during the plurality of time slots, measuring a plurality of data rates during the plurality of time slots using the signal and transmitting or receiving a message comprising the plurality of data rates. In certain cases, the signal is a predefined signal that is known in advance by the transmitter and/or the receiver.

Even further aspects relate to a method of identifying the location and/or type of an interferer in a network including analyzing at least a first data rate value, analyzing at least a second data rate value, wherein the first data rate value is measured by a first node in a network and the second data rate value is measured by a second node in the network.

Even further aspects of the above aspects relate to a predefined signal being determined by a receiver or transmitter, and wherein a receiver or a transmitter determines at least one of the following parameters for the predefined signal: PRBS reinitialization, cyclic prefix length, window length, active carriers, and signal/subcarrier power level. In some cases, the parameters to be used for the predefined signal are transmitted from the transmitting node to the receiving node or from the receiving node to the transmitting node.

Even further aspects of the invention relate to utilizing a message that is transmitted or received, the message instructing a receiver to measure data rate during at least one time slot or TXOP.

Aspects of the invention also relate to a method of measuring SNRps in a network that divides transmission time into a plurality of time slots including transmitting or receiving a message indicating one or more time slots to be used for SNRps measurement, transmitting or receiving a signal to be used for SNRps measurement during the one or more time slots and measuring one or more SNRps during the one or more time slots using the signal. In certain cases, the signal is a predefined signal that is known in advance by the transmitter and/or the receiver.

Even further aspects of the invention relate to a SNRps measurement parameter that is represented as a plurality of SNRps arrays, in a network that divides transmission and time into a plurality of time slots, wherein each SNRps array represents the SNRps measured in one of the plurality of time slots.

Even further aspects relate to a method of determining a media access plan, in a network that divides transmission time into a plurality of TXOPs, including using a plurality of SNRps arrays to allocate TXOP ports in a network, wherein each SNRps array represents the SNRps measured by a port in the network in one of the plurality of TXOPs.

Even further aspects relate to a method of determining a media access plan, in a network that divides transmission time into a plurality of TXOPs, including using a plurality of SNRps arrays to allocate TXOPs to ports in the network, wherein each SNRps array represents the SNRps measured by a port in the network in one of the plurality of TXOPs for receiving data from one of a plurality of transmitting nodes or for transmitting data from one of the plurality of nodes.

In another exemplary aspect, a diagnostic mode, in a network that divides transmission time into a plurality time slots, includes transmitting or receiving a message indicating entry into a diagnostic mode, transmitting or receiving a predefined signal to be used for SNRps measurements during the plurality of time slots, measuring a plurality SNRps during the plurality of time slots using a signal and transmitting or receiving a message comprising a plurality of SNRps. In certain cases, the signal is a predefined signal that is known in advance by the transmitter and/or the receiver.

Additional aspects relate to a method of identifying the location and/or type of an interferer in a network including analyzing at least a first SNRps array, and analyzing at least a second SNRps array, wherein the first SNRps array is measured by a first node in the network and the second SNRps array is measured by a second node in the network.

The above aspects can also feature a receiver or transmitter determining the predefined signal, and wherein the receiver or the transmitter determines at least one of the following parameters for the predefined signal: PRBS reinitialization, cyclic prefix length, window length, active carriers, and signal/subcarrier power level. In some cases, the parameters to be used for predefined signal are transmitted from the transmitting node to the receiving node or from the receiving node to the transmitting node.

Even further aspects relate to a message being transmitted or received, the message instructing a receiver to measure SNRps during at least one time slot or TXOP.

Additional aspects of the invention relate to a method of measuring BATVps in a network that divides transmission time into a plurality of time slots including transmitting or receiving a message indicating one or more time slots to be used for BATVps measurement, transmitting or receiving a predefined signal to be used for BATVps measurement during the one or more time slots and measuring one or more BATVps during the one or more time slots using the signal. In certain cases, the signal is a predefined signal that is known in advance by the transmitter and/or the receiver.

Even further aspects relate to a BATVps measurement parameter, in a network that divides transmission time into a plurality of time slots, the parameter being represented as a plurality of BATVps arrays, wherein each BATVps array represents the BATVps measured in one of the plurality of time slots.

Additional aspects relate to a method of determining a media access plan, in a network that divides transmission time into a plurality of TXOPs, including using a plurality of BATVps arrays to allocate TXOPs to ports in the network, wherein each BATVps array represents the BATVps measured by a port in the network in one of the plurality of TXOPs.

An additional aspect is directed toward a method of determining a media access plan (MAP), in a network that divides transmission time into a plurality TXOPs, including using a plurality of BATVps arrays to allocate TXOPs to ports in the network, wherein each BATVps array represents the BATVps measured by a port in the network in one of the plurality of TXOPs for receiving data from one of the plurality of transmitting nodes or for transmitting data from one of the plurality of nodes.

Additional aspects relate to a diagnostic mode, in a network that divides transmission time into a plurality of time slots, including transmitting or receiving a message indicating entry into a diagnostic mode, transmitting or receiving a signal to be used for BATVps measurement during the plurality of time slots, measuring a plurality of BATVps during the plurality of time slots using the predefined signal and transmitting or receiving a message comprising of plurality of BATVps. In certain cases, the signal is a predefined signal that is known in advance by the transmitter and/or the receiver.

Additional aspects relate to a method for identifying the location and/or type of an interferer in a network including analyzing a at least a first BATVps array and analyzing a at least a second BATVps array, wherein the first BATVps array is measured by a first node of the network and the second BATVps array is measured by a second node in the network.

Even further aspects relate to a message being transmitted or received, the message instructing a receiver to measure the BATVps during at least one time slot or TXOP.

Additional aspects of the invention relate to a method of measuring CATps in a network that divides transmission time into a plurality of time slots including transmitting or receiving a message indicating one or more time slots to be used for a CATps measurement, transmitting or receiving a signal to be used for CATps measurement during the one or more time slots and measuring one or more CATps during the one or more TXOPs using the signal. In certain cases, the signal is a predefined signal that is known in advance by the transmitter and/or the receiver.

Even further aspects of the invention relate to a CATps measurement parameter, in a network that divides transmission time into a plurality of time slots, the parameter being represented as a plurality of CATps arrays, wherein each CATps array represents the CATps measure in one of the plurality of time slots.

Additional aspects relate to a method of determining a media access plan, in a network that divides transmission time into a plurality of TXOPs, including using a plurality of CATps arrays to allocate TXOPs to ports in the network, wherein each CATps array represents the CATps measured by a port in the network in one of the plurality of TXOPs.

Additional aspects relate to a method of determining a media access plan, in a network that divides transmission time into a plurality TXOPs, including using a plurality of CATps arrays to allocate TXOPs to ports in the network, wherein each CATps array represents the CATps measured by a port in the network in one of the plurality of TXOPs for receiving data from one of a plurality of transmitting nodes or for transmitting data from one of the plurality of nodes.

Even further aspects relate to a diagnostic mode, in a network that divides transmission time into a plurality of time slots, including transmitting or receiving a message indicating entry into a diagnostic mode, transmitting or receiving a signal to be used for CATps measurement during the plurality of time slots, measuring a plurality of CATps during the plurality of time slots using the signal and transmitting or receiving a message comprising the plurality of CATps. In certain cases, the signal is a predefined signal that is known in advance by the transmitter and/or the receiver.

Even further aspects relate to a method of identifying the location and/or type of an interferer in a network including analyzing at least a first CATps array and analyzing at least a second CATps array, wherein the first CATps array is measured by a first node in the network and the second CATps array is measured by a second node in the network.

Additional aspects relate to a message being transmitted or received, wherein the message instructs a receiver to measure CATps during at least one time slot or TXOP.

Even further aspects of the invention relate to an interface that allows the selection of one or more diagnostic methods to be run, the diagnostic methods including a data rate measurement, a SNRps measurement, a BATVps measurement, and a CATps measurement.

The above aspects can also feature a receiver or transmitter determining the predefined signal, and wherein the receiver or the transmitter determines at least one of the following parameters for the predefined signal: PRBS reinitialization, cyclic prefix length, window length, active carriers, and signal/subcarrier power level. In some cases, the parameters to be used for predefined signal are transmitted from the transmitting node to the receiving node or from the receiving node to the transmitting node.

Even further aspects of the invention relate to a test and diagnostic system, that can optionally be incorporated into, for example, a Domain Master, a node, a test system or device, a transceiver, a or the like, that allows one or more of data rate measurements, signal-to-noise ratio per subcarrier measurements, bit allocation value per subcarrier measurements, and channel attenuation per subcarrier measurements.

Any of the above aspects and further aspects may be located in a network management system or network operation device that is located inside or outside the network. In particular aspects that are related to analyzing the measured data for improving to detect and diagnose problems in a network and to optimize or improve the performance of a network may be done in such a device. The network operation or management device that is located inside or outside the network may be managed and/or operated by a user, consumer, service provider or power utility provider or a governmental entity.

An exemplary aspect of the invention is thus directed toward network diagnostics.

An additional aspect of the invention is directed toward home and/or access network diagnostics.

Still further aspects of the invention are related to QLNps measurements for home and/or access networks.

Additional aspects relate to a method of measuring QLNps in a network that divides transmission time into a plurality time slots including transmitting or receiving a message indicating one or more time slots to be used for QLNps measurement, transmitting or receiving a message indicating that nodes are instructed to not transmit during the one or more time slots, and measuring one or more QLNps during the one or more time slots.

Even further aspects relate to, in a network that divides transmission time into a plurality of time slots, a QLNps measurement parameter that is represented as plurality of QLNps arrays, where each QLNps array represents the QLNps measured in one of the plurality of time slots.

Additional aspects relate to, in a network that divides transmission time into a plurality of time slots, a method of determining a Media Access Plan (MAP) comprising using a plurality of QLNps arrays to allocate TXOPs to ports in the network, wherein each QLNps array represents the QLNps measured by a port in the network in one of the plurality of TXOPs.

Aspects also relate to, in a network that divides transmission time into a plurality of time slots, a diagnostic mode including transmitting or receiving a message indicating entry into a diagnostic mode, transmitting or receiving a message indicating that nodes are instructed to not transmit during the one or more time slots, measuring a plurality of QLNps during the plurality of time slots, and transmitting or receiving a message comprising the plurality of QLNps.

Additional aspects relate to a method of identifying the type and location of an interferer in a network including analyzing a first QLNps array and analyzing a second QLNps array, wherein the first QLNps arrays is measured by a first node in the network and the second QLNps array is measured by a second node in the network.

Aspects also further relate to the above wherein a message is transmitted or received instructing a receiver to measure QLNps during at least one time slot.

Even further aspects of the invention relate to an interface that allows the selection of a diagnostic method to be run, such as QLNps measurement.

Even further aspects of the invention relate to a test and diagnostic system, that can optionally be incorporated into, for example, a Domain Master, a node, a test system or device, a transceiver, a or the like, that allows QLNps measurements.

Any of the above aspects and further aspects may be located in a network management system or network operation device that is located inside or outside the network. In particular aspects that are related to analyzing the measured data for improving to detect and diagnose problems in a network and to optimize or improve the performance of a network may be done in such a device. The network operation or management device that is located inside or outside the network may be managed and/or operated by a user, consumer, service provider or power utility provider or a governmental entity.

An exemplary aspect of the invention is thus directed toward network diagnostics.

An additional aspect of the invention is directed toward home and/or access network diagnostics.

Still further aspects of the invention are related to non-linear noise measurements for home and/or access networks.

Even further aspects relate to a method of measuring NLNps in a network that divides transmission time into a plurality time slots including transmitting or receiving a message indicating one or more time slots to be used for NLNps measurement, transmitting or receiving a predefined signal to be used for NLNps measurement during the one or more time slots and measuring one or more NLNps during the one or more time slots using the predefined signal.

Additional aspects relate to, in a network that divides transmission time into a plurality of time slots, an NLNps measurement parameter that is represented as plurality of NLNps arrays, where each NLNps array represents the NLNps measured in one of the plurality of time slots.

Aspects also relate to, in a network that divides transmission time into a plurality of TXOPs, a method of determining a Media Access Plan (MAP) including using a plurality of NLNps arrays to allocate TXOPs to ports in the network, wherein each NLNps array represents the NLNps measured by a port in the network in one of the plurality of TXOPs.

Even further aspects relate to, in a network that divides transmission time into a plurality of TXOPs, a method of determining a Media Access Plan (MAP) including using a plurality of NLNps arrays to allocate TXOPs to ports in the network, wherein each NLNps array represents the NLNps measured by a port in the network in one of the plurality of TXOPs for receiving data from one of a plurality of transmitting nodes.

Aspects also relate to, in a network that divides transmission time into a plurality of timeslots, a diagnostic mode method including transmitting or receiving a message indicating entry into a diagnostic mode, transmitting or receiving a predefined signal to be used for NLNps measurement during the plurality of timeslots, measuring a plurality of NLNps during the plurality of timeslots using the predefined signal and transmitting or receiving a message comprising the plurality of NLNps.

Aspects further relate to a method of identifying the location of an interferer in a network including analyzing a first NLNps array and analyzing a second NLNps array, wherein the first NLNps arrays is measured by a first node in the network and the second NLNps array is measured by a second node in the network.

The above aspects are further defined by the predefined signal being determined by a receiver or a transmitter.

The above aspects are further defined by a receiver or a transmitter determining at least one of the following for the predefined signal:
  subcarrier indexes to be transmitted,
  number of subcarriers to be transmitted,
  whether to modulate the subcarriers with a PRBS or send them as pure un-modulated tones,
  PRBS reinitialization
  where a cyclic prefix should be included or not,
  cyclic prefix length,
  window length, and
  signal/subcarrier power level.

The above aspects can further include a message being transmitted or received instructing a receiver to measure NLNps during at least one time slot.

Even further aspects of the invention relate to a test and diagnostic system, that can optionally be incorporated into, for example, a Domain Master, a node, a test system or device, a transceiver, or the like, that allows non-linear noise measurements.

Any of the above aspects and further aspects may be located in a network management system or network operation device that is located inside or outside the network. In particular aspects that are related to analyzing the measured NLN for improving detection and diagnosis of problems in a network and to optimize or improve the performance of a network. The network operation or management device that is located inside or outside the network may be managed and/or operated by a user, consumer, service provider or power utility provider or a governmental entity.

Additional aspects relate to a method of measuring interference from neighboring networks including transmitting or receiving a message indicating one or more time slots to be used for measuring interference from neighboring networks, measuring or determining or detecting the interference from neighboring networks during the one or more time slots wherein the interference is represented as one or more of the following:
   a maximum noise level over a period of time,
   a number of packets being transmitted by the neighbor network, and
   an amount of time that packets from a neighboring network are occupying the medium.

Aspects also relate to a module or device capable of measuring interference from neighboring networks including means for transmitting or receiving a message indicating one or more time slots to be used for measuring interference from neighboring networks, means for measuring or determining or detecting the interference from neighboring networks during the one or more time slots wherein the interference is represented as one or more of the following:
   a maximum noise level over a period of time,
   a number of packets being transmitted by the neighbor network, and
   an amount of time that packets from a neighboring network are occupying the medium.

Further aspects are directed toward a device capable of measuring interference from neighboring networks including a transceiver portion capable of transmitting or receiving a message indicating one or more time slots to be used for measuring interference from neighboring networks, a measurement module capable of measuring or determining or detecting the interference from neighboring networks during the one or more time slots wherein the interference is represented as one or more of the following:
   a maximum noise level over a period of time,
   a number of packets being transmitted by the neighbor network, and
   an amount of time that packets from a neighboring network are occupying the medium.

Additional aspects relate to a method, in a device capable of transmitting and receiving signals on at least two different media types, for measuring crosstalk from one medium to another including transmitting from the device a signal on a first media type, and receiving in the device a signal on a second media type, wherein the received signal on the second media type is the result crosstalk of the signal transmitted on the first media type, and wherein the two media types are any two of the following: coaxial cable, power line, telephone wire, optical fiber and POF.

Additional aspects relate to a device capable of transmitting and receiving signals on at least two different media types including means for transmitting from the device a signal on a first media type and means for receiving in the device a signal on a second media type, wherein the received signal on the second media type is the result crosstalk of the signal transmitted on the first media type and wherein two media types are any two of the following: coaxial cable, power line, telephone wire, optical fiber and POF.

Further aspects relate to a device capable of transmitting and receiving signals on at least two different media types including a transmitter portion capable of transmitting from the device a signal on a first media type, and a receiver portion capable of receiving in the device a signal on a second media type, wherein the received signal on the second media type is the result crosstalk of the signal transmitted on the first media type and wherein two media types are any two of the following: coaxial cable, power line, telephone wire, optical fiber and POF.

Any of the above aspects further including, reducing the power on at least one subcarrier for packets transmitted on the first media type in order to reduce the crosstalk on the second media type.

Any of the above aspects further including forwarding information regarding the signals received on the second media type to a Domain Master or Network Management/Operations device.

Aspects also relate to, in first device capable of transmitting on first media type and a second device capable of receiving signals on a second media type, a method of measuring crosstalk from one medium to another including transmitting from the first device a signal on a first media type and receiving in the second device a signal on a second media type, wherein the received signal on the second media type is the result crosstalk of the signal transmitted on the first media type and wherein two media types are any two of the following: coaxial cable, power line, telephone wire, optical fiber and POF.

Aspects also relate to forwarding information regarding the signals received on the second media type to a Domain Master or Network Management/Operation device.

Further aspects are directed toward a first device capable of transmitting on first media type and a second device capable of receiving signals on a second media type including means for transmitting from the first device a signal on a first media type and means for receiving in the second device a signal on a second media type, wherein the received signal on the second media type is the result crosstalk of the signal transmitted on the first media type and wherein two media types are any two of the following coaxial cable, power line, telephone wire, optical fiber and POF.

Aspects also include means for forwarding information regarding the signals received on the second media type to a Domain Master or Network Management/Operation device.

A further aspects is a first device capable of transmitting on first media type and a second device capable of receiving signals on a second media type including a transmitter portion in the first device capable of transmitting a signal on a first media type and a receiver the second device capable of receiving in the second device a signal on a second media type, wherein the received signal on the second media type is the result crosstalk of the signal transmitted on the first media type and wherein two media types are any two of the following: coaxial cable, power line, telephone wire, optical fiber and POF.

A further aspect is directed toward a message determination module capable of forwarding information regarding the signals received on the second media type to a Domain Master or Network Management/Operation device.

Any of the above aspects further including, reducing the power on at least one subcarrier for packets transmitted on the first media type in order to reduce the crosstalk on the second media type.

Aspects of the invention also relate to:
1. A network diagnostics method comprising:
   selecting one or more of:
      a data rate measurement,
      a signal-to-noise ratio per subcarrier (SNRps) measurement,
      a bit allocation value per subcarrier (BATVps) measurement, and a channel attenuation per subcarrier (CATps) measurement, the selected measurement to be performed on a network that divides transmission time into a plurality of time slots;
transmitting or receiving a message indicating one or more time slots to be used for the selected measurement;
transmitting or receiving a signal to be used for the selected measurement during the one or more time slots; and
performing the selected measurement during the one or more time slots using the signal.

2. The method aspect of aspect 1, wherein the signal is a predefined signal that determined by a transmitter or a receiver.

3. The method of aspect 1, wherein the signal is a predefined signal and wherein a transmitter or receiver determine at least one of the following for the predefined signal:
PRBS reinitialization,
cyclic prefix length,
window length,
active carriers, and
signal or subcarrier power level.

4. The method of aspect 1, further comprising transmitting or receiving a message instructing a receiver to measure one or more of the data rate, SNRps, BATVps and CATps during the one or more time slots.

5. A network diagnostics system comprising:
an interface capable of allowing a selecting one or more of:
a data rate measurement,
a signal-to-noise ratio per subcarrier (SNRps) measurement,
a bit allocation value per subcarrier (BATVps) measurement, and
a channel attenuation per subcarrier (CATps) measurement, the selected measurement to be performed on a network that divides transmission time into a plurality of time slots;
a transceiver capable of transmitting or receiving a message indicating one or more time slots to be used for the selected measurement and transmitting or receiving a signal to be used for the selected measurement during the one or more time slots; and
a measurement module capable of performing the selected measurement during the one or more time slots using the signal.

6. The system of aspect 5, wherein the signal is a predefined signal that determined by a transmitter or a receiver.

7. The system of aspect 5, wherein the signal is a predefined signal and wherein a transmitter or receiver determine at least one of the following for the predefined signal:
PRBS reinitialization,
cyclic prefix length,
window length,
active carriers, and
signal or subcarrier power level.

8. The system of aspect 5, wherein a message is transmitted or received instructing a receiver to measure one or more of the data rate, SNRps, BATVps and CATps during the one or more time slots.

9. A network diagnostics system comprising:
means for selecting one or more of:
a data rate measurement,
a signal-to-noise ratio per subcarrier (SNRps) measurement,
a bit allocation value per subcarrier (BATVps) measurement, and
a channel attenuation per subcarrier (CATps) measurement, the selected measurement to be performed on a network that divides transmission time into a plurality of time slots;
means for transmitting or receiving a message indicating one or more time slots to be used for the selected measurement;
means for transmitting or receiving a signal to be used for the selected measurement during the one or more time slots; and
means for performing the selected measurement during the one or more time slots using the signal.

10. The system of aspect 9, wherein the signal is a predefined signal that determined by a transmitter or a receiver.

11. The system of aspect 9, wherein the signal is a predefined signal and wherein a transmitter or receiver determines at least one of the following for the predefined signal:
PRBS reinitialization,
cyclic prefix length,
window length,
active carriers, and
signal or subcarrier power level.

12. The system of aspect 9, further comprising means for transmitting or receiving a message instructing a receiver to measure one or more of the data rate, SNRps, BATVps and CATps during the one or more time slots.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein.

DETAILED DESCRIPTION

Figure 1:
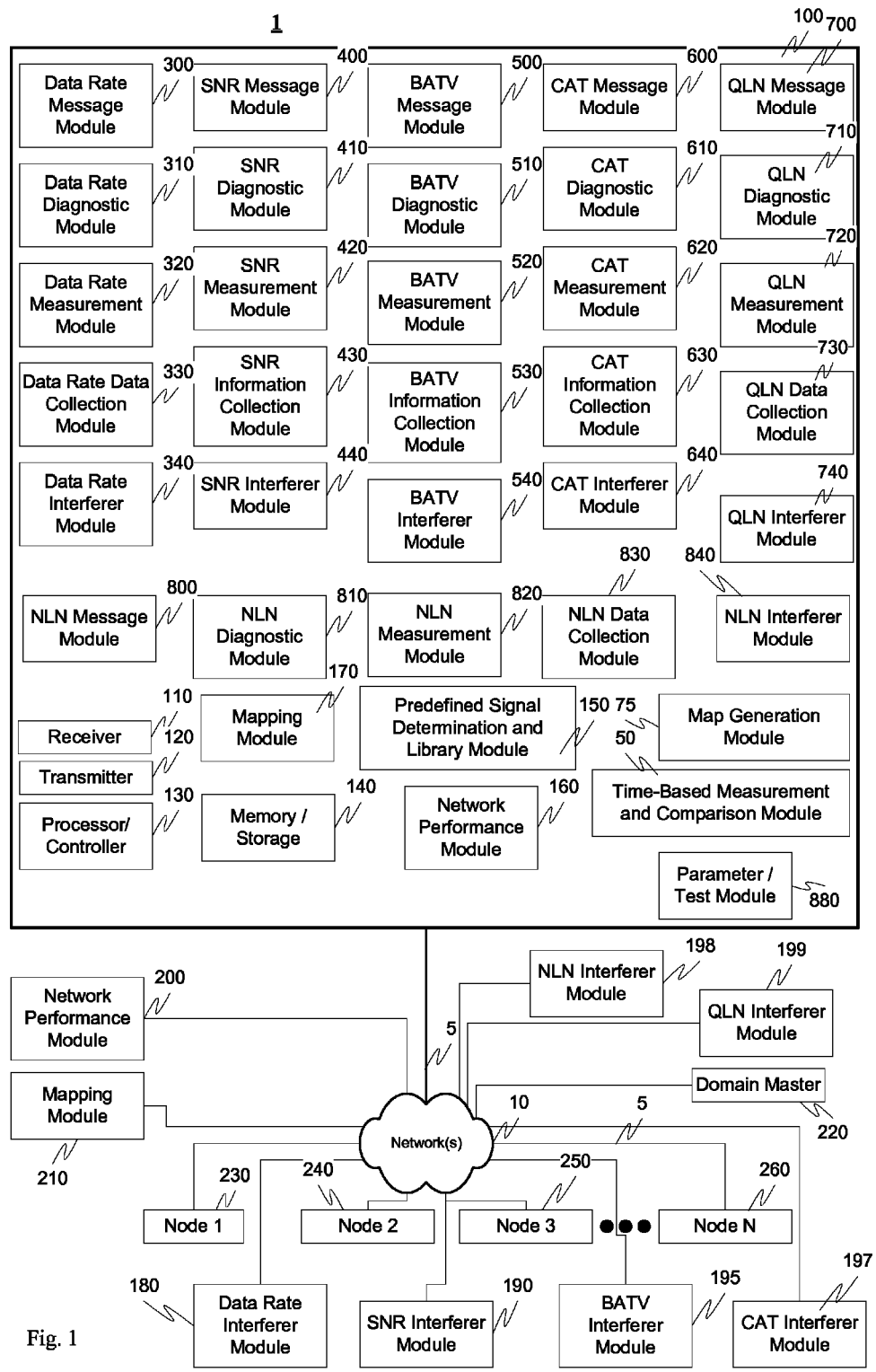
FIG. 1 illustrates an exemplary communications environment according to this invention.

The exemplary embodiments of this invention will be described in relation to communications systems, as well as protocols, techniques and methods to perform measurements in a communications environment, such as a home network or an access network. Examples of such networks include home powerline networks, access powerline networks, home coaxial cable network, access coaxial cable network, home telephone networks and access telephone networks. However, it should be appreciated that in general, the systems, methods, and techniques of this invention will work equally well for other types of communications environments, networks, and/or protocols.

The exemplary systems and methods of this invention will also be described in relation to wired or wireless modems and/or a software and/or a hardware testing module, telecommunications test device, or the like, such as a DSL modem, an ADSL modem, and xDSL modem, a VDSL modem, a line card, a G.hn transceiver, a MOCA transceiver, a Homeplug® transceiver, a power line modem, a wired or wireless modem, test equipment, a multicarrier transceiver, a wireless wide/local area network system, a satellite communications system, a network-based communications systems, such as an IP, Ethernet or ATM system, a modem equipped with diagnostic capabilities, or the like, or a separate program general purpose computer having a communications device that is capable of operating in conjunction with any one or more of the following communications protocols: CDSL, DSL, ADSL2, ADSL2+, VDSL1, VDSL2, HDSL, DSL Lite, IDSL, RADSL, SDSL, UDSL, MOCA, G.hn, Homeplug, or the like. However, to avoid unnecessarily obscuring the present invention, the following description omits well-known structures and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein. Furthermore, while the exemplary embodiments illustrated herein show various components of this system collocated, it is to be appreciated that various components of the system can be located at distant portions of a distributed network, such as a communications network, node, within a Domain Master, and/or the internet, or within a dedicated secured, unsecured, and/or encrypted system and/or within a network operation or management device that is located inside or outside the network.

Within this description the term Domain Master is used to refer to any device, system or module that manages and/or configures the network.

Thus, it should be appreciated that the components of the system can be combined into one or more devices, or split between devices, such as a modem, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, or some combination thereof. Similarly, one or more of the functional portions of the system could be distributed between a modem and an associated computing device/system, and/or in a dedicated test and/or measurement device.

Furthermore, it should be appreciated that the various links, including the communications channels connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol. The terms transceiver and modem are also used interchangeably herein. The terms transmitting modem and transmitting transceiver as well as receiving modem and receiving transceiver are also used interchangeably herein. The term DSL is used in this description for any type of xDSL including ADSL1, ADSL2/2+, VDSL, VDSL2, G.inp, etc.

The term management interface is related to any type of interface between a management entity and/or technician and a transceiver, such as, a CO-MIB or CPE-MIB as described, for example, in ITU standard G.997.1, which is incorporated herein by reference in its entirety.

Moreover, while some of the exemplary embodiments described herein are directed toward a transmitter portion of a transceiver performing certain functions, this disclosure is intended to include corresponding receiver-side functionality in both the same transceiver and/or another transceiver, and vice versa.

FIG. 1 illustrates an exemplary communications environment 1. The communication environment 1 may be a home or office environment where nodes are devices such as computers, appliances, lighting fixtures or any device connected to power lines, coaxial cable, telephone wires, network wires, and/or optical fiber and plastic optical fiber (POF). The home network may be connected via power lines, coaxial cable, optical fiber and plastic optical fiber (POF), or telephones lines or any combination of these transmission media types. The communication environment 1 may be an access environment where nodes are devices located in structures (such residences, homes, apartments, offices, etc) or any devices connected to power lines, coaxial cable, telephone wires and/or optical fiber and plastic optical fiber (POF). The access network may be connected via power lines, coaxial cable, telephones lines and/or optical fiber and plastic optical fiber (POF) or any combination of these transmission media types. The communications environment includes node 100, which is connected via link 5 and one or more networks 10, to a network performance module 200, mapping module 210, data rate interferer module 180, SNR interferer module 190, BATV interferer module 195, QLN interferer module 199, NLN interferer module 198, one or more nodes 230-260, and optionally Domain Master 220.

For ease of illustration, the functionality of node 100 is shown in detail in FIG. 1. Other nodes, 230-260 and the Domain Master will typically also include one or more of the componentry and/or modules shown in node 100. The node 100, in addition to well known componentry, includes a data rate message module 300, a data rate diagnostic module 310, a data rate measurement module 320, a data rate data collection module 330, a data rate interferer module 340, an SNR message module 400, an SNR diagnostic module 410, an SNR measurement module 420, an SNR information collection module 430, an SNR interferer module 440, a BATV message module 500, a BATV diagnostic module 510, a BATV measurement module 520, a BATV information collection module 530, a BATV interferer module 540, a CAT message module 600, a CAT diagnostic module 610, a CAT measurement module 620, a CAT information collection module 630, CAT interferer module 640, a QLN message module 700, a QLN diagnostic module 710, a QLN measurement module 720, a QLN data collection module 730, a QLN interferer module 740, a NLN message module 800, a NLN diagnostic module 810, a NLN measurement module 820, a NLN data collection module 830, a NLN interferer module 840, parameter/test module 880, a receiver portion 110, a transmitter portion 120, processor 130, memory 140, a predefined signal determination and library module 150, an optional network performance module 160, mapping module 170, time-based measurement and comparison module 50 and map generation module 75.

As illustrated in FIG. 1, the network performance module, the data rate interferer module, SNR interferer module, BATV interferer module, CAT interferer module, QLN interferer module, NLN interferer module, mapping module, time-based measurement and comparison module 50 and map generation module 75 could also be located in another portion within or outside the communications environment 1, such as where the network performance module 200, mapping module 210, data rate interferer module 180, SNR interferer module 190, BATV interferer module 195, CAT interferer module 197, QLN interferer module 199 and NLN interferer module 198 are illustratively shown. For example, one or more of these modules could be located in a network operation or management device or a test device that is located inside or outside the network and is managed and/or operated by a user, consumer, service provider or power utility provider or a governmental entity.

As previously eluded to, one or more of the components within node 100 could be subdivided and distributed amongst other nodes and/or the Domain Master, or within a separate test and/or measurement device (not shown) and located anywhere within the communications environment 1. Furthermore, one or more of the modules within the node 100 could also be included in one or more of the nodes 230-260 and Domain Master 220. For example, the modules associated with data rate measurements (300-340), the modules associated with SNR measurements (400-440), the modules associated with the bit allocation value measurements (500-540), the modules associated with channel attenuation measurements (600-630), the modules associated with the quiet line noise measurements (700-740) and the modules associated with the nonlinear noise measurements could be split-up in any manner and located anywhere within the communications environment 1.

Selecting Measurement(s)

In accordance with a first exemplary embodiment, an interface can be provided, such as on a display (not shown), that allows one or more of a user, technician, network manager, or the like, to select the type of measurement(s) that they would like to perform. This measurement can be performed manually, such as when a user selects a particular measurement to be performed, or automatically or semi-automatically, for example, at a certain time, or based dynamically on an event such as a change in data rate, detection of one or more problems associated with a channel, and/or or a change in service requirements.

The controller 130 in cooperation with the memory 140 can provide this interface that allows, for example, a user or technician to select between one or more of data rate measurements, SNR measurements, bit allocation value measurements, channel attenuation measurements, quiet line noise measurements and nonlinear noise measurements. Upon selection of any one or more of these measurement techniques, the associated measurement is performed and the results displayed on, for example, a display or output to another location on the network, such as the network performance module 160 and/or 200. In addition, and as discussed in greater detail hereinafter, the results can optionally be correlated to a map, and information pertaining thereto shown in, for example, one or more of a graphical nature, such as one an actual map, or textually, such as a description of where it is believed that the problem is occurring or what type of interferer is causing the problem.

Data Rate Measurement

A second exemplary embodiment of the invention will be discussed in relation to data rate measurements for networks, and in particular, for home networks or access networks. More specifically, if a network is experiencing high packet loss or limited coverage, the data rate information, in cooperation with the data rate diagnostic module 310, can be used to detect and correct the problem. Additionally, data rate information can be used by, for example, a Domain Master, to optimize network performance. For example if TDMA is used, time slots can be allocated for transmission and/or reception to nodes in the network based on the data rate measurements. For example if FMDA is used, frequency can be allocated for transmission and/or reception to nodes in the network based on the data rate measurements. For example, data rate parameters can be used by a Domain Master to determine the placement and duration of TXOPs in a MAC cycle and determine a Media Access Plan (MAP) as defined, for example, in the draft ITU recommendation G.hn. In conjunction with the data rate measurement module 320 and data rate data collection module 330, the procedure commences by gathering data rate information in the network at the request of, for example, a user, service provider, another node in a network, a Domain Master, or in general from any location within or outside the communications environment 1. Next, and in cooperation with the data rate message module 300, the Domain Master, another node, or test device within the communications environment 1 sends a message to one or more of nodes in the network indicating that data rate measurements are to be made. For example, the information may be sent as part of a MAP message which may be sent every MAC cycle. The message may indicate one or more time slots to be used for making data rate measurements.

For example, all time slots in the MAC cycle may be assigned for making data rate measurements. In some cases, the MAP message may indicate that the network is optionally entering into a diagnostic mode during which one or more time slots may be used to measure the data rate. During this diagnostic mode, the data rate measurements are made for one, more than one, or even all time slots in a MAC cycle. Using a plurality (or all) time slots for measuring the data rate may be helpful when trying to diagnose problems in the network or, for example, when trying to optimize or improve network performance.

Then, during the one or more time slots assigned for making data rate measurements, and in cooperation with the data rate measurements module 320, a transmitting node sends a signal that is used by one or more receiving nodes, such as one or more of nodes 230-260, to make the data rate measurements. For example, and in cooperation with the predefined signal determination and library module 150, a predefined signal may be sent, such as a probe frame, wherein the transmission parameters are known in advance by the receivers.

Examples of predefined signals are described herein below. Additionally, or alternatively, a receiver may request a specific predefined signal to be sent by the transmitter. This could be done because receivers may have implemented different algorithms for determining the data rate based on different predefined signals. The receiver could send a message to the transmitter indicating the parameters to be used for the predefined signal, as described below.

The receiving node(s), in cooperation with the data rate data collection module 330, then collect the data rate measurements and this information can be optionally transmitted to the Domain Master (or other nodes and/or the network performance module) in one or more messages. The data rate information may be represented in a format where a data rate measurement is specified for a specific time slot or a plurality of time slots. An example of a data rate parameter for a specific receiving node is shown in Table 1, where there are N=4 time slots.

TABLE 1

Example of data rate information for a receiving node

| Time Slot 1 | Time Slot 2 | Time Slot 3 | Time Slot 4 |
|---|---|---|---|
| 96 Mbps | 123 Mbps | 55 Mbps | 85 Mbps |

Additionally, or alternatively, the data rate information may be represented in a format where a data rate measurement is specified for a plurality of time slot and a plurality of transmitting nodes. An example of a data rate parameter for a specific receiving node is shown in Table 2, where there are N=4 time slots and 3 transmitting nodes.

TABLE 2

Example of Data rate for a receiving node

|  | Time slot 1 | Time slot 2 | Time slot 3 | Time slot 4 |
|---|---|---|---|---|
| Transmitting Node #1 | 96 Mbps | 123 Mbps | 55 Mbps | 85 Mbps |
| Transmitting Node #2 | 30 Mbps | . . . | . . . | . . . |
| Transmitting Node #3 | 66 Mbps | . . . | . . . | . . . |

Examples of Predefined Signal that can be Used for Data Rate Measurement

Several types of predefined signals could be used to measure the data rate. For example, in the current G.hn draft, the probe signal is specified as a PRBS (Pseudo-Random Bit Sequence) modulated signal where the PRBS sequence is not initialized every DMT symbol. This results in a MEDLEY type signal that is different every DMT symbol. While this type of signal is good for measuring data rate with Inter-Symbol Interference (ISI), it may not be the preferred type of signal for determining the data rate in an ISI free environment. For example, a periodic signal without Cyclic Prefix provides an ISI free data rate measurement. This could be accomplished by initializing the PRBS sequence at the beginning of every DMT symbol and then removing the Cyclic Prefix. Alternatively, the maximum allowed CP length could be used to minimize ISI. The receiver could request to configure one or more of the following in a predefined signal used for data rate measurement:

PRBS reinitialization,
cyclic prefix length,
window length,
active carriers, and
signal/subcarrier power level.

The predefined signal used for data rate measurement could be determined by the receiver. For example, a message could be sent by the receiver to the transmitter indicating the parameters to be used for the predefined signal. For example, the message could contain a bit field indicating the length of the cyclic prefix and/or the signal or power level of one or more subcarriers for the predefined signal.

Also, for example the message could indicate that the PRBS should (or should not) be initialized every symbol and/or that Cyclic Prefix should (or should) not be included, etc. Alternatively, or in addition, the predefined signal described above could be determined by the transmitter. For example, a message could be sent by the transmitter to the receiver indicating a specific type and parameters of predefined signal in a similar manner as for the message sent from the receiver to the transmitter.

Examples of how the Data Rate can be Used for Determining the Map

As described above, data rate information can be used by a Domain Master to optimize or improve network performance. For example, the data rate parameters can be used by the Domain Master to determine the placement and duration of TXOPs in a MAC cycle and determine the Media Access Plan (MAP) as defined in G.9960.

Example #1

There are 3 nodes (Node A, Node B and Node C) in a network with the following data rate requests:

Node A is requesting a 30 Mbps data rate to transmit data to Node B

Node B is requesting a 70 Mbps data rate to transmit data to Node C

Node C is requesting a 10 Mbps date rate to transmit to Node A and Node B

Based on these data rate requirements, a master node may determine a MAP that divides the MAC cycle into TXOPs allocated to each node. For example, the Domain Master may divide the MAC cycle into 3 Contention Free TXOPs (CFTX-OPs) that meet the data rate requirements for each node. In order to determine where to allocate TXOPs in the MAC cycle, the master node may perform a procedure such as the one described above where a one or more time slots are assigned to each transmitting node and the receiving nodes measure the data rate. Additionally, or alternatively, a master node may send a message to enter into a diagnostic mode where all time slots are used to measure the data rate. Note that it may not be possible to use all time slots because the MAP message may require a dedicated time slot and this MAP time slot may not be used for data rate measurement.

An example of data rate measurements for each node are shown in Tables A, B, C.

TABLE A

Example of Data rate measurements for a receiving node A

|  | Time slot 1 | Time slot 2 | Time slot 3 |
|---|---|---|---|
| Transmitting Node B | 10 Mbps | 34 Mbps | 50 Mbps |
| Transmitting Node C | 30 Mbps | 15 Mbps | 100 Mbps |

TABLE B

Example of Data rate measurements for a receiving node B

|  | Time slot 1 | Time slot 2 | Time slot 3 |
|---|---|---|---|
| Transmitting Node A | 5 Mbps | 50 Mbps | 20 Mbps |
| Transmitting Node C | 23 Mbps | 5 Mbps | 60 Mbps |

TABLE C

Example of Data rate measurements for a receiving node C

|  | Time slot 1 | Time slot 2 | Time slot 3 |
|---|---|---|---|
| Transmitting Node A | 30 Mbps | 35 Mbps | 10 Mbps |
| Transmitting Node B | 22 Mbps | 76 Mbps | 75 Mbps |

Based on the data rate requirements for each node and the measured data rates in Table A, B and C, the Domain Master may allocate the TXOPs as follows:

Time slot 1 is assigned to TXOP1 which is allocated to Node C to transmit data to Node A and B because it meets the 10 Mbps data rate request since it was measured to have a 30 and 23 Mbps data rate capability, respectively.

Time slot 2 is assigned to TXOP2 which is allocated to Node A to transmit data to Node B because it meets the 30 Mbps data rate request since it was measured to have a 50 Mbps data rate capability.

Time slot 3 is assigned to TXOP3 which is allocated to Node B to transmit data to Node C because it meets the 70 Mbps data rate request since it was measured to have a 75 Mbps data rate capability.

Example #2

There are 3 nodes (Node A, Node B and Node C) in a network with the following data rate requests:

Node C is requesting a 120 Mbps data rate to transmit data to Node A

Node A is requesting a 50 Mbps data rate to transmit data to Node B

Based on these data rate requirements, a master node may determine a MAP that divides the MAC cycle into TXOPs allocated to each node. For example, the Domain Master may divide the MAC cycle into 2 Contention Free TXOPs (CFTX-OPs) that meet the data rate requirements for each node. In order to determine where to allocate TXOPs in the MAC cycle, the master node may perform a procedure such as the one described above where one or more time slots are assigned to each transmitting node and the receiving nodes measure the data rate. Additionally, or alternatively, a master node may send a message to enter into a diagnostic mode where all time slots are used to measure the data rate. Note that it may not be possible to use all time slots because the MAP message may require a dedicated time slot and this MAP time slot may not be used for data rate measurement.

An example of data rate measurements for each node are shown Tables A, B, C above.

Based on the data rate requirements for each node and the measured data rates in Table A, B and C, the Domain Master may allocate the TXOPs as follows:

Time slot 2 is assigned to TXOP1 which is allocated to Node A to transmit data to Node B because it meets the 50 Mbps data rate request since it was measured to have a 50 Mbps data rate capability.

Time slot 1 and time slot 3 are assigned to TXOP2 which is allocated to Node C to transmit data to Node A because it meets the 120 Mbps data rate request since time slot 1 was measured to have a 30 Mbps capability and time slot 3 was measured to have a 100 Mbps data rate capability.

Using Data Rate Information to Diagnose Problems in a Network

As previously discussed, the data rate measurements may also be used to identify the location and/or type of one or more interferers. For example, and in cooperation with the data rate interferer module 340, this could be done by analyzing and/or comparing the measured data rates from one or more ports in the network. For example, if a specific type of home appliance or other device (such as a dishwasher) in the home is known to cause interference and degrade the data rate of a node, the data rate information can be used to identify the existence of this interferer in the network. Additionally, for example, if the measured data rate for port A located in the living room showed an unusually low data rate, then it could be determined that the location device causing the interference is located in the living room.

More exact location information could be determined in conjunction with the mapping module 170 or 210, using a plurality of ports. For example, if port A and port B are in the living room, and port A shows a large data rate reduction or PER impact, whereas port B shows only a moderate data rate reduction or PER impact, then it could be determined that the interfering appliance is in the living room and closer to port A than port B.

In general, this diagnostic information could also be provided to a user, service provider, or technician or other node in the network or a network management system or network operation device that is located inside or outside the network in order to assist with correcting the problem(s). For example, if a network is experiencing problems a user or service provider or technician could initiate a diagnostic mode to gather the data rate information. The output of the diagnostic mode could be a notification that an interfering device has been identified and/or the type of the interfering device and/or the location of the interfering device.

SNRps Measurements

A third exemplary embodiment of the invention will be discussed in relation to signal-to-noise ratio measurements for networks, and in particular, for home or access networks. More specifically, if a network is experiencing high packet loss or limited coverage, the SNRps information can be used, in cooperation with the SNR interferer module 440, to detect and correct the problem. Additionally, SNRps information can be used by, for example, a Domain Master, to optimize or improve network performance. For example if TDMA is used, time slots can be allocated for transmission and/or reception to nodes in the network based on the SNRps measurements. For example if FMDA is used, frequency can be allocated for transmission and/or reception to nodes in the network based on the SNRps measurements. For example, SNRps parameters can be used by a Domain Master to determine the placement and duration of TXOPs in a MAC cycle and determine a Media Access Plan (MAP) as defined, for example, in the draft ITU recommendation G.hn. In conjunction with the SNRps measurement module 420 and the SNR information collection module 430, the procedure commences by gathering SNRps information in the network at the request of, for example, a user, service provider, another node in a network, a Domain Master, or in general from any location within or outside the communications environment 1. Next, and in cooperation with the SNRps message module 400, the Domain Master, another node, or test device within the communications environment 1 sends a message to one or more nodes in the network indicating that SNRps measurements are to be made. For example, the information may be sent as part of a MAP message which may be sent every MAC cycle. The message may indicate one or more time slots to be used for making SNRps measurements.

For example, all time slots in the MAC cycle may be assigned for making SNRps measurements. In some cases, the MAP message may indicate that the network is optionally entering into a diagnostic mode during which one or more time slots may be used to measure the SNRps. During this diagnostic mode, the SNRps measurements are made for one, more than one, or even all time slots in a MAC cycle. Using a plurality (or all) TXOPs for measuring the SNRps may be helpful when trying to diagnose problems in the network or, for example, when trying to optimize or improve network performance.

TABLE 1.1

Example of SNRps information for a receiving node

| Time slot 1 | Time slot 2 | Time slot 3 | Time slot 4 |
|---|---|---|---|
| SNR1 = 10 dB | SNR1 = 15 dB | SNR1 = 22 dB | SNR1 = 19 dB |
| SNR2 = 12 dB | SNR2 = 13 dB | SNR2 = 23 dB | SNR2 = 23 dB |
| ... | ... | ... | ... |
| SNRN = 11 dB | SNRN = 12 dB | SNRN = 33 dB | SNRN = 21 dB |

Additionally, or alternatively, the SNRps information may be represented in a format where a SNRps measurement is specified for a plurality of time slots and a plurality of transmitting nodes. An example of a SNRps parameter for a specific receiving node is shown in Table 2.1, where there are N=4 time slots and 3 transmitting nodes.

TABLE 2.1

Example of SNRps for a receiving node

| | Time slot 1 | Time slot 2 | Time slot 3 | Time slot 4 |
|---|---|---|---|---|
| Transmitting Node #1 | SNR1 = 10 dB | SNR1 = 15 dB | SNR1 = 22 dB | SNR1 = 19 dB |
| | SNR2 = 12 dB | SNR2 = 13 dB | SNR2 = 23 dB | SNR2 = 23 dB |
| | ... | ... | ... | ... |
| | SNRN = 11 dB | SNRN = 12 dB | SNRN = 33 dB | SNRN = 21 dB |
| Transmitting Node #2 | SNR1 = 30 dB | ... | ... | ... |
| | SNR2 = 32 dB | | | |
| | ... | | | |
| | SNRN = 31 dB | | | |
| Transmitting Node #3 | SNR1 = 20 dB | ... | ... | ... |
| | SNR2 = 22 dB | | | |
| | ... | | | |
| | SNRN = 23 dB | | | |

Then, during the one or more TXOPs assigned for making SNRps measurements, and in cooperation with the SNRps measurement module 420, a transmitting node sends a signal that is used by one or more receiving nodes, such as one or more of nodes 230-260, to make the SNRps measurements. For example, and in cooperation with the predefined signal determination and library module 150, a predefined signal may be sent, such as a probe frame, wherein the transmission parameters are known in advance by the receivers. Examples of predefined signals are described herein below. Additionally, or alternatively, a receiver may request a specific predefined signal to be sent by the transmitter. This could be done because receivers may have implemented different algorithms for determining the SNRps based on different predefined signals. The receiver could send a message to the transmitter indicating the parameters to be used for the predefined signal, as described below.

The receiving node(s), in cooperation with the SNRps data/information collection module 430, then collect the SNRps measurements and this information can be optionally transmitted to the Domain Master (or other nodes and/or a network performance module) in one or more messages. The SNRps information may be represented in a format where a SNRps measurement is specified for a specific time slot or a plurality of time slots. An example of a SNRps parameter for a specific receiving node is shown in Table 1.1, where there are N=4 time slots.

Examples of Predefined Signal that can be Used for SNRps Measurement

Several types of predefined signals could be used to measure the SNRps. For example, in the current G.hn draft, the probe signal is specified as a PRBS modulated signal where the PRBS sequence is not initialized every DMT symbol. This results in a MEDLEY type signal that is different every DMT symbol. While this type of signal is good for measuring SNRps with Inter-Symbol Interference (ISI), it may not be the preferred type of signal for determining the SNRps in an ISI free environment. For example, a periodic signal without Cyclic Prefix provides an ISI free SNRps measurement. This could be accomplished by initializing the PRBS sequence at the beginning of every DMT symbol and then removing the Cyclic Prefix (CP). Alternatively, the maximum allowed CP length could be used to minimize ISI. The receiver could request to configure one or more of the following in a predefined signal used for SNRps measurement:
  PRBS reinitialization,
  cyclic prefix length,
  window Length,
  active carriers, and
  signal/subcarrier power level.

The predefined signal used for SNRps measurement could be determined by the receiver. For example, a message could be sent by the receiver to the transmitter indicating the parameters to be used for the predefined signal. For example, the message could contain a bit field indicating the length of the cyclic prefix and/or the signal or power level of one or more subcarriers for the predefined signal.

Also, for example the message could indicate that the PRBS should (or should not) be initialized every symbol and/or that the Cyclic Prefix should (or should) not be included, etc.

Alternatively, or in addition, the predefined signal described above could be determined by the transmitter. For example, a message could be sent by the transmitter to the receiver indicating a specific type and parameters of predefined signal in a similar manner as for the message sent from the receiver to the transmitter.

Examples of how the SNRps can be Used for Determining the Map

As described above, SNRps information can be used by a Domain Master to optimize or improve the network performance. For example, the SNRps parameters can be used by the Domain Master to determine the placement and duration of TXOPs in a MAC cycle and determine the Media Access Plan (MAP) as defined in G.9960.

Example #1

There are 3 nodes (Node A, Node B and Node C) in a network with the following SNRps requests:

Node A is requesting a 30 Mbps data rate to transmit data to Node B

Node B is requesting a 70 Mbps data rate to transmit data to Node C

Node C is requesting a 10 Mbps date rate to transmit to Node A and Node B

Based on these data rate requirements a master node may determine a MAP that divides the MAC cycle into TXOPs allocated to each node. For example, the Domain Master may divide the MAC cycle into 3 Contention Free TXOPs (CFTX-OPs) that meet the data rate requirements for each node. In order to determine where to allocate TXOPs in the MAC cycle, the master node may perform a procedure such as the one described above where one or more time slots are assigned to each transmitting node and the receiving nodes measure the SNRps. Additionally, or alternatively, a master node may send a message to enter into a diagnostic mode where all time slots are used to measure the SNRps. Note that it may not be possible to use all time slots because the MAP message may require a dedicated time slot and this MAP time slot may not be used for SNRps measurement.

Using the SNRps measurements, a master node can determine the data rate capability of a particular receiving node for each time slot based on a particular transmitting node. For example, the master node could determine the data rate for each node and time slot by performing a Bit Allocation computation where the number of bits that can be transmitted on the subcarriers is determined based on the SNR measurements and Bit Error Rate (BER) requirements.

An example of computed data rates that are determined based on SNRps measurements for each node are shown Tables A.1, B.1, C.1.

TABLE A.1

Example of computed data rates based on SNRps measurement for a receiving node A

|  | Time slot 1 | Time slot 2 | Time slot 3 |
| --- | --- | --- | --- |
| Transmitting Node B | 10 Mbps | 34 Mbps | 50 Mbps |
| Transmitting Node C | 30 Mbps | 15 Mbps | 100 Mbps |

TABLE B.1

Example of computed data rates based on SNRps measurement for a receiving node B

|  | Time slot 1 | Time slot 2 | Time slot 3 |
| --- | --- | --- | --- |
| Transmitting Node A | 5 Mbps | 50 Mbps | 20 Mbps |
| Transmitting Node C | 23 Mbps | 5 Mbps | 60 Mbps |

TABLE C.1

Example of computed data rates based on SNRps measurement for a receiving node C

|  | Time slot 1 | Time slot 2 | Time slot 3 |
| --- | --- | --- | --- |
| Transmitting Node A | 30 Mbps | 35 Mbps | 10 Mbps |
| Transmitting Node B | 22 Mbps | 76 Mbps | 75 Mbps |

Based on the data rates requirements for each node and the computed data rates in Table A.1, B.1 and C.1, the Domain Master may allocate the TXOPs as follows:

Time slot 1 is assigned to TXOP1 which is allocated to Node C to transmit data to Node A and B because it meets the 10 Mbps data rate request since it was measured to have a 30 and 23 Mbps data rate capability, respectively.

Time slot 2 is assigned to TXOP2 which is allocated to Node A to transmit data to Node B because it meets the 30 Mbps data rate request since it was measured to have a 50 Mbps data rate capability.

Time slot 1 is assigned to TXOP3 which is allocated to Node B to transmit data to Node C because it meets the 70 Mbps data rate request since it was measured to have a 75 Mbps data rate capability.

Example #2

If there are 3 nodes (Node A, Node B and Node C) in a network with the following SNRps requests:

Node C is requesting a 120 Mbps data rate to transmit data to Node A

Node A is requesting a 50 Mbps data rate to transmit data to Node B

Based on these SNRps requirements a master node may determine a MAP that divides the MAC cycle into TXOPs allocated to each node. For example, the Domain Master may divide the MAC cycle into 2 Contention Free TXOPs (CFTX-OPs) that meet the SNRps requirements for each node. In order to determine where to allocate TXOPs in the MAC cycle, the master node may perform a procedure such as the one described above where a one or more time slot are assigned to each transmitting node and the receiving nodes measure the SNRps. Additionally, or alternatively, a master node may send a message to enter into a diagnostic mode where all time slots are used to measure the SNRps. Note that it may not be possible to use all time slots because the MAP message may require a dedicated time slot and this MOP time slot may not be used for SNRps measurement.

Using the SNRps measurements, a master node can determine the data rate capability of a particular receiving node for each TXOP based on a particular transmitting node.

An example of computed data rates that are determined based on SNRps measurements for each node are shown Tables A.1, B.1, C.1.

Time slot 2 is assigned to TXOP1 which allocated to Node A to transmit data to Node B because it meets the 50 Mbps data rate request since it was measured to have a 50 Mbps data rate capability.

Time slot 1 and slot time 3 are assigned to TXOP3 which allocated to Node C to transmit data to Node A because it meets the 120 Mbps data rate request since time slot 1 was measured to have a 30 Mbps capability and time slot 3 was measured to have a 100 Mbps data rate capability.

Using SNRps Information to Diagnose Problems in a Network

The measured SNRps information may also be used to diagnose problems in a network. For example, if a network is experiencing high packet loss or limited coverage, the SNRps information can be used to detect and correct the problem.

For example, and in cooperation with the SNR interferer module 440, the SNRps may be used to identify a type of interferer(s). The SNRps information may be used to identify the type of known interferes in the network by comparing the measured SNRps with stored information (stored, for example, in module 150) about the known interference. As an example, if a particular interferer has a known noise profile, such as one stored in the library module 150, in the frequency or time domain, the SNRps information can be used to identify the existence of this type of interferer in the network. For example, the measured SNRps information could be compared known noise profiles to identify the existence the existence of a known type of interferer in the network. Example of known interferers that could be stored in library module 150 include appliances (dishwashers, dryers, washers, electric ovens, microwaves, etc), light dimmers, transformers, power strips, extension cords, radio interference (e.g. AM, FM, HAM, etc), circuit breakers, missing microfilters, bridged taps, etc.

Information about the known interferers could be stored as models, for example in the library module 150, that are determined from theoretical knowledge of the source of interference, such as radio signals or other electromagnetic waves that ingress or crosstalk onto the wired media. They could also be empirical models that are known to have been transmitted from a certain source such as a type of light dimmer, electrical motor, halogen light, etc. These models could also be stored or downloaded from another location in the network.

The models can be used to identify interference by comparing, for example with the cooperation of the controller 130 and memory 140, measured data with such models. Typically a comparison is made between a measured signal (in either the frequency domain or time domain) and a corresponding candidate model, with the measured signal being identified as the signal whose model it compares most closely to. This is often done using a minimum mean square error measurement of the comparison between the measured data and the model. By identifying the type of interference, it simplifies one's ability to determine a means for overcoming, avoiding or mitigating the interference.

For example, AM radio, FM radio or other narrowband interference could be identified by analyzing the SNRps information. If, for example, the measured SNR subcarriers around 680 kHz was very low, such as 0 dB, then this may indicate the AM radio station operating at 680 kHz is causing interference in the network. Alternatively, or additionally, if a home appliance or other device in the home is known to cause interference in a particular frequency band, with for example, the corresponding signature stored in the library module 150, the SNRps information can be used to identify the existence of this interferer in the network through a comparison of the type of interference to known signatures in the library module 150. If, for example, a home appliance, such as a dishwasher, is known to cause interference in the 10-12 MHz frequency band, and the measured SNRps was very low in this region, then the SNRps could be used to identify the existence and/or type of interferer.

Optionally, and in cooperation with one or more of the mapping module 170 and mapping module 210, the SNRps may be used to identify the location of an interferer. This could be done by analyzing and/or comparing the SNRps from one or more ports in a network. Alternatively, or additionally, if a home appliance or other device in the home is known to cause interference in a particular frequency band, the SNRps information can be used identify the existence of this interferer in the network. If, for example, a home appliance is known to cause interference in the 10-12 MHz frequency band and the measured SNRps for port A located in the living room showed a low SNR in that frequency region, then it can be determined that the home appliance causing an interference is located in the living room. More exact location information could be determined using a plurality of ports. For example, if port A and port B are in the living room, and port A shows a large SNR reduction in the 10-12 MHz range, whereas port B shows only a moderate SNR reduction in the 10-12 MHz range, then it could be determined that the interfering appliance is in the living room and closer to port A than port B. As discussed, this could be shown either graphically or via textual information in conjunction with the mapping module 170, controller 130, memory 140, and a display.

In general, this diagnostic information could be provided to a user, or a service provider, or a technician or a network management system or network operation device that is located inside or outside the network in order to assist with alleviating the problem. For example, if a network is experiencing problems a user or a service provider or a technician could initiate a diagnostic mode to gather the SNRps information. The initiation of the diagnostic mode could be done using test equipment in the home, using a Domain Master or using in a network management system or network operation device that is located inside or outside the network. The output of the diagnostic mode could be a notification that an interfering device has been identified and/or the type of the interfering device and/or the location of the interfering device. This information could be sent to the network management system or network operation device that is located inside or outside the network which could be used by the service provider or utility provider to take corrective actions.

BATVps

A fourth exemplary embodiment of the invention will be discussed in relation to bit allocation value per subcarrier measurements for networks, and in particular, for home or access networks. More specifically, if a network is experiencing high packet loss or limited coverage, the BATVps information can be used, in cooperation with the BATV interferer module 540, to detect and correct the problem. Additionally, BATVps information can be used by, for example, a Domain Master, to optimize or improve network performance. For example if TDMA is used, time slots can be allocated for transmission and/or reception to nodes in the network based on the BATVps measurements. For example if FMDA is used, frequency can be allocated for transmission and/or reception to nodes in the network based on the BATVps measurements. For example, BATVps parameters can be used by a Domain Master to determine the placement and duration of TXOPs in a MAC cycle and determine a Media Access Plan (MAP) as defined, for example, in the draft ITU recommendation G.hn. In conjunction with the BATV measurement module 520, the procedure commences by gathering BATVps information in the network at the request of, for example, a user, service provider, another node in a network, a Domain Master, or in general from any location within the communications environment 1. Next, and in cooperation with the BATV message module 500, the Domain Master, another node, or test device within or outside the communications environment 1 sends a message to a one or more of nodes in the network indicating that BATVps measurements are to be made. For example, the information may be sent as part of a MAP message which may be sent every MAC cycle. The message may indicate one or more time slots to be used for making BATVps measurements.

For example, all time slots in the MAC cycle may be assigned for making BATVps measurements. In some cases, the MAP message may indicate that the network is optionally entering into a diagnostic mode during which one or more time slots may be used to measure the BATVps. During this diagnostic mode, the BATVps measurements are made for one, more than one, or even all time slots in a MAC cycle. Using a plurality (or all) time slots for measuring the BATVps may be helpful when trying to diagnose problems in the network or, for example, when trying to optimize or improve network performance.

Then, during the one or more time slots assigned for making BATVps measurements, and in cooperation with the BATV measurement module 520, a transmitting node sends a signal that is used by one or more receiving nodes, such as one or more of nodes 230-260, to make the BATVps measurements. For example, and in cooperation with the predefined signal determination and library module 150, a predefined signal may be sent, such as a probe frame, wherein the transmission parameters are known in advance by the receivers. Examples of predefined signals are described herein below. Additionally, or alternatively, a receiver may request a specific predefined signal to be sent by the transmitter. This could be done because receivers may have implemented different algorithms for determining the BATVps based on different predefined signals. The receiver could send a message to the transmitter indicating the parameters to be used for the predefined signal, as described below.

The receiving node(s), in cooperation with the BATVps data/information collection module 530, then collect the BATVps measurements and this information can be optionally transmitted to the Domain Master (or other nodes and/or a network performance module) in one or more messages. The BATVps information may be represented in a format where a BATVps measurement is specified for a specific time slot or a plurality of time slots. An example of a BATVps parameter for a specific receiving node is shown in Table 1.2, where there are N=4 time slots.

An example of a BATVps parameter for a specific receiving node is shown in Table 1.2, where there are N=4 time slots.

TABLE 1.2

Example of BATVps information for a receiving node

| Time slot 1 | Time slot 2 | Time slot 3 | Time slot 4 |
|---|---|---|---|
| BATV1 = 3 | BATV1 = 4 | BATV1 = 6 | BATV1 = 2 |
| BATV2 = 2 | BATV2 = 4 | BATV2 = 4 | BATV2 = 2 |
| ... | ... | ... | ... |
| BATVN = 4 | BATVN = 2 | BATVN = 6 | BATVN = 3 |

Additionally, or alternatively, the BATVps information may be represented in a format where a BATVps measurement is specified for a plurality of time slots and a plurality of transmitting nodes. An example of a BATVps parameter for a specific receiving node is shown in Table 2.2, where there are N=4 time slots and 3 transmitting nodes.

TABLE 2.2

Example of BATVps for a receiving node

| | time slot 1 | time slot 2 | time slot 3 | time slot 4 |
|---|---|---|---|---|
| Transmitting Node #1 | BATV1 = 3<br>BATV2 = 2<br>...<br>BATVN = 4 | BATV1 = 4<br>BATV2 = 4<br>...<br>BATVN = 2 | BATV1 = 6<br>BATV2 = 4<br>...<br>BATVN = 6 | BATV1 = 2<br>BATV2 = 2<br>...<br>BATVN = 3 |
| Transmitting Node #2 | BATV1 = 3<br>BATV2 = 3<br>...<br>BATVN = 2 | ... | ... | ... |
| Transmitting Node #3 | BATV1 = 7<br>BATV2 = 6<br>...<br>BATVN = 7 | ... | ... | ... |

Examples of Predefined Signal that can be Used for BATVps Measurement

Several types of the predefined signals could be used to measure the BATVps. For example, in the current G.hn draft, the probe signal is specified as a PRBS modulated signal where the PRBS sequence is not initialized every DMT symbol. This results in a MEDLEY type signal that is different every DMT symbol. While this type of signal is good for measuring BATVps with Inter-Symbol Interference (ISI), it may not be the preferred type of signal for determining the BATVps in an ISI free environment. For example, a periodic signal without Cyclic Prefix provides an ISI free BATVps measurement. This could be accomplished by initializing the PRBS sequence at the beginning of every DMT symbol and then removing the Cyclic Prefix. Alternatively, the maximum allowed CP length could be used to minimize ISI. The receiver could request to configure one or more of the following in a predefined signal used for BATVps measurement:

PRBS reinitialization,
cyclic prefix length,
window Length,
active carriers, and
signal/subcarrier power level.

The predefined signal used for BATVps measurement could be determined by the receiver. For example, a message could be sent by the receiver to the transmitter indicating the parameters to be used for the predefined signal. For example, the message could contain a bit field indicating the length of the cyclic prefix and/or the signal or power level of one or more subcarriers for the predefined signal.

Also, for example the message could indicate that the PRBS should (or should not) be initialized every symbol and/or that Cyclic should (or should) not be included, etc.

Alternatively, or in addition, the predefined signal described above could be determined by the transmitter. For example, a message could be sent by the transmitter to the receiver indicating a specific type and parameters of predefined signal in a similar manner as for the message sent from the receiver to the transmitter.

Examples of how the BATVps can be Used for Determining the Map

As described above, BATVps information can be used by a Domain Master to optimize or improve the network performance. For example, the BATVps parameters can be used by the Domain Master to determine the placement and duration of TXOPs in a MAC cycle and determine the Media Access Plan (MAP) as defined in G.9960.

Example #1

If there are 3 nodes (Node A, Node B and Node C) in a network with the following BATVps requests:

Node A is requesting a 30 Mbps data rate to transmit data to Node B

Node B is requesting a 70 Mbps data rate to transmit data to Node C

Node C is requesting a 10 Mbps date rate to transmit to Node A and Node B

Based on these data rate requirements a master node may determine a MAP that divides the MAC cycle into TXOPs allocated to each node. For example, the Domain Master may divide the MAC cycle into 3 Contention Free TXOPs (CFTX-OPs) that meet the data rate requirements for each node. In order to determine where to allocate TXOPs in the MAC cycle, the master node may perform a procedure such as the one described above where one or more TXOPs are assigned to each transmitting node and the receiving nodes measure the BATVps. Additionally, or alternatively, a master node may send a message to enter into a diagnostic mode where all time slots are used to measure the BATVps. Note that it may not be possible to use all time slots because the MAP message may require a dedicated time slot and this MOP time slot may not be used for BATVps measurement.

Using the BATVps measurements, a master node can determine the data rate capability of a particular receiving node for each time slot based on a particular transmitting node.

An example of computed data rates that are determined based on BATVps measurements for each node are shown Tables A.2, B.2, C.2.

TABLE A.2

Example of computed data rates based on BATVps measurement for a receiving node A

|  | Time slot 1 | Time slot 2 | Time slot 3 |
| --- | --- | --- | --- |
| Transmitting Node B | 10 Mbps | 34 Mbps | 50 Mbps |
| Transmitting Node C | 30 Mbps | 15 Mbps | 100 Mbps |

TABLE B.2

Example of computed data rates based on BATVps measurement for a receiving node B

|  | Time slot 1 | Time slot 2 | Time slot 3 |
| --- | --- | --- | --- |
| Transmitting Node A | 5 Mbps | 50 Mbps | 20 Mbps |
| Transmitting Node C | 23 Mbps | 5 Mbps | 60 Mbps |

TABLE C.2

Example of computed data rates based on BATVps measurement for a receiving node C

|  | Time slot 1 | Time slot 2 | Time slot 3 |
| --- | --- | --- | --- |
| Transmitting Node A | 30 Mbps | 35 Mbps | 10 Mbps |
| Transmitting Node B | 22 Mbps | 76 Mbps | 75 Mbps |

Based on the data rates requirements for each node and the computed data rates in Table A.2, B.2 and C.2, the Domain Master may allocate the TXOPs as follows:

Time slot 1 is assigned to TXOP1 which allocated to Node C to transmit data to Node A and B because it meets the 10 Mbps data rate request since it was measured to have a 30 and 23 Mbps data rate capability, respectively.

Time slot 2 is assigned to TXOP2 which allocated to Node A to transmit data to Node B because it meets the 30 Mbps data rate request since it was measured to have a 50 Mbps data rate capability.

Time slot 3 is assigned to TXOP3 which allocated to Node B to transmit data to Node C because it meets the 70 Mbps data rate request since it was measured to have a 75 Mbps data rate capability.

Example #2

If there are 3 nodes (Node A, Node B and Node C) in a network with the following BATVps requests:

Node C is requesting a 120 Mbps data rate to transmit data to Node A

Node A is requesting a 50 Mbps data rate to transmit data to Node B

Based on these BATVps requirements a master node may determine a MAP that divides the MAC cycle into TXOPs allocated to each node. For example, the Domain Master may divide the MAC cycle into 2 Contention Free TXOPs (CFTX-OPs) that meet the BATVps requirements for each node. In order to determine where to allocate TXOPs in the MAC cycle, the master node may perform a procedure such as the one described above where a one or more time slots are assigned to each transmitting node and the receiving nodes measure the BATVps. Additionally, or alternatively, a master node may send a message to enter into a diagnostic mode where all time slots are used to measure the BATVps. Note that it may not be possible to use all time slots because the MAP message may require a dedicated time slot and this MAP time slot may not be used for BATVps measurement.

Using the BATVps measurements, a master node can determine the data rate capability of a particular receiving node for each time slot based on a particular transmitting node.

An example of computed data rates that are determined based on BATVps measurements for each node are shown Tables A.2, B.2, C.2.

Time slot 2 is assigned to TXOP1 which allocated to Node A to transmit data to Node B because it meets the 50 Mbps data rate request since it was measured to have a 50 Mbps data rate capability.

Time slot 1 and slot time 3 are assigned to TXOP3 which allocated to Node C to transmit data to Node A because it meets the 120 Mbps data rate request since time slot 1 was measured to have a 30 Mbps capability and time slot 3 was measured to have a 100 Mbps data rate capability.

Using BATVps Information to Diagnose Problems in a Network

The measured BATVps information may also be used to diagnose problems in a network. For example, if a network is experiencing high packet loss or limited coverage, the BATVps information can be used to detect and correct the problem.

In conjunction with the BATV interferer module 540, and one or more of the network performance module 160, mapping module 170, network performance module 200, and mapping module 210, the BATVps may be used to identify a type of interferer. The BATVps information may be used to identify the type of known interferes in the network by comparing the measured BATVps with stored information (stored, for example, in module 150) about the known interference. As an example, if a particular interferer has a known noise profile, such as one stored in the library module 150, in the frequency or time domain, the BATVps information can be used to identify the existence of this type of interferer in the network. For example, the measured BATVtv information could be compared known noise profiles to identify the existence the existence of a type of interferer in the network. Examples of known interferers that could be stored in library module 150 include appliances (dishwashers, dryers, washers, electric ovens, microwaves, etc), light dimmers, transformers, power strips, extension cords, radio interference (e.g. AM, FM, HAM, etc), circuit breakers, missing microfilters, bridged taps, etc.

Information about the known interferers could be stored as models, for example in the library module 150, that are determined from theoretical knowledge of the source of interference, such as radio signals or other electromagnetic waves that ingress or crosstalk onto the wired media. They could also be empirical models that are known to have been transmitted from a certain source such as a type of light dimmer, electrical motor, halogen light, etc. These models could also be stored or downloaded from another location in the network.

The models can be used to identify interference by comparing, for example with the cooperation of the controller 130 and memory 140, measured data with such models. Typically a comparison is made between a measured signal (in either the frequency domain or time domain) and a corresponding candidate model, with the measured signal being identified as the signal whose model it compares most closely to. This is often done using a minimum mean square error measurement of the comparison between the measured data and the model. By identifying the type of interference, it simplifies one's ability to determine a means for overcoming, avoiding or mitigating the interference.

For example, AM radio, FM radio, or other narrowband interference could be identified by analyzing the BATVps information. If, for example, the measured BATV subcarriers around 680 kHz were very low, such as 0 or 1 bit, then this may indicate the AM radio station operating at 680 kHz is causing interference in the network. Alternatively, or additionally, if a home appliance or other device in the home is known to cause interference in a particular frequency band, such as through a comparison with known signatures in the library module 150, the BATVps information can be used to identify the existence of this interferer in the network. If, for example, a home appliance is known to cause interference in the 10-12 MHz frequency band, and the measured BATVps was very low in this region, then the BATVps could be used to identify the existence or type of interferer.

In conjunction with one or more of the mapping module 170 and mapping module 210, the BATVps may also be used to identify the location of an interferer. This could be done by analyzing and/or comparing the BATVps from one or more ports in a network. Alternatively, or additionally, if a home appliance or other device in the home is known to cause interference in a particular frequency band, the BATVps information can be used to identify the existence of this interferer in the network. If, for example, a home appliance is known to cause interference in the 10-12 MHz frequency band, and the measured BATVps for port A located in the living room showed a low BATV in that frequency region, then it could be determined that the home appliance causing interference is located in the living room. More exact location information could be determined using a plurality of ports. For example, if port A and port B are in the living room, and port A shows a large BATV reduction in the 10-12 MHz range, whereas port B shows only a moderate BATV reduction in the 10-12 MHz range, then it could be determined that the interfering appliance is in the living room and closer to port A than port B.

In general, and in cooperation with one or more of the network performance module 160 and network performance module 200, this diagnostic information could be provided to a user, service provider, and/or a technician or a network management system or network operation device that is located inside or outside the network in order to correct the problem. For example, if a network is experiencing problems a user or a service provider or technician could initiate a diagnostic mode to gather the BATVps information. The initiation of the diagnostic mode could be done using test equipment in the home, using a Domain Master or using in a network management system or network operation device that is located inside or outside the network. The output of the diagnostic mode could be a notification that the interfering device has been identified and/or the type of the interfering device and/or the location of the interfering device. This information could be sent to the network management system or network operation device that is located inside or outside the network which could be used by the service provider or utility provider to take corrective actions.

CATps Measurements

A fifth exemplary embodiment of the invention will be discussed in relation to channel attenuation per subcarrier measurements for networks, and in particular, for home or access networks. More specifically, if a network is experiencing high packet loss or limited coverage, the CATps information can be used, in cooperation with the CAT diagnostic module 610, to detect and correct the problem. Additionally, CATps information can be used by, for example, a Domain Master, to optimize or improve network performance. For example if TDMA is used, time slots can be allocated for transmission and/or reception to nodes in the network based on the CATps measurements. For example if FMDA is used, frequency can be allocated for transmission and/or reception to nodes in the network based on the CATps measurements. For example, CATps parameters can be used by a Domain Master to determine the placement and duration of TXOPs in a MAC cycle and determine a Media Access Plan (MAP) as defined, for example, in the draft ITU recommendation G.hn. In conjunction with the CATps measurement module 620, the procedure commences by gathering CATps information in the network at the request of, for example, a user, service provider, another node in a network, a Domain Master, or in general from any location within or outside the communications environment 1. Next, and in cooperation with the CATps message module 600, the Domain Master, another node, or test device within the communications environment 1 sends a message to one or more nodes in the network indicating that CATps measurements are to be made. For example, the information may be sent as part of a MAP message which may be sent every MAC cycle. The message may indicate one or more time slots to be used for making CATps measurements.

For example, all time slots in the MAC cycle may be assigned for making CATps measurements. In some cases, the MAP message may indicate that the network is optionally entering into a diagnostic mode during which one or more time slots may be used to measure the CATps. During this diagnostic mode, the CATps measurements are made for one, more than one, or even all time slots in a MAC cycle. Using a plurality (or all) time slots for measuring the CATps may be helpful when trying to diagnose problems in the network or, for example, when trying to optimize or improve network performance.

Then, during the one or more time slots assigned for making CATps measurements, and in cooperation with the CATps measurement module 620, a transmitting node sends a signal that is used by one or more receiving nodes, such as one or more of nodes 230-260, to make the CATps measurements. For example, and in cooperation with the predefined signal determination and library module 150, a predefined signal may be sent, such as a probe frame, wherein the transmission parameters are known in advance by the receivers. Examples of predefined signals are described herein below. Additionally, or alternatively, a receiver may request a specific predefined signal to be sent by the transmitter. This could be done because receivers may have implemented different algorithms for determining the CATps based on different predefined signals. The receiver could send a message to the transmitter indicating the parameters to be used for the predefined signal, as described below.

The receiving node(s), in cooperation with the CATps data/information collection module 630, then collect the data rate measurements and this information can be optionally transmitted to the Domain Master (or other nodes) in one or more messages. The CATps information may be represented in a format where a CATps measurement is specified for a specific time slot or a plurality of time slots. An example of a CATps parameter for a specific receiving node is shown in Table 1.3, where there are N=4 time slots.

An example of a CATps parameter for a specific receiving node is shown in Table 1.3, where there are N=4 time slots.

TABLE 1.3

Example of CATps information for a receiving node

| Time slot 1 | Time slot 2 | Time slot 3 | Time slot 4 |
|---|---|---|---|
| CAT1 = 20 dB | CAT1 = 45 dB | CAT1 = 42 dB | CAT1 = 19 dB |
| CAT2 = 32 dB | CAT2 = 43 dB | CAT2 = 33 dB | CAT2 = 23 dB |
| ... | ... | ... | ... |
| CATN = 31 dB | CATN = 42 dB | CATN = 43 dB | CATN = 21 dB |

Additionally, or alternatively, the CATps information may be represented in a format where a CATps measurement is specified for a plurality of time slots and a plurality of transmitting nodes. An example of a CATps parameter for a specific receiving node is shown in Table 2.3, where there are N=4 time slots and 3 transmitting nodes.

TABLE 2.3

Example of CATps for a receiving node

| | Time slot 1 | Time slot 2 | Time slot 3 | Time slot 4 |
|---|---|---|---|---|
| Transmitting Node #1 | CAT1 = 20 dB | CAT1 = 45 dB | CAT1 = 42 dB | CAT1 = 19 dB |
| | CAT2 = 32 dB | CAT2 = 43 dB | CAT2 = 33 dB | CAT2 = 23 dB |
| | ... | ... | ... | ... |
| | CATN = 31 dB | CATN = 42 dB | CATN = 43 dB | CATN = 21 dB |
| Transmitting Node #2 | CAT1 = 89 dB | ... | ... | ... |
| | CAT2 = 86 dB | | | |
| | ... | | | |
| | CATN = 99 dB | | | |
| Transmitting Node #3 | CAT1 = 90 dB | ... | ... | ... |
| | CAT2 = 102 dB | | | |
| | ... | | | |
| | CATN = 83 dB | | | |

Examples of Predefined Signal that can be Used for CATps Measurement

Several types of the predefined signals could be used to measure the CATps. For example, in the current G.hn draft, the probe signal is specified as a PRBS modulated signal where the PRBS sequence is not initialized every DMT symbol. This results in a MEDLEY type signal that is different every DMT symbol. While this type of signal is good for measuring CATps with Inter-Symbol Interference (ISI), it may not be the preferred type of signal for determining the CATps in an ISI free environment. For example, a periodic signal without Cyclic Prefix provides an ISI free CATps measurement. This could be accomplished by initializing the PRBS sequence at the beginning of every DMT symbol and then removing the Cyclic Prefix. Alternatively, the maximum allowed CP length could be used to minimize ISI. The receiver could request to configure the following in a predefined signal used for CATps measurement:

PRBS reinitialization,
cyclic prefix length,
window length,
active carriers, and
signal/subcarrier power level.

The predefined signal used for CATps measurement could be determined by the receiver. For example, a message could be sent by the receiver to the transmitter indicating the parameters to be used for the predefined signal. For example, the message could contain a bit field indicating the length of the cyclic prefix and/or the signal or power level of one or more subcarriers for the predefined signal.

Also for example the message could indicate that the PRBS should (or should not) be initialized every symbol and/or that Cyclic should (or should) not be included, etc.

Alternatively, or in addition, the predefined signal described above could be determined by the transmitter. For example, a message could be sent by the transmitter to the receiver indicating a specific type and parameters of predefined signal in a similar manner as for the message sent from the receiver to the transmitter.

Examples of how the CATps can be Used for Determining the Map

As described above, CATps information can be used by a Domain Master to optimize or improve the network performance. For example, the CATps parameters can be used by the Domain Master to determine the placement and duration of TXOPs in a MAC cycle and determine the Media Access Plan (MAP) as defined in G.9960.

Example #1

If there are 3 nodes (Node A, Node B and Node C) in a network with the following CATps requests:

Node A is requesting a 30 Mbps data rate to transmit data to Node B

Node B is requesting a 70 Mbps data rate to transmit data to Node C

Node C is requesting a 10 Mbps date rate to transmit to Node A and Node B

Based on these data rate requirements a master node may determine a MAP that divides the MAC cycle into TXOPs allocated to each node. For example, the Domain Master may divide the MAC cycle into 3 Contention Free TXOPs (CFTX-OPs) that meet the data rate requirements for each node. In order to determine where to allocate TXOPs in the MAC cycle, the master node may perform a procedure such as the one described above where a one or more time slots are assigned to each transmitting node and the receiving nodes measure the CATps. Additionally, or alternatively, a master node may send a message to enter into a diagnostic mode where all time slots are used to measure the CATps. Note that it may not be possible to use all time slots because the MAP message may require a dedicated time slot and this MOP time slot may not be used for CATps measurement.

Using the CATps measurements, a master node can determine the data rate capability of a particular receiving node for each time slot based on a particular transmitting node. For example, the master node could determine the data rate for each node and time slot by performing a Bit Allocation computation where the number of bits that can be transmitted on the subcarriers is determined based on the CATps measurements, the transmission PSD and Bit Error Rate (BER) requirements.

An example of computed data rates that are determined based on CATps measurements for each node are shown Tables A.3, B.3, C.3.

TABLE A.3

Example of computed data rates based on CATps measurement for a receiving node A

|  | Time slot 1 | Time slot 2 | Time slot 3 |
| --- | --- | --- | --- |
| Transmitting Node B | 10 Mbps | 34 Mbps | 50 Mbps |
| Transmitting Node C | 30 Mbps | 15 Mbps | 100 Mbps |

TABLE B.3

Example of computed data rates based on CATps measurement for a receiving node B

|  | Time slot 1 | Time slot 2 | Time slot 3 |
| --- | --- | --- | --- |
| Transmitting Node A | 5 Mbps | 50 Mbps | 20 Mbps |
| Transmitting Node C | 23 Mbps | 5 Mbps | 60 Mbps |

TABLE C.3

Example of computed data rates based on CATps measurement for a receiving node C

|  | Time slot 1 | Time slot 2 | Time slot 3 |
| --- | --- | --- | --- |
| Transmitting Node A | 30 Mbps | 35 Mbps | 10 Mbps |
| Transmitting Node B | 22 Mbps | 76 Mbps | 75 Mbps |

Based on the data rates requirements for each node and the computed data rates in Table A.3, B.3 and C.3, the Domain Master may allocate the time slots as follows:

Time slot 1 is assigned to TXOP1 which allocated to Node C to transmit data to Node B and C because it meets the 10 Mbps data rate request since it was measured to have a 30 and 23 Mbps data rate capability, respectively.

Time slot 2 is assigned to TXOP2 which allocated to Node A to transmit data to Node B because it meets the 30 Mbps data rate request since it was measured to have a 50 Mbps data rate capability.

Time slot 3 is assigned to TXOP3 which allocated to Node B to transmit data to Node C because it meets the 70 Mbps data rate request since it was measured to have a 75 Mbps data rate capability.

Example #2

If there are 3 nodes (Node A, Node B and Node C) in a network with the following CATps requests:

Node C is requesting a 120 Mbps data rate to transmit data to Node A

Node A is requesting a 50 Mbps data rate to transmit data to Node B

Based on these CATps requirements a master node may determine a MAP that divides the MAC cycle into TXOPs allocated to each node. For example, the Domain Master may divide the MAC cycle into 2 Contention Free TXOPs (CFTX-OPs) that meet the CATps requirements for each node. In order determine where to allocate TXOPs in the MAC cycle, the master node may perform a procedure such as the one described above where a one or more time slots are assigned to each transmitting node and the receiving nodes measure the CATps. Additionally, or alternatively, a master node may send a message to enter into a diagnostic mode where all time slots are used to measure the CATps. Note that it may not be possible to use all time slots because the MAP message may require a dedicated time slot and this MOP time slot may not be used for CATps measurement.

Using the CATps measurements, a master node can determine the data rate capability of a particular receiving node for each time slot based on a particular transmitting node.

An example of computed data rates that are determined based on CATps measurements for each node are shown Tables A.3, B.3, C.3.

Time slot 2 is assigned to TXOP2 which allocated to Node A to transmit data to Node B because it meets the 50 Mbps data rate request since it was measured to have a 50 Mbps data rate capability.

Time slot 1 and slot time 3 are assigned to TXOP3 which allocated to Node C to transmit data to Node A because it meets the 120 Mbps data rate request since time slot 1 was measured to have a 30 Mbps capability and time slot 3 was measured to have a 100 Mbps data rate capability.

Using CATps Information to Diagnose Problems in a Network

The measured CATps information may also be used to diagnose problems in a network. For example, if a network is experiencing high packet loss or limited coverage, the SNRps information can be used to detect and correct the problem.

For example, and in cooperation with the CATps interferer module 640, the CATps may be used to identify a type of interferer(s). The CATps information may be used to identify the type of known interferes in the network by comparing the measured CATps with stored information (stored, for example, in module 150) about the known interference. As an example, if a particular interferer has a known impedance, capacitance or transfer function, such as one stored in the library module 150, the CATps information can be used to identify the existence of this type of interferer in the network. For example, the measured CATps information could be compared known impedances, capacitances and/or transfer functions to identify the existence the existence of a known type of interferer in the network. An example of known interferers that could be stored in library module 150 include appliances (dishwashers, dryers, washers, electric ovens, microwaves, etc), light dimmers, transformers, power strips, extension cords, radio interference (e.g., AM, FM, HAM, etc), circuit breakers, missing microfilters, bridged taps, etc.

Information about the known interferers could be stored as models, for example in the library module 150, that are determined from theoretical knowledge of the source of interference, such as radio signals or other electromagnetic waves that ingress or crosstalk onto the wired media. They could also be empirical models that are known to have been transmitted from a certain source such as a type of light dimmer, electrical motor, halogen light, etc. These models could also be stored or downloaded from another location in the network.

The models can be used to identify interference by comparing, for example with the cooperation of the controller 130 and memory 140, measured data with such models. Typically a comparison is made between a measured signal (in either the frequency domain or time domain) and a corresponding candidate model, with the measured signal being identified as the signal whose model it compares most closely to. This is often done using a minimum mean square error measurement of the comparison between the measured data and the model. By identifying the type of interference, it simplifies one's ability to determine a means for overcoming, avoiding or mitigating the interference.

For example, an extension cord or power strip or a transformer could have a transfer function that is known to greatly attenuate the signals in a particular frequency band, for example, frequencies above 10 MHz. In this case, an extension cord or power strip or transformer could be identified, if the CATps shows a large attenuation in that particular frequency band. Alternatively, or additionally, for example a missing microfilter or bridged tap may cause a known impedance mismatch in a particular frequency range. In this case, a missing microfilter or bridged tap could be identified, if the CATps shows the existence of an impedance mismatch in that particular frequency band Optionally, and in cooperation with one or more of the mapping module 170 and/or mapping module 210, the CATps may be used to identify the location of an interferer. This could be done by analyzing and/or comparing the CATps from one or more ports in a network. Alternatively, or additionally, if a home appliance or other device in the home is known to cause interference in a particular frequency band, the CATps information can be used identify the existence of this interferer in the network. If, for example, a power strip or extension cord is known to cause signal attenuation in the 10-30 MHz frequency band, and the measured CATps for port A located in the living room showed a severe signal attenuation in that frequency region, then it can be determined that the power strip or extension causing an interference is located in the living room. More exact location information could be determined using a plurality of ports. For example, if port A and port B are in the living room, and CATps measurements by port A show a large attenuation in the 10-30 MHz range, whereas CATps measurements by port B shows only a moderate attenuation in the 10-30 MHz range, then it could be determined that the interfering power strip or extension cord is in the living room and closer to port A than port B. As discussed, this could be shown either graphically or via textual information in conjunction with the mapping module 170, controller 130, memory 140, and a display.

In general, this diagnostic information could be provided to a user, or a service provider, or a technician or a network management system or network operation device that is located inside or outside the network in order to assist with alleviating the problem. For example, if a network is experiencing problems a user or a service provider or a technician could initiate a diagnostic mode to gather the CATps information. The initiation of the diagnostic mode could be done using test equipment in the home, using a Domain Master or using in a network management system or network operation device that is located inside or outside the network. The output of the diagnostic mode could be a notification that an interfering device has been identified and/or the type of the interfering device and/or the location of the interfering device. This information could be sent to the network management system or network operation device that is located inside or outside the network which could be used by the service provider or utility provider to take corrective actions.

Measuring Over Time and Timestamps

In another exemplary embodiment, at least one of the parameters described above is measured over time to get more than one set of measurements for the at least one parameter. For example, the SNRps could be measured at a first time and then at a second time, and these measurements results could be compared.

In particular, the two (or even more) SNRps measurements results could be stored and compared, in cooperation with one or more of the time-based measurement and comparison module 50, controller 130 and memory 140, to determine if the communications conditions have changed. For example, if the comparison showed that the measured SNR had degraded from first measurement to the second measurement, this could be used to determine that a new interferer was impacting the network. For example, the new interferer could be a new appliance that was recently installed in the home or a new device that was installed without a microfilter. After this, the type and location of the new interferer could be identified as described in detail in methods above. Similar measurements over time and could be done for any one or more of the parameters described above, such as the data rates, BATVps, CATps, etc. In these cases as well, the measurement results could be stored and compared to determine changes in the communications conditions, including the existence, location and type of interferer (using methods described above for each measurement parameter).

In one exemplary embodiment, a measured parameter set (such as SNRps or data rate) has a specific time associated with it, such as a "timestamp," that indicates the day and/or time of day at which the measurement was performed. These timestamps could be used when comparing measured data to determine network issues. For example, SNRps measurements could be done every hour with a timestamp indicating the time of each measurement. These SNRps measurements with different timestamps could be compared. If the comparison showed that SNR measurements during a specific time of day were lower than most other times of day, this could indicate a problem with the network that is time related. For example, the comparison could determine that an interferer is causing problems during these time of the day (for example, an appliance such as washing machine or a heating unit that turns on during certain hours of the day). Additionally the type and location of the interferer could be identified with any of the methods described above. Also, more than one type of measurement parameter could be compared over time to determine problems in the network. For example, SNRps measurements over time could be compared with data rate measurements over time. The comparison could show that while SNRps measurements over time remained the same, the data rate measurements were lower during certain periods of time during day. The low data rate could be attributed to a high packet error rate (PER) which results in packet retransmissions (thereby reducing the effective data rate). Since the SNR measurements showed that the SNR was still good during this time, the high PER can be attributed to some form of impulse noise, which typically causes packet errors without degrading average SNR. Therefore, based on this analysis, it could be determined that during certain times of the day impulse noise was degrading the data rate performance of one or more nodes. The impulse noise could be identified as being from an interferer that causes impulse noise, such as telephone ringing.

QLNps Measurements

Another exemplary embodiment of the invention will be discussed in relation to QLN measurements for networks, and in particular, for home networks or access networks. More specifically, if a network is experiencing high packet loss or limited coverage, the QLN information, in cooperation with the QLN diagnostic module 710, can be used to detect and correct the problem. Additionally, QLN information can be used by, for example, a Domain Master, to optimize, improve or adjust network performance. For example if TDMA is used, time slots can be allocated for transmission and/or reception to nodes in the network based on the QLNps measurements. For example if FMDA is used, frequency can be allocated for transmission and/or reception to nodes in the network based on the QLN measurements. For example, QLN parameters can be used by a Domain Master to determine the placement and duration of TXOPs in a MAC cycle and determine a Media Access Plan (MAP) as defined, for example, in the draft ITU recommendation G.hn. In conjunction with the QLN measurement module 720 and the QLN data collection module 730, the procedure commences by gathering QLN information in the network at the request of, for example, a user, service provider, another node in a network, a Domain Master, or in general from any location within or outside the communications environment 1. Next, and in cooperation with the QLN message module 700, the Domain Master, another node, or test device within the communications environment 1 sends a message to one or more of nodes in the network indicating that QLN (Quit Line Noise) measurements are to be made. For example, the information may be sent as part of a MAP message which may be sent every MAC cycle. The message may indicate one or more time slots to be used for making QLN measurements.

For example, all time slots in the MAC cycle may be assigned for making QLNps measurements. In some cases, the MAP message may indicate that the network is optionally entering into a diagnostic mode during which one or more time slots may be used to measure the QLN. During this diagnostic mode, the QLN measurements are made for one, more than one, or even all time slots in a MAC cycle. Using a plurality (or all) time slots for measuring the QLN may be helpful when trying to diagnose problems in the network or, for example, when trying to optimize or improve network performance.

Then, during the one or more time slots assigned for making QLN measurements, and in cooperation with the QLN measurement module 720, all nodes in the network are silent (not transmitting) for a period of time. The period of time could be the entire time slot or a portion of the time slot.

The receiving node(s), in cooperation with the QLN data collection module 730, then collect the QLNps measurements and this information can be optionally transmitted to the Domain Master (or other nodes and/or the network performance module) in one or more messages, in cooperation with the QLN message module 700. The QLNps information may be represented in a format where a QLN measurement is specified for a specific time slot or a plurality of time slots. An example of a QLNps parameter for a specific receiving node is shown in Table 1.4, where there are N=4 time slots.

TABLE 1.4

Example of QLN information for a receiving node

| Time Slot 1 | Time Slot 2 | Time Slot 3 | Time Slot 4 |
|---|---|---|---|
| $QLN_1 = -100$ | $QLN_1 = -120$ | $QLN_1 = -70$ | $QLN_1 = -90$ |
| $QLN_2 = 90$ | $QLN_2 = -120$ | $QLN_2 = 80$ | $QLN_2 = 100$ |
| ... | ... | ... | ... |
| $QLN_N = -80$ | $QLN_N = -110$ | $QLN_N = 80$ | $QLN_N = -100$ |

Examples of how the QLN can be Used for Determining the MAP

As described above, the QLN information can be used by a Domain Master to optimize or improve network performance. For example, the QLN parameters can be used by the Domain Master to determine the placement and duration of TXOPs in a MAC cycle and determine the Media Access Plan (MAP) as defined in G.9960.

Example #1

There are 3 nodes (Node A, Node B and Node C) in a network with the following QLN requests:

Node A is requesting a 30 Mbps data rate to transmit data to Node B

Node B is requesting a 70 Mbps data rate to transmit data to Node C

Node C is requesting a 10 Mbps date rate to transmit to Node A and Node B

Based on these data rate requirements, a master node may determine a MAP that divides the MAC cycle into TXOPs allocated to each node. For example, the Domain Master may divide the MAC cycle into 3 Contention Free TXOPs (CFTXOPs) that meet the data rate requirements for each node. In order to determine where to allocate TXOPs in the MAC cycle, the master node may perform a procedure such as the one described above where a one or more time slots are assigned to each transmitting node and the receiving nodes measure the QLNps. Additionally, or alternatively, a master node may send a message to enter into a diagnostic mode where all time slots are used to measure the QLNps. Note that it may not be possible to use all time slots because the MAP message may require a dedicated time slot and this MAP time slot may not be used for QLN measurement.

An example of computed data rates that are determined based on QLNps measurements for each node are shown in Tables A.4, B.4, C.4.

TABLE A.4

Example of Computed Data Rates based on QLNps measurement for a receiving node A

|  | Time slot 1 | Time slot 2 | Time slot 3 |
|---|---|---|---|
| Transmitting Node B | 10 Mbps | 34 Mbps | 50 Mbps |
| Transmitting Node C | 30 Mbps | 15 Mbps | 100 Mbps |

TABLE B.4

Example of Computed Data Rates based on QLNps measurement for a receiving node B

|  | Time slot 1 | Time slot 2 | Time slot 3 |
|---|---|---|---|
| Transmitting Node A | 5 Mbps | 50 Mbps | 20 Mbps |
| Transmitting Node C | 23 Mbps | 5 Mbps | 60 Mbps |

TABLE C.4

Example of Computed Data Rates based on QLNps measurement for a receiving node C

|  | Time slot 1 | Time slot 2 | Time slot 3 |
|---|---|---|---|
| Transmitting Node A | 30 Mbps | 35 Mbps | 10 Mbps |
| Transmitting Node B | 22 Mbps | 76 Mbps | 75 Mbps |

Based on the data rate requirements for each node and the computed data rates in Table A.4, B.4 and C.4, the Domain Master may allocate the TXOPs as follows:

Time slot 1 is assigned to TXOP1 which is allocated to Node C to transmit data to Node B and C because it meets the 10 Mbps data rate request since it was measured to have a 30 and 23 Mbps data rate capability, respectively.

Time slot 2 is assigned to TXOP2 which is allocated to Node A to transmit data to Node B because it meets the 30 Mbps data rate request since it was measured to have a 50 Mbps data rate capability.

Time slot 3 is assigned to TXOP3 which is allocated to Node B to transmit data to Node C because it meets the 70 Mbps data rate request since it was measured to have a 75 Mbps data rate capability.

Example #2

There are 3 nodes (Node A, Node B and Node C) in a network with the following data rate requests:

Node C is requesting a 120 Mbps data rate to transmit data to Node A

Node A is requesting a 50 Mbps data rate to transmit data to Node B

Based on these data rate requirements, a master node may determine a MAP that divides the MAC cycle into TXOPs allocated to each node. For example, the Domain Master may divide the MAC cycle into 2 Contention Free TXOPs (CFTX-OPs) that meet the data rate requirements for each node. In order to determine where to allocate TXOPs in the MAC cycle, the master node may perform a procedure such as the one described above where one or more time slots are assigned to each transmitting node and the receiving nodes measure the QLNps. Additionally, or alternatively, a master node may send a message to enter into a diagnostic mode where all time slots are used to measure the QLNps. Note that it may not be possible to use all time slots because the MAP message may require a dedicated time slot and this MAP time slot may not be used for QLN measurement. Using the QLNps measurements, a master node can determine the data rate capability of a particular receiving node for each TXOP based on a particular transmitting node. An example of computed data rates that are determined based on QLNps measurements for each node are shown Tables A.4, B.4, C.4.

Based on the data rate requirements for each node and the measured QLNps in Table A, B and C, the Domain Master may allocate the TXOPs as follows:

Time slot 2 is assigned to TXOP1 which allocated to Node A to transmit data to Node B because it meets the 50 Mbps data rate request since it was measured to have a 50 Mbps data rate capability.

Time slot 1 and slot time 3 are assigned to TXOP3 which allocated to Node C to transmit data to Node A because it meets the 120 Mbps data rate request since time slot 1 was measured to have a 30 Mbps capability and time slot 3 was measured to have a 100 Mbps data rate capability.

Time slot 3 is assigned to TXOP3 which is allocated to Node C to transmit data to Node A because it meets the 95 Mbps data rate request since it was measured to have a 100 Mbps data rate capability.

Using SNRps Information to Diagnose Problems in a Network

The measured QLNps information may also be used to diagnose problems in a network. For example, if a network is experiencing high packet loss or limited coverage, the SNRps information can be used to detect and correct the problem.

For example, and in cooperation with the QLN interferer module 740 and/or 199, the QLNps may be used to identify a type of interferer(s). The QLNps information may be used to identify the type of known interferes in the network by comparing the measured QLNps with stored information (stored, for example, in module 150) about the known interference. As an example, if a particular interferer has a known noise profile, such as one stored in the library module 150, in the frequency or time domain, the QLNps information can be used to identify the existence of this type of interferer in the network. For example, the measured QLNps information could be compared known noise profiles to identify the existence the existence of a known type of interferer in the network. Example of known interferers that could be stored in library module 150 include appliances (dishwashers, dryers, washers, electric ovens, microwaves, etc), light dimmers, transformers, power strips, extension cords, radio interference (e.g. AM, FM, HAM, etc), circuit breakers, missing microfilters, bridged taps, etc.

Information about the known interferers could be stored as models, for example in the library module 150, that are determined from theoretical knowledge of the source of interference, such as radio signals or other electromagnetic waves that ingress or crosstalk onto the wired media. They could also be empirical models that are known to have been transmitted from a certain source such as a type of light dimmer, electrical motor, halogen light, etc. These models could also be stored or downloaded from another location in the network.

The models can be used to identify interference by comparing, for example with the cooperation of the controller 130 and memory 140, measured data with such models. Typically a comparison is made between a measured signal (in either the frequency domain or time domain) and a corresponding candidate model, with the measured signal being identified as the signal whose model it compares most closely to. This is often done using a minimum mean square error measurement of the comparison between the measured data and the model.

By identifying the type of interference, it simplifies one's ability to determine a means for overcoming, avoiding or mitigating the interference.

For example, AM radio, FM radio or other narrowband interference could be identified by analyzing the QLNps information. If, for example, the measured QLN of subcarriers around 680 kHz was very high, such as −60 dBm/Hz, then this may indicate an AM radio station operating at 680 kHz is causing interference in the network. Alternatively, or additionally, if a home appliance or other device in the home is known to cause interference in a particular frequency band, with for example, the corresponding signature stored in the library module 150, the QLNps information can be used to identify the existence of this interferer in the network through a comparison of the type of interference to known signatures in the library module 150. If, for example, a home appliance, such as a dishwasher, is known to cause interference in the 10-12 MHz frequency band, and the measured QLNps was very high in this region, then the QLNps could be used to identify the existence and/or type of interferer.

Optionally, and in cooperation with one or more of the mapping modules 170 and mapping module 210, the QLNps information may be used to identify the location of an interferer. This could be done by analyzing the QLNps from one or more ports in a network. Alternatively, or additionally, if a home appliance or other device in the home is known to cause interference in a particular frequency band, the QLNps information can be used identify the existence of this interferer in the network. If, for example, a home appliance is known to cause interference in the 10-12 MHz frequency band and the measured QLNps for port A located in the living room showed a high QLN in that frequency region, then it can be determined that the home appliance causing an interference is located in the living room. More exact location information could be determined using a plurality of ports. For example, if port A and port B are in the living room, and port A shows a high QLN in the 10-12 MHz range, whereas port B shows only a moderate QLN in the 10-12 MHz range, then it could be determined that the interfering appliance is in the living room and closer to port A than port B. As discussed, this could be shown either graphically or via textual information in conjunction with the mapping module 170/210, controller 130, memory 140, and a display.

In general, this diagnostic information could be provided to a user, or a service provider, or a technician or a network management system or network operation device that is located inside or outside the network in order to assist with alleviating the problem. For example, if a network is experiencing problems a user or a service provider or a technician could initiate a diagnostic mode to gather the QLNps information. The initiation of the diagnostic mode could be done using test equipment in the home, using a Domain Master or using in a network management system or network operation device that is located inside or outside the network. The output of the diagnostic mode could be a notification that an interfering device has been identified and/or the type of the interfering device and/or the location of the interfering device. This information could be sent to the network management system or network operation device that is located inside or outside the network which could be used by the service provider or utility provider to take corrective actions.

NLNps Measurements

Another exemplary embodiment of the invention will be discussed in relation to non-linear noise measurements for networks, and in particular, for home networks or access networks. More specifically, if a network is experiencing high packet loss or limited coverage, the NLN information, in cooperation with the NLN diagnostic module 810, can be used to detect and correct the problem. Additionally, NLN information can be used by, for example, a Domain Master, to optimize network performance. For example if TDMA is used, time slots can be allocated for transmission and/or reception to nodes in the network based on the NLN measurements. For example if FMDA is used, frequency can be allocated for transmission and/or reception to nodes in the network based on the NLN measurements.

For example, NLN parameters can be used by a Domain Master to determine the placement and duration of TXOPs in a MAC cycle and determine a Media Access Plan (MAP) as defined, for example, in the draft ITU recommendation G.hn. In conjunction with the NLN measurement module 104 and NLN data collection module 830, the procedure commences by gathering NLN information in the network at the request of, for example, a user, service provider, another node in a network, a Domain Master, or in general from any location within or outside the communications environment 1. Next, and in cooperation with the NLN message module 800, the Domain Master, another node, or test device within the communications environment 1 sends a message to one or more of nodes in the network indicating that NLN measurements are to be made. For example, the information may be sent as part of a MAP message which may be sent every MAC cycle. The message may indicate one or more time slots to be used for making NLN measurements.

For example, all time slots in the MAC cycle may be assigned for making non-linear noise measurements. In some cases, the MAP message may indicate that the network is optionally entering into a diagnostic mode during which one or more time slots may be used to measure the NLN. During this diagnostic mode, the NLNps measurements are made for one, more than one, or even all time slots in a MAC cycle. Using a plurality (or all) time slots for measuring the NLNps may be helpful when trying to diagnose problems in the network or, for example, when trying to optimize or improve network performance.

Then, during the one or more time slots assigned for making NLN measurements, and in cooperation with the NLN measurement module 820, a transmitting node sends a signal that is used by one or more receiving nodes, such as one or more of nodes 230-260, to make the NLNps measurements. For example, and in cooperation with the predefined signal determination and library module 150, a predefined signal may be sent, such as a probe frame, wherein the transmission parameters are known in advance by the receivers. Examples of predefined signals are described herein below. Additionally, or alternatively, a receiver may request a specific predefined signal to be sent by the transmitter. This could be done because receivers may have implemented different algorithms for determining the NLNps based on different predefined signals. The receiver could send a message to the transmitter indicating the parameters to be used for the predefined signal, as described below.

The receiving node(s), in cooperation with the NLN data collection module 106, then collect the NLNps measurements and this information can be optionally transmitted to the Domain Master (or other nodes and/or the network performance module) in one or more messages. The NLNps information may be represented in a format where a NLNps measurement is specified for a specific time slot or a plurality of time slots. An example of a NLNps parameter for a specific receiving node is shown in Table 1.5, where there are N=4 time slots.

TABLE 1.5

Example of NLNps information for a receiving node in dBm/Hz

| Time Slot 1 | Time Slot 2 | Time Slot 3 | Time Slot 4 |
|---|---|---|---|
| $NLN_1 = -100$ | $NLN_1 = -130$ | $NLN_1 = -120$ | $NLN_1 = -80$ dB |
| $NLN_2 = -120$ | $NLN_2 = -130$ | $NLN_2 = -110$ | $NLN_2 = -103$ dB |
| ... | ... | ... | ... |
| $NLN_N = -114$ | $NLN_N = -131$ | $NLN_N = -122$ | $NLN_N = -130$ dB |

Additionally, or alternatively, the NLNps information may be represented in a format where a NLNps measurement is specified for a plurality of time slots and a plurality of transmitting nodes. An example of a NLN parameter for a specific receiving node is shown in Table 2.5, where there are N=4 time slots and 3 transmitting nodes.

TABLE 2.5

Example of NLNps for a receiving node

| | Time Slot 1 | Time Slot 2 | Time Slot 3 | Time Slot 4 |
|---|---|---|---|---|
| Transmitting Node #1 | $NLN_1 = -100$<br>$NLN_2 = -120$<br>...<br>$NLN_N = -114$ | $NLN_1 = -130$<br>$NLN_2 = -130$<br>...<br>$NLN_N = -131$ | $NLN_1 = -120$<br>$NLN_2 = -110$<br>...<br>$NLN_N = -122$ | $NLN_1 = -80$<br>$NLN_2 = -103$<br>...<br>$NLN_N = -130$ |
| Transmitting Node #2 | $NLN_1 = -130$<br>$NLN_2 = -132$<br>...<br>$NLN_N = -310$ | ... | ... | ... |
| Transmitting Node #3 | $NLN_1 = -80$<br>$NLN_2 = -86$<br>...<br>$NLN_N = -87$ | ... | ... | ... |

Examples of Predefined Signal that can be Used for NLNps Measurement

Several types of the predefined signals could be used to measure the NLNps. For example, a signal with only a subset of the subcarriers could be used for transmission (i.e., only a subset of carrier would have transmission power or energy). These subcarriers could be modulated with a PRBS sequence or sent as pure tones (un-modulated). The remaining subcarriers would be inactive (no transmission energy or power). This type of signal is effective in measuring non-linear noise because non-linear devices or components generate energy in frequency other than those that were used to stimulate the device.

For example, a single subcarrier can be use as the predefined signal. In this case only one subcarrier has energy and all other subcarriers are disabled (no transmission energy). In the case of a nonlinearity, the received signal includes not only a component at the frequency of the transmitted subcarrier, but also at integer multiples of the transmitted subcarrier frequency (also known as harmonic frequencies). An example of an NLNps parameter for a specific receiving node is shown in Table 3.5, where there are N=4 time slots and 3 transmitting nodes. In this example only the 10th subcarrier was transmitted by each transmitting node. By looking at the harmonic frequencies of the transmitted frequency (e.g. the 20th subcarrier and the 30th subcarrier) the following is observable:

The receiving node measured high NLNps for all time slots when receiving the predefined signal from Transmitting Node #1.

The receiving node measured (or virtually no) NLNps for all time slots when receiving the predefined signal from Transmitting Node #2.

The receiving node measured high NLNps for time slot when receiving the predefined signal from Transmitting Node #3. But the other TXOPs had virtually no NLNps.

TABLE 3.5

Example of NLNps for a receiving node

| | Time Slot 1 | Time Slot 2 | Time Slot 3 | Time Slot 4 |
|---|---|---|---|---|
| Transmitting Node #1 | ...<br>$NLN_{10} = -50$<br>$NLN_{11} = -100$<br>$NLN_{12} = -101$<br>...<br>$NLN_{19} = -100$<br>$NLN_{20} = -60$<br>$NLN_{21} = -102$<br>$NLN_{11} = -104$<br>- - -<br>$NLN_{30} = -65$<br>$NLN_{31} = -100$<br>...<br>$NLN_N = -114$ | ...<br>$NLN_{10} = -55$<br>$NLN_{11} = -100$<br>$NLN_{12} = -101$<br>...<br>$NLN_{19} = -100$<br>$NLN_{20} = -64$<br>$NLN_{21} = -102$<br>$NLN_{11} = -104$<br>- - -<br>$NLN_{30} = -75$<br>$NLN_{31} = -100$<br>...<br>$NLN_N = -114$ | ...<br>$NLN_{10} = -40$<br>$NLN_{11} = -100$<br>$NLN_{12} = -101$<br>...<br>$NLN_{19} = -100$<br>$NLN_{20} = -44$<br>$NLN_{21} = -102$<br>$NLN_{11} = -104$<br>- - -<br>$NLN_{30} = -48$<br>$NLN_{31} = -100$<br>...<br>$NLN_N = -114$ | ...<br>$NLN_{10} = -50$<br>$NLN_{11} = -100$<br>$NLN_{12} = -101$<br>...<br>$NLN_{19} = -100$<br>$NLN_{20} = -60$<br>$NLN_{21} = -102$<br>$NLN_{11} = -104$<br>- - -<br>$NLN_{30} = -65$<br>$NLN_{31} = -100$<br>...<br>$NLN_N = -114$ |
| Transmitting Node #2 | ...<br>$NLN_{10} = -55$<br>$NLN_{11} = -100$<br>$NLN_{12} = -101$<br>...<br>$NLN_{19} = -100$ | ...<br>$NLN_{10} = -55$<br>$NLN_{11} = -100$<br>$NLN_{12} = -101$<br>...<br>$NLN_{19} = -100$ | ...<br>$NLN_{10} = -55$<br>$NLN_{11} = -100$<br>$NLN_{12} = -101$<br>...<br>$NLN_{19} = -100$ | ...<br>$NLN_{10} = -55$<br>$NLN_{11} = -100$<br>$NLN_{12} = -101$<br>...<br>$NLN_{19} = -100$ |

TABLE 3.5-continued

Example of NLNps for a receiving node

|  | Time Slot 1 | Time Slot 2 | Time Slot 3 | Time Slot 4 |
|---|---|---|---|---|
| | $NLN_{20} = -102$ | $NLN_{20} = -103$ | $NLN_{20} = -102$ | $NLN_{20} = -100$ |
| | $NLN_{21} = -102$ | $NLN_{21} = -102$ | $NLN_{21} = -102$ | $NLN_{21} = -102$ |
| | $NLN_{11} = -104$ | $NLN_{11} = -104$ | $NLN_{11} = -104$ | $NLN_{11} = -104$ |
| | --- | --- | --- | --- |
| | $NLN_{30} = -104$ | $NLN_{30} = -105$ | $NLN_{30} = -100$ | $NLN_{30} = -102$ |
| | $NLN_{31} = -100$ | $NLN_{31} = -100$ | $NLN_{31} = -102$ | $NLN_{31} = -100$ |
| | ... | ... | ... | ... |
| | $NLN_N = -114$ | $NLN_N = -114$ | $NLN_N = -114$ | $NLN_N = -114$ |
| Transmitting Node #3 | ... | ... | ... | ... |
| | $NLN_{10} = -55$ | $NLN_{10} = -55$ | $NLN_{10} = -55$ | $NLN_{10} = -55$ |
| | $NLN_{11} = -100$ | $NLN_{11} = -100$ | $NLN_{11} = -100$ | $NLN_{11} = -100$ |
| | $NLN_{12} = -101$ | $NLN_{12} = -101$ | $NLN_{12} = -101$ | $NLN_{12} = -101$ |
| | ... | ... | ... | ... |
| | $NLN_{19} = -100$ | $NLN_{19} = -100$ | $NLN_{19} = -100$ | $NLN_{19} = -100$ |
| | $NLN_{20} = -101$ | $NLN_{20} = -64$ | $NLN_{20} = -104$ | $NLN_{20} = -104$ |
| | $NLN_{21} = -102$ | $NLN_{21} = -102$ | $NLN_{21} = -102$ | $NLN_{21} = -102$ |
| | $NLN_{11} = -104$ | $NLN_{11} = -104$ | $NLN_{11} = -104$ | $NLN_{11} = -104$ |
| | --- | --- | --- | --- |
| | $NLN_{30} = -102$ | $NLN_{30} = -75$ | $NLN_{30} = -103$ | $NLN_{30} = -104$ |
| | $NLN_{31} = -100$ | $NLN_{31} = -100$ | $NLN_{31} = -100$ | $NLN_{31} = -100$ |
| | ... | ... | ... | ... |
| | $NLN_N = -114$ | $NLN_N = -114$ | $NLN_N = -114$ | $NLN_N = -114$ |

Alternatively, or in addition, two subcarriers can be use as the predefined signal. In this case two subcarrier have energy and all other subcarriers are disabled (no transmission energy). In the case of a nonlinearity, the received signal includes not only components at the frequencies of the transmitted subcarriers but also at integer multiples of the transmitted subcarrier frequencies and also at inter-modulation products of the transmitted frequencies, also referred to as sum-and-difference frequencies. Inter-modulation products occur as sums-and-differences of integer multiples of the transmitted frequencies. In this case, NLNps will be seen at multiples of the transmitted frequencies but also at the inter-modulation products.

Alternatively, or in addition, unlike the example shown in Table 3.5, the NLNps can be measured and recorded only for the transmitted subcarrier frequency and the harmonic subcarrier frequencies (not all the subcarrier frequencies). This has the benefit of reducing the memory (storage) requirements for the NLNps parameter.

Alternatively, or in addition, unlike the example shown in Table 3.5, the NLNps can be measured and recorded only for the transmitted subcarrier frequency, the harmonic subcarrier frequencies and the inter-modulation products (not all the subcarrier frequencies). This has the benefit of reducing the memory (storage) requirements for the NLNps parameter.

The predefined signal used for NLNps measurement could be determined by the receiver. For example, a message could be sent by the receiver to the transmitter requesting a specific type of predefined signal. For example the message could indicate any number of the following:
  subcarrier indexes to be transmitted,
  number of subcarriers to be transmitted,
  whether to modulate the subcarriers with a PRBS or send them as pure unmodulated tones,
  PRBS reinitialization at the beginning of each symbol,
  where a cyclic prefix should be included or not,
  cyclic prefix length,
  window length, and
  signal/subcarrier power level.

Alternatively, or in addition, the predefined signal described above could be determined by the transmitter. For example, a message could be sent by the transmitter to the receiver indicating a specific type of predefined signal.

Examples of how the NLNps can be Used for Determining the Map

As described above, NLNps information can be used by a Domain Master to optimize or improve network performance. For example, the NLNps parameters can be used by the Domain Master to determine the placement and duration of TXOPs in a MAC cycle and determine the Media Access Plan (MAP) as defined in G.9960.

Example #1

There are 3 nodes (Node A, Node B and Node C) in a network with the following data rate requests:
  Node A is requesting a 30 Mbps data rate to transmit data to Node B
  Node B is requesting a 70 Mbps data rate to transmit data to Node C
  Node C is requesting a 10 Mbps date rate to transmit to Node A and Node B Based on these data rate requirements, a master node may determine a MAP that divides the MAC cycle into TXOPs allocated to each node. For example, the Domain Master may divide the MAC cycle into 3 Contention Free TXOPs (CFTX-OPs) that meet the data rate requirements for each node. In order to determine where to allocate TXOPs in the MAC cycle, the master node may perform a procedure such as the one described above where a one or more time slots are assigned to each transmitting node and the receiving nodes measure the NLNps. Additionally, or alternatively, a master node may send a message to enter into a diagnostic mode where all time slots are used to measure the NLNps. Note that it may not be possible to use all time slots because the MAP message may require a dedicated time slot and this MAP time slot may not be used for NLNps measurement. Using the NLNps measurements, a master node can determine the data rate capability of a particular receiving node for each time slot based on a particular transmitting node.

An example of computed data rate based on NLNps for each node is shown in Tables A.5, B.5, C.5.

TABLE A.5

Example of computed data rates based on NLNps measurement for a receiving node A

|  | Time Slot 1 | Time Slot 2 | Time Slot 3 |
|---|---|---|---|
| Transmitting Node B | 10 Mbps | 34 Mbps | 50 Mbps |
| Transmitting Node C | 30 Mbps | 15 Mbps | 100 Mbps |

TABLE B.5

Example of computed data rates based on NLNps measurement for a receiving node B

|  | Time Slot 1 | Time Slot 2 | Time Slot 3 |
|---|---|---|---|
| Transmitting Node A | 5 Mbps | 50 Mbps | 20 Mbps |
| Transmitting Node C | 23 Mbps | 5 Mbps | 60 Mbps |

TABLE C.5

C Example of computed data rates based on NLNps measurement for a receiving node C

|  | Time Slot 1 | Time Slot 2 | Time Slot 3 |
|---|---|---|---|
| Transmitting Node A | 30 Mbps | 35 Mbps | 10 Mbps |
| Transmitting Node B | 22 Mbps | 76 Mbps | 75 Mbps |

Based on the data rate requirements for each node and the computed data rates in Table A.5, B.5 and C.5, the Domain Master may allocate the TXOPs as follows:

Time slot 1 is assigned to TXOP1 which is allocated to Node C to transmit data to Node B and C because it meets the 10 Mbps data rate request since it was measured to have a 30 and 23 Mbps data rate capability, respectively.

Time slot 2 is assigned to TXOP2 which is allocated to Node A to transmit data to Node B because it meets the 30 Mbps data rate request since it was measured to have a 50 Mbps data rate capability.

Time slot 3 is assigned to TXOP3 which is allocated to Node B to transmit data to Node C because it meets the 70 Mbps data rate request since it was measured to have a 75 Mbps data rate capability.

Example #2

There are 3 nodes (Node A, Node B and Node C) in a network with the following data rate requests:

Node C is requesting a 120 Mbps data rate to transmit data to Node A

Node A is requesting a 50 Mbps data rate to transmit data to Node B

Based on these data rate requirements, a master node may determine a MAP that divides the MAC cycle into TXOPs allocated to each node. For example, the Domain Master may divide the MAC cycle into 2 Contention Free TXOPs (CFTX-OPs) that meet the requirements for each node. In order to determine where to allocate TXOPs in the MAC cycle, the master node may perform a procedure such as the one described above where one or more time slots are assigned to each transmitting node and the receiving nodes measure the data rate. Additionally, or alternatively, a master node may send a message to enter into a diagnostic mode where all time slots are used to measure the NLNps. Note that it may not be possible to use all time slots because the MAP message may require a dedicated time slot and this MAP time slot may not be used for NLNps measurement.

Using the NLNps measurements, a master node can determine the data rate capability of a particular receiving node for each TXOP based on a particular transmitting node.

An example of computed data rates that are determined based on NLNps measurements for each node are shown Tables A.5, B.5, C.5.

Based on the data rate requirements for each node and the computed data rates in Table A.5, B.5 and C.5, the Domain Master may allocate the TXOPs as follows:

Time slot 2 is assigned to TXOP1 which allocated to Node A to transmit data to Node B because it meets the 50 Mbps data rate request since it was measured to have a 50 Mbps data rate capability.

Time slot 1 and slot time 3 are assigned to TXOP3 which allocated to Node C to transmit data to Node A because it meets the 120 Mbps data rate request since time slot 1 was measured to have a 30 Mbps capability and time slot 3 was measured to have a 100 Mbps data rate capability.

Using NLNps Information to Diagnose Problems in a Network

As previously discussed, the NLNps measurements may also be used to identify the location and/or type of one or more non-linear device, component or in general any non-linear interferer(s). Specifically, the NLNps may be used to identify a type of non-linear device, component or in general any non-linear interferer. As an example, if a particular non-linear interferer has a known noise profile in the frequency or time domain, the NLNps info can be used to identify the existence of this interferer in the network.

Examples of known non-linear interferers that could be stored in library module 150 include appliances (dishwashers, dryers, washers, electric ovens, microwaves, etc), light dimmers, transformers, power strips, extension cords, radio interference (e.g., AM, FM, HAM, etc), circuit breakers, missing microfilters, bridged taps, etc.

Information about the known interferers could be stored as models, for example in the library module 150, that are determined from theoretical knowledge of the source of interference, such as radio signals or other electromagnetic waves that ingress or crosstalk onto the wired media. They could also be empirical models that are known to have been transmitted from a certain source such as a type of light dimmer, electrical motor, halogen light, etc. These models could also be stored or downloaded from another location in the network.

The models can be used to identify interference by comparing, for example with the cooperation of the controller 130 and memory 140, measured data with such models. Typically a comparison is made between a measured signal (in either the frequency domain or time domain) and a corresponding candidate model, with the measured signal being identified as the signal whose model it compares most closely to. This is often done using a minimum mean square error measurement of the comparison between the measured data and the model. By identifying the type of interference, it simplifies one's ability to determine a means for overcoming, avoiding or mitigating the interference.

For example, if a home appliance or other device in the home is known to cause non-linear noise in a particular frequency band, the NLNps info can be used to identify the existence of this interferer in the network. If for example, a home appliance is known to cause non-linear in the 10-12 MHz frequency band and the measured NLNps was very high in this region, then the NLNps could be used to identify the existence or type of interferer.

The NLNps may also be used to identify the location of a non-linear device, component or in general any non-linear interferer. For example, and in cooperation with the NLN interferer module 840/198, this could be done by analyzing and/or comparing the measured NLNps from one or more ports in the network. Alternatively, or additionally, if a home appliance or other device in the home is known to cause non-linear interference in a particular frequency band, the NLNps info can be used to identify the existence of this interferer in the network. If for example, a home appliance is known to cause non-linear noise in the 10-12 MHz frequency band and the measured NLNps for Port A located in the living room showed a high NLN in that frequency region, then it could be determined that the home appliance causing interference is located in the living room. More exact location information could be determined using a plurality of ports. For example, if Port A and Port B are in the living room, and Ports A shows a high NLN in the 10-12 MHz range, whereas Port B shows only a moderate NLN in the 10-12 MHz range, then it could be determined that the interfering appliance is in the living room and closer to Port A than Port B.

In general, this diagnostic information could be provided to a user, or a service provider or a technician in order to correct the problem. For example, if a network is experiencing problems a user or a service provider or a technician could initiate a diagnostic mode to gather the NLNps information. The output of the diagnostic mode could be a notification that a non-linear interfering device has been identified and/or the type of the interfering device and/or the location of the interfering device.

More exact location information could be determined in conjunction with the mapping module 170 or 210, using a plurality of ports. For example, if port A and port B are in the living room, and port A shows a high NLNps, whereas port B shows only a moderate NLNps, then it could be determined that the interfering appliance is in the living room and closer to port A than port B.

In general, this diagnostic information could also be provided to a user, service provider, or technician or other node in the network or a network management system or network operation device that is located inside or outside the network in order to assist with correcting the problem(s). For example, if a network is experiencing problems a user or service provider or technician could initiate a diagnostic mode to gather the NLNps information. The output of the diagnostic mode could be a notification that an interfering device has been identified and/or the type of the interfering device and/or the location of the interfering device.

Packets Transmitted and PER

In addition to the measured parameters described above, other parameters may be measured or determined in cooperation with the parameter/test module 880. For example, the number of packets being transmitted over the network between nodes over time may be measured or detected. For example, the test module 880 could measure the number of packets being transmitter over the network per second (or any other time period) over an entire day (or any other time period). Alternatively, or additionally, the packets error rate (PER) of packets being transmitted over the network between nodes over time may be measured or detected. The packet error rate is often defined as the ratio of the number of packets received in error over the total number of packets received—but any other metric that is used to determine packet error rate could be used. For example, the device could measure the packet error rate of the network per second (or any other time period) over an entire day (or any other time period). The packet error rate could be determined passively by the one or more devices in the network by monitoring the number of packets being transmitted and/or the number of packets that are being retransmitted (indicating an error in a previously transmitted packet) and/or the number of positive acknowledgments (indicating a packet was received correctly) and/or the number of negative acknowledgments (indicating a packet was not received correctly). For example, the PER may be calculated as PER=NRP/NTP, wherein NRP is the number of retransmitted packets and NTP is the number of packets transmitted in the network. Alternatively, the PER may be calculated as PER=(NPT−NPA)/NTP, wherein NPA is the number of positive acknowledgements and NTP is the number of packets transmitted in the network. Alternatively, the PER may be calculated as PER=NNA/NTP, wherein NNA is the number of negative acknowledgements and NTP is the number of packets transmitted in the network.

Fault and Loop Length/Bridged Tap Detection

In addition to using the measured parameter(s) to determine the type and/or location of interferers, any one or more of the parameters described herein may be used, in cooperation with the test module 880, to determine the type and/or location of a fault in the network. For example the parameters may be used to detect faults such as bad slices, shorts, opens, unshielded wires, bad electrical outlets, lossy cable splitters, broken/bent fiber line and, in general, any characteristics of the channel that is degrading performance. The presence of bad splices (or improperly grounded or terminated devices) may be determined using the measured NLN data because these faults typically have non-linear responses. After the fault or interferer was detected a technician or user could be instructed to fix the problem in order to improve the network performance. In addition to using the measured parameters to determine the type and/or location of interferers any one or more parameters described herein may be use to determine the lengths of communication lines (e.g., loop length in phone lines) and/or topology (e.g., bridged tap location and/or length). For example, models exist for the response of telephone wires, electrical wires, optical fiber or coax cable to certain known signals as function of length of the medium, presence of bridged taps, bends or bad splices, wire gauge, optical fiber diameter, etc. Using these models, which could be stored in the library module 150, the test module 880 cooperating with the controller 130 and memory 140, can compare measured response data from a medium with unknown characteristics (e.g., length, gauge, etc.) and determine these parameters by comparing with the model data in the library module 150. This approach can be used for determining static channel characteristics and using this information to better determine means to reliably utilize the communications channel. This information can also be used to repair aspects of the static channel in order to improve communications characteristics such as data rate or error rates.

The measurements described herein may be performed using a dual ended test, i.e., where a transmitting transceiver transmits signals to a receiving transceiver (as described above) or may be performed using a single ended test, i.e., where a transceiver simultaneously sends and receives signals to perform measurements of the channel. In the case of single ended test, a device may transmit a signal and measure (or detect) the received signal as a reflection or echo of the transmitted signal. This type of single ended measurement could be used to measure the non-linear noise as described above. For example, a signal with only a subset of the subcarriers (i.e., only a subset of carriers would have transmission power or energy) could be transmitted and received by a device in a single-ended test. These subcarriers could be modulated with a PRBS sequence or sent as pure tones (unmodulated). The remaining subcarriers could be inactive (no transmission energy or power). This type of signal is effective in measuring non-linear noise because non-linear devices or components generate energy in frequencies other than those that were used to stimulate the device. For example, a single subcarrier can be use as the transmitted signal. In this case only one subcarrier has energy and all other subcarriers are disabled (no transmission energy). In the case of a nonlinearity, the received echo signal includes not only a component at the frequency of the transmitted subcarrier, but also at integer multiples of the transmitted subcarrier frequency (also known as harmonic frequencies). In general, any of the methods for measuring SNR, data rate, BATps, CATps, NLNps, etc. as described herein and shown in FIGS. 3-6 and 10 may be performed as a single-ended test where the transmitting node that transmits the signal used for measurement and the receiving node that receives the signal for measurement is actually the same node.

Rate Reduction

In another exemplary embodiment, the measured data can be used to determine or estimate, with the cooperation of the test module 880, the data rate loss ("Rate Reduction) due to the faults or interferers which are identified as described above. For example, it could be determined how much data rate was decreased due to the fault or interferer and therefore how much the data rate could increase if the fault was fixed or interferer was removed from the network. The data rate reduction could be done, for example, by estimating how much the SNR would increase if the fault or interferer was removed from the network. One method for estimating the SNR increase is to estimate the noise caused by the interferer or fault using, for example, the QLN measurement. Using this noise estimate in combination with, for example, the SNRps and/or CATps measurement, a new SNRps could determined, wherein this new SNRps reflects the estimated SNRps if the interferer or fault was removed from the network.

PER Impact

In another exemplary embodiment, the measured data can be used to determine or estimate, with the cooperation of the test module 880, the PER impact of the faults or interferers which are identified as described above. For example, it could be determined what the PER would be if the fault was fixed or the interferer was removed ('PER Impact"). The PER impact could be determined by estimating how much the SNR would increase if the fault was fixed or the interferer was removed.

Use of Test Results to Set Up New Test Plans

A consequence of test measurements can be the decision to take new measurements to better identify the location or impact of an interferer. For example, stored QLNps measurements may show the presence of an interferer on a certain link in the home network from previous tests. By identifying the link where the interference was identified, and with the cooperation of the test module 800 and one or more other measurement modules, new test(s) can be set up over links that are in proximity to the link that was interfered with. These new tests can also be set to occur with a greater frequency of occurrence than the prior tests to better identify the frequency of occurrence of the interference, and can be dynamic and performed iteratively. For example, multiple QLNps measurements can be repeated at periodic intervals on the link that was previously interfered with as well as other link(s) that are geographically near to the interfered link. The resulting data can be stored and analyzed, with the cooperation of the memory 140 and test module 880, to determine the location of the source of the interference and the frequency of occurrence of the interference. For example, the interference could be the result of a garage door opener that opens at certain times during the day (when occupants enter or leave the house in the morning and evening) and this could be identified.

In general, based upon either raw or analyzed data it may be decided that additional test(s) should be run to either i) better identify the location of a problem or (ii) better identify the time or frequency of occurrence. These additional tests may be "smart tests" where multiple tests are run at the same time out of different nodes to triangulate the presence of an issue— or time scheduled tests out of a node (where the timing is specifically chosen to determine a problem, e.g., multiple tests very close to each other in time to detect the frequency of occurrence of a disturber with better resolution), or a combination of both multiple nodes and multiple times.

Using the Measured Parameters to Generate a Map

In another exemplary embodiment, one or more of the measured parameters described above are used to determine, in cooperation with the map generation module 75, a detailed topological map of the network. For example, the CATps and/or SNRps measurements could be used to generate a map of the network topology that indicates the location of nodes in the network and the relation (e.g., distance) between these nodes. For example, the CATps could be used to determine distance between nodes and the CATps of a plurality of nodes could be compared to determine the topological relationship between these nodes. For example, the CATps could be used to determine a transfer function and the transfer functions from different nodes could be compared to determine where these nodes are located in the map.

The map could be displayed as a 2 dimensional (or even 3 dimensional) map with nodes and their connections clearly displayed. Each connection and/or node could be shown in the map with information regarding the measured parameters. The location and type of Interferes and faults could also be identified shown in the map. The determination of the location and type of the interferer and/or fault could be done with any of the methods described above. For example, the interferer and/or fault could have a time dependency (i.e., occur at certain instances in time) and this could be identified using the plurality of measurements with timestamps as described above. The map could also indicate measurements for the number of packets and PER, as described above (or in general any one or more of the measurements/parameters described herein), for different nodes, connections (in general any location(s) on the map). The map could also indicate the rate reduction due to interferers and/or faults detected in the network. The map information could be provided to a user, or a service provider, or a technician or a network management system or network operation device that is located inside or outside the network. An example map is shown in FIG. 8.

Figure 8:
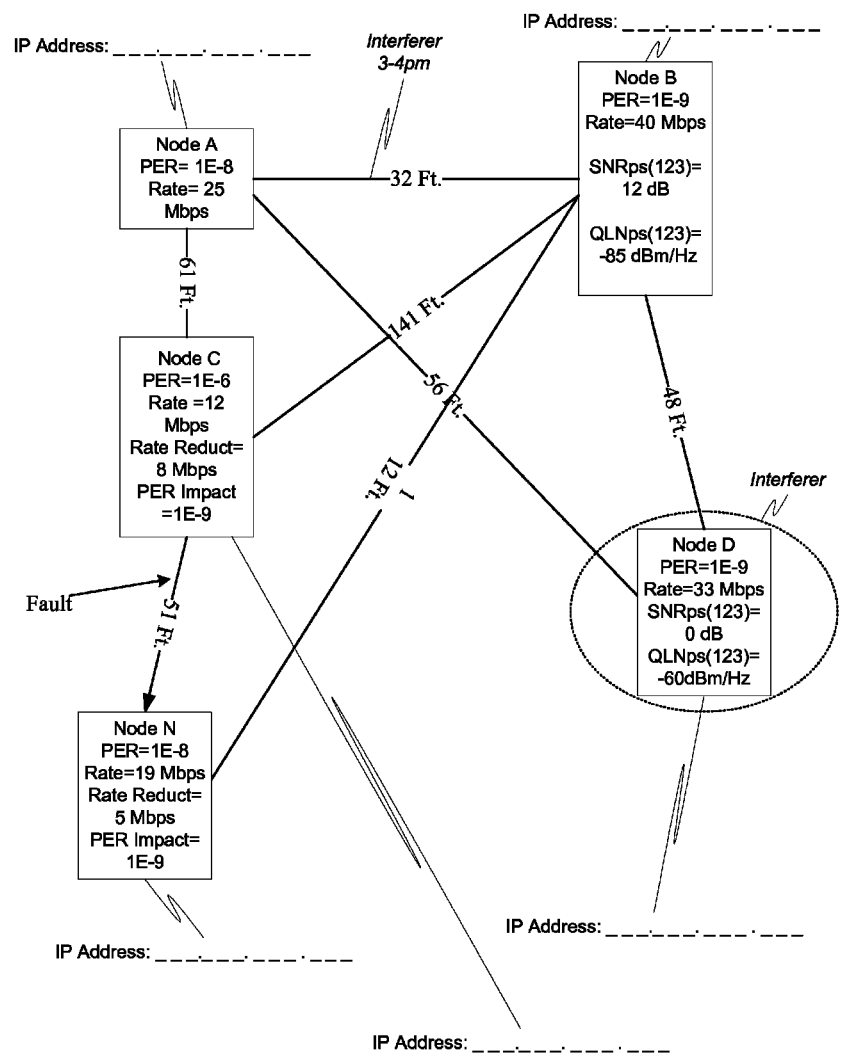
FIG. 8 illustrates an exemplary network topology map according to this invention.

In the example in FIG. 8, the methods described herein were used to determine the characteristics of topology of the network such as the distance between nodes and the location of the nodes in the network. Additionally, parameters such as PER, data rate, SNRps, QLNps, rate reduction, PER increase, etc, were measured or determined and displayed for a one or more nodes in the network. Analyses of these parameters were used to determine problems in the network such as Node C and Node N are near a fault that was detected using the methods described herein. Node C has a Rate Reduction of 8 Mbps due to the fault, which means that if the fault was fixed the data rate of Node C would increase by 8 Mbps, from 12 Mbps to 20 Mbps. Additionally, Node C has a PER Impact of $1E-9$ due to the fault, which means that if the fault was fixed the data rate of Node C would increase from $1E-6$ to $1E-9$. Likewise, Node N has a Rate Reduction of 5 Mbps due to the fault, which means that if the fault was fixed the data rate of Node C would increase by 5 Mbps, from 19 Mbps to 24 Mbps.

Additionally, Node N has a PER Impact of 1E−9 due to the fault, which means that if the fault was fixed the data rate of Node C would increase from 1E−8 to 1E−9. Node D and Node B are near an interferer that was detected using the methods described herein. The SNRps measured in Node D shows that the SNR of subcarrier #123 is very low (0 db) indicating that than interferer is located at this frequency (e.g., a radio frequency interferer). Additionally, the QLNps measured in Node D shows that the QLN of subcarrier #123 is very high (−60 dBm/Hz) which also indicated that interferer is located at this frequency. In addition, the SNRps measured in Node B shows that the SNR of subcarrier #123 is lower than expected (12 db) indicating that than interferer is located at this frequency (e.g., a radio frequency interferer). Additionally, the QLNps measured in Node B shows that the QLN of subcarrier #123 is higher than expected (−85 dBm/Hz) which also indicated that interferer is located at this frequency. Since Node D is more impacted by the interferer than Node B, it is determined that the interferer is closer to Node B. Additionally, while not shown in the figure, rate reduction and PER impact values could be determined for Node B and Node C to estimate the rate decrease due to the interferer.

Intentional Crosstalk Generation

In another exemplary embodiment, a device (such as a signal generator cooperating with the test module 880) is capable of intentionally generating crosstalk that is used to diagnose and/or test the network. For example, a network may be experiencing problems (e.g., high PER or low data rate) and a measurement (e.g., QLN) may used to detect and measure the characteristics of the crosstalk signal causing these problems. This crosstalk signal may be intermittent and it may not be apparent where it is from, but it has been observed. Based on these measurements, the device may transmit a signal that has characteristics that are similar to the measured crosstalk signal in order to analyze the impact of this signal on the network. In effect, the device is intentionally causing the same crosstalk on the network as was measured before. The benefit of this approach is that it enables the analysis of the problem in the network in a controlled and managed manner. These methods also may be combined with any of the methods described herein for measuring crosstalk between media types. For example, the crosstalk signal may be transmitted on one media type (e.g., power line network) and the impact may be determined on another media type (e.g., phone line network). These methods may be implemented in a Domain Master because this device may be connected to multiple media types and may have the processing capability to measure the crosstalk signals and generate the signal that is transmitted to generate the intentional crosstalk.

Use of Third Party Data in Determining the Home Network Environment

The home networking channel is challenging because it can involve multiple media types, multiple nodes, interference from signals intended for the home network, interference from signals or devices not intended for the home network (e.g., radio signals, electrical motors, light dimmers, other network(s), other ingress noise, etc.), and interference from signals on an adjacent home network. The home network typically utilizes the electrical wires in the home or business and therefore is also potentially subjected to any activity on the electrical grid. Often this activity is scheduled or periodic in nature and knowledge of this activity from the power utility (the "third party") can help the network performance module 160/200 manage home networking reliability. If the timing of the occurrence of meter reading signals, or more generally of any maintenance or billing activities, relating to the power service to the home is known, this information can be utilized by the Domain Master in its management of the home network.

Other third party data that is useful is maintenance of the cable network by the cable company, knowledge of construction or remodeling activities in locations that share the electrical grid with the home network.

Handheld and Dedicated Test Devices (Including Smart Grid Applications)

In another exemplary embodiment, any of the embodiments, methods, systems and examples described herein are implemented in a portable test device, such as a handheld test device, or an installed test device that, for example, occupies a dedicated spot in the network. Any one or more of the modules in FIG. 1 and FIG. 11 and any one of the methods described herein may be contained, implemented and/or performed in these types of devices. The handheld device may be used by service provider technician or a user/consumer to detect problems and/or improve the performance of a network.

The installed test device may occupy (or be installed in) a dedicated spot in the network and may be used to monitor and diagnose the network over long periods of time. The data measured by these devices may be collected over time using, for example, timestamps as described above. The information from this devices may also be stored and used to determine network issues (e.g., detect problems or how to improve performance) by analyzing and comparing the measurement data collected over time (as described above).

In another exemplary embodiment, a plurality of installed test devices may be installed in dedicated locations in the network. The information from these devices may be stored and used to determine network issues (e.g., problems or how to improve performance) by analyzing and comparing the measurement data from different devices installed in different locations that have been collected over time (as described above). The portable handheld devices and/or installed test devices may be probing the channel by sending signals as described in any of the methods described herein to measure, for example, data rate, SNRps, CATps, NLNps, etc. The portable handheld devices and/or installed test devices may be passive and just monitor the network by measuring for example, the QLN measurements, number of packet transmitted, PER, as described above.

As described above, a plurality of test devices may be installed in a different locations in the network and this may help in measuring parameters such as the number of packers being transmitted and/or the PER because it is often the case that a single device in a network cannot see (or correctly receive/decode) packets being transmitted by certain other devices in the network because, for example, they are too far away. This is particularly applicable to the Smart Grid network case where power lines are connecting nodes (e.g., devices, homes, structures, plants, distribution centers, etc.) that are at large distances from one another. In one exemplary embodiment, test devices are installed in a plurality of power outlets in a Smart Grid network. These power outlets may be in different structures (e.g., homes, apartments, businesses, etc.) and may gather data as described above. The data may be gathered passively or by probing the channel as described above. The measured data could then be transmitted (in messages) to a Domain Master or a central support or management system (or operation) at the power company or any entity that is managing and/or monitoring the Smart Grid network. The information could be transmitted from the test device to the central support system using the power line itself (i.e., power line communications). Additionally, or alternatively, the information could be transmitted from the test device to the central support/management system using wireless communications and/or coaxial cable communications and/or phoneline communications and/or fiber optic communications. The data from the plurality of test devices could be stored and analyzed to compare information from different devices in order to determine the characteristics of the smart grid network. For example, the data could be used to generate a map of the Smart Grid network using the methods described above for using test parameters to determine the type and/or location of nodes, interferers and faults in a network. Additionally information could be stored and analyzed about the network that may not come from the measurements described above. This additional information could be provided/downloaded by third parties (as described above) such as a power company data about meter reading or load usage in our area, or network maintenance info that may be happening in our neighborhood (e.g. the power or phone or cable company is replacing equipment or upgrading systems). This information could be used to make further determinations about the network characteristics and/or map.

Network Environmental State

In another exemplary embodiment, the parameters described herein (measured parameters and/or additional parameter provided by third parties) are stored, analyzed and compared, with the cooperation of a network performance module 160/200, to derive a "network environmental state"—that indicates how the network has behaved over time, and in particular, what network characteristics have changed over time. Based upon this, it can be determined what portions of the network are prone to environmental challenges or times that portions of the network or the whole network may be prone to environmental challenges. This "state" can be analogized to a diagram of the network that varies with time, and may provide characteristics for one or more links in the network relating to static channel characteristics (loop length, losses from bad splices, etc.) and dynamic environmental characteristics (from disturbers, crosstalk, ingress, etc.) over time. This diagram may be combined with any of the features of the network topology map described herein. Utilizing this diagram, the best case, average case and worst case "link" (or channel) characteristics can be determined (where link is the combination of static channel and dynamic environment) for each pair of nodes in the network. The worst case assumptions (based on historical or predictive models) for the link characteristics can be used in order to communicate with the highest level of immunity to potential impairments. This way, for example, the network could always provide a certain guaranteed level of performance (or QOS), such a guaranteed PER, latency or data rate. Alternatively, a greater than worst case assumption (e.g., a best case assumption) for the link characteristics can be used in order to provide higher network performance (e.g., data rate and coverage) but with more risk of more network problems. In this case, the network could operate at high data rate or low PER at certain times of the day but may suffer from low data rate or high PER when the channel is degraded due to dynamic impairments, such as crosstalk or radio ingress.

Predictions Regarding Interference on a Link Based on Observations from Other Links The home network or electrical grid can be envisioned as a plurality of links between nodes. These are either in a star configuration, a daisy chain configuration or a combination of both. Links are often subjected to the same interference sources, whether these are crosstalk or other disturbances. With the cooperation of the network performance module 160/200 and memory 140, a database of impairments or interference can be created for certain links, making it possible to predict the interference or impairment environment for other links that have not yet been tested. This is especially true for links that are in close proximity to one another, links that have similar physical characteristics (such as wire gauge, amount of insulation, etc) and links that are connected to the same or like devices (e.g., two links that are each connected to the same type of electric motor, such as, a certain model refrigerator—one located in the kitchen and a second located in a garage). By observing and determining interference and impairments on link set x, it is possible to predict such characteristics for link y—where y and x are sets of one or more different links in the home network or electric grid.

Knowledge of Building Codes

Electrical wires in a home are installed according to building codes, which dictate, among other things, the location of plugs within rooms, the distance of plugs from the floor, the location of circuit breakers, etc. Knowledge of these codes is useful in determining the likely map of a home network (as described above). In the situation where the electrical network blueprint for a specific home is available, it can be made available to the Domain Master to assist in managing the home network. In the instances where it is not available, knowledge of building code rules can help increase the likelihood of predicting a more accurate map of the links in the home network. In particular, certain network configurations that are not allowed by the code can be eliminated as candidate links. This is also true of the electric grid outside the home.

Various Types of Electrical Wiring within the Home

It is to be understood that as referred to herein, electrical wiring or electric wires within the home, includes all such wiring, including AC wiring, DC wiring, heating ventilation and air conditioning (HVAC) wiring that controls the heating and air conditioning in the home, electrical wires associated with alarm systems, low voltage wires, and in general any wire(s) within or connecting the building. Some of these networks may be DC networks and may only provide connectivity between a limited number of potential nodes in the home. Any AC or DC wiring network is considered a viable medium for all relevant aspects of this invention.

Using the Measured Parameters and/or Map to Take Actions

In another exemplary embodiment, the information from the measured parameters and/or the map could be used by the network performance module 160/200 for a number of reasons and/or actions including:

1. Taking actions to improve performance of the network. Network performance (e.g., data rate, packet error rate, coverage) could be improved by analyzing the measured parameters and/or map and determining interferers, nodes or even portions of network that are causing problems and removing or isolating the interferers from the network. For example, if an identified interferer was an appliance, the appliance could be identified in the map and moved to a different location in the network (where it would do less harm). Alternatively, a microfilter or some other device could be placed between the network and the interfering device to reduce the interference levels. As another example, examining of the map and the measured parameters could show that in a particular portion of a network, such as a specific geographical region or city or neighborhood in a Smart Grid network, many nodes had very poor performance (low SNRps, data rate, etc.) due to high noise interference (e.g., from an environmental condition or accident or intentional attack or any emergency situation). In this case, actions could be taken to isolate the portion of the network experiencing the high noise interference from remainder of the network in order to prevent the high noise interference from entering (or spreading to) the remainder of the network. For example, switches could be put in place to remove portions of the network in case of such an emergency situation.

2. Predicting future problems or threats in the network. Future problems or threats could be predicted by identifying current trends in changes of network performance. For example, examining of the map and the measured parameters could show that in a particular portion of a network, such as a specific geographical region or city or neighborhood in a Smart Grid network, certain nodes were starting to have poor performance (low SNRps, data rate etc) due to high noise interference (e.g., from an environmental condition or accident or intentional attack, or the like). In this case, actions could be taken to reduce the spreading of the performance degradation to other nodes. For example, actions could be taken to isolate faulty nodes from other nodes in the network.

3. Qualifying and/or offering new or future service: The measured parameters and/or map could also be analyzed to determine how to qualify or offer new services. For example, a service provider could use measured parameters and/or map to offer new services to residential or business customers. The data rate information (with or without measured parameters) could be used to determine whether a particular node or customer is capable of supporting a new higher data rate service such as video (e.g., IPTV). In this case the, service provider could use this information and offer the new service to the customer.

4. Determining the viability of and/or offering new or future applications: The measured parameters and/or map could be analyzed to determine how to qualify or offer new applications. For example, a consumer electronics manufacturer could use measured parameters and/or map in a consumer electronics products (HW and/or SW) to offer new applications to consumers. For example, the data rate information (with or without measured parameters) could be used to determine whether a particular node or network is capable of supporting a new higher data rate application, such as gaming or video sharing. In this case the, consumer electronics device could use this information and indicate to the consumer that the new application is possible thereby encouraging the consumer to purchase new consumer electronics products (hardware and/or software).

Measurement Selection

Figure 2:
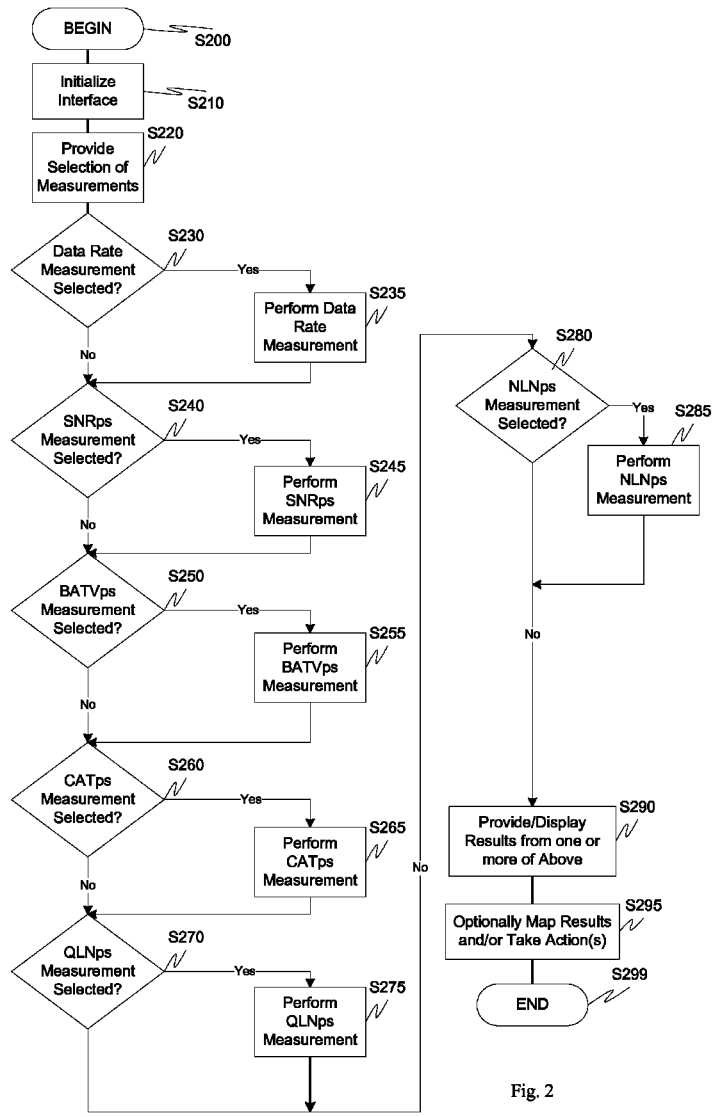
FIG. 2 illustrates an exemplary method for performing diagnostics according to this invention.

FIG. 2 illustrates an exemplary method for performing measurements and/or diagnostics in a network environment. While FIG. 2 shows a sequence of steps, it is understood that only a subset of these steps may be performed and that the order of these steps could change. In particular, control begins in step S200 and continues to step S210. In step S210, an interface is initialized. For example, this interface can be on a dedicated test and/or measurement device, displayed in association with a Domain Master, on a computing device associated with a modem or transceiver, such as a PC, on a network management system or network operation device that is located inside or outside the network or the like. Next, in step S220, a selection of measurement techniques are provided on the interface. Then, in steps S230-S285, the various measurement techniques (as described above) can be selected and performed by, for example, a user, a technician, or the like.

More specifically, in step S230, a determination is made whether a data rate measurement technique has been selected. If data rate has been selected, control continues to step S235 where the data rate measurement is performed. Control then continues to step S240.

In step S240, a determination is made whether an SNR measurement technique has been selected. If an SNR measurement technique has been selected, control continues to step S245 where the SNR measurement is performed. Control then continues to step S250.

In step S250, a determination is made whether a bit allocation value measurement technique has been selected. If a bit allocation value measurement has been selected, control continues to step S255 where the bit allocation value measurement is performed. Control then continues to step S260.

In step S260, a determination is made whether a channel attenuation measurement has been selected. If a channel attenuation measurement has been selected, control continues to step S265 where the channel attenuation measurement is performed. Control then continues to step S270.

In step S270, a determination is made whether a QLNps measurement has been selected. If a QLNps measurement has been selected, control continues to step S275 where the QLNps measurement is performed. Control then continues to step S280.

In step S280, a determination is made whether a nonlinear noise measurement has been selected. If a nonlinear noise measurement has been selected, control continues to step S285 where the nonlinear noise measurement is performed. Control then continues to step S290.

In step S290, one or more of the measurement results can be one or more of provided and/or displayed to, for example, a user, another node, a technician, and/or a network performance module. Next, is step S295, and as discussed above in relation to the interferer detection, the results can optionally be correlated to a map, where this map provide information about the type and/or location of an interferer in the network, and this map provided to, for example, one or more of a user, technician, or the like. As discussed herein, these results can also be used as the basis for taking one or more actions. Control then continues to step S299 where the control sequence ends.

Data Rate Measurement

Figure 3:
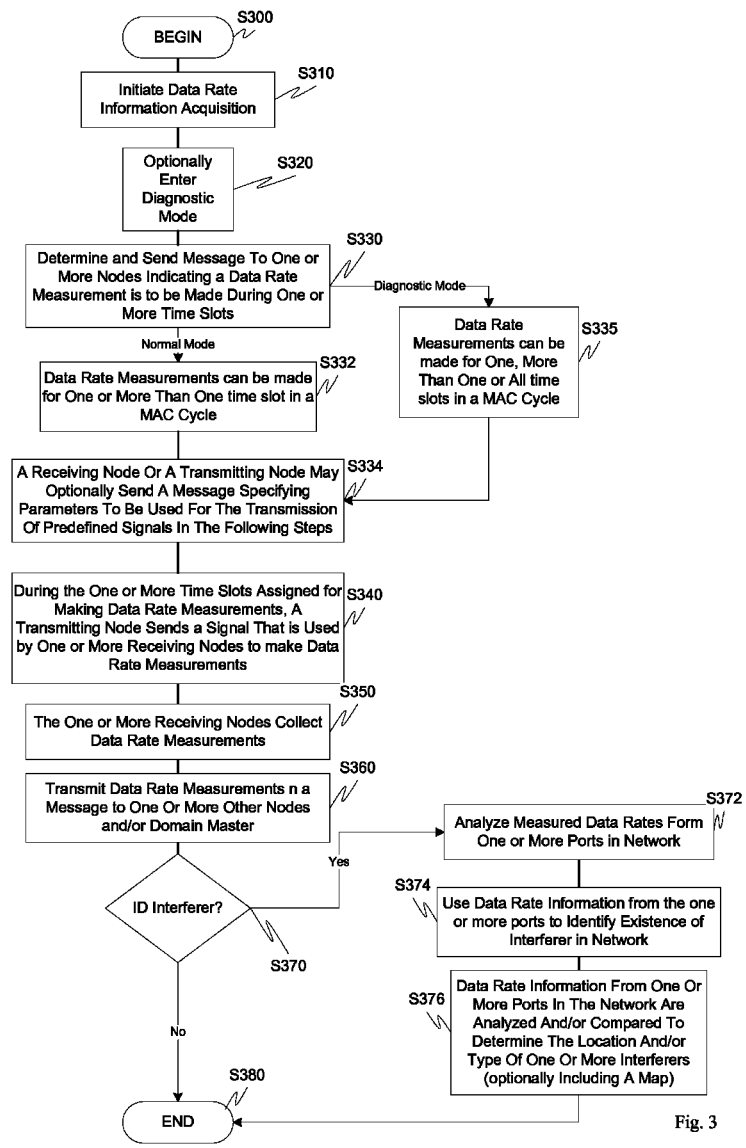
FIG. 3 is a flowchart illustrating an exemplary method for data rate measurements according to this invention.

FIG. 3 outlines an exemplary method for data rate measurements according to an exemplary embodiment of this invention. While FIG. 3 shows a sequence of steps, it is understood that only a subset of these steps may be performed and that the order of these steps could change. Control begins in step S300 and continues to step S310. In step S310, data rate information acquisition is initiated. Then, in step S320, a determination is made whether an optional diagnostic mode should be entered. Then, in step S330, a message is determined and sent to one or more nodes, the message indicating a data rate measurement is to be made during one or more time slots. If the optional diagnostic mode was entered, control continues to step S335, where the data measurements can be made for one, more than one, or all time slots in a MAC cycle. If the optional diagnostic mode was not selected, control continues to step S332, where the data measurements can be made for one or more than one time slot(s) in a MAC cycle. Then, in step S334 a receiving node or a transmitting node may send a message specifying parameters to be used for the transmission of predefined signals in the following steps. Alternatively, step S334 may be bypassed. Control then continues to step S340.

In step S340, during the one or more time slots assigned for making data rate measurements, a transmitting node sends a signal that is used by one or more receiving nodes to make data rate measurements. The signal may be a predefined signal as described above. Next, in step S350, the one or more receiving nodes collect data rate measurements, then in step S360, the data rate measurements are transmitted in a message to one or more other nodes and/or a Domain Master. The message information may be represented in a format where a data rate measurement is specified for a specific time slot or a plurality of time slots. Control then continues to step S370.

In step S370, a determination is made whether an interferer(s) should be identified. As discussed above, it should be appreciated that this procedure can be performed anywhere within or outside the communications environment once the data rate measurements have been received. If an interferer(s) is to be identified, control continues to step S372 where the measured data rates from the one or more ports in the network are analyzed. Next, in step S374, the data rate information from the one or more ports is used to identify the existence of one or more interferers in the network. Then, in step S376, the data rate information from one or more ports in the network are analyzed and/or compared to determine the location and/or type of one or more interferers (optionally including a map). Control then continues to step S380 where the control sequence ends.

SNRps Measurement

Figure 4:
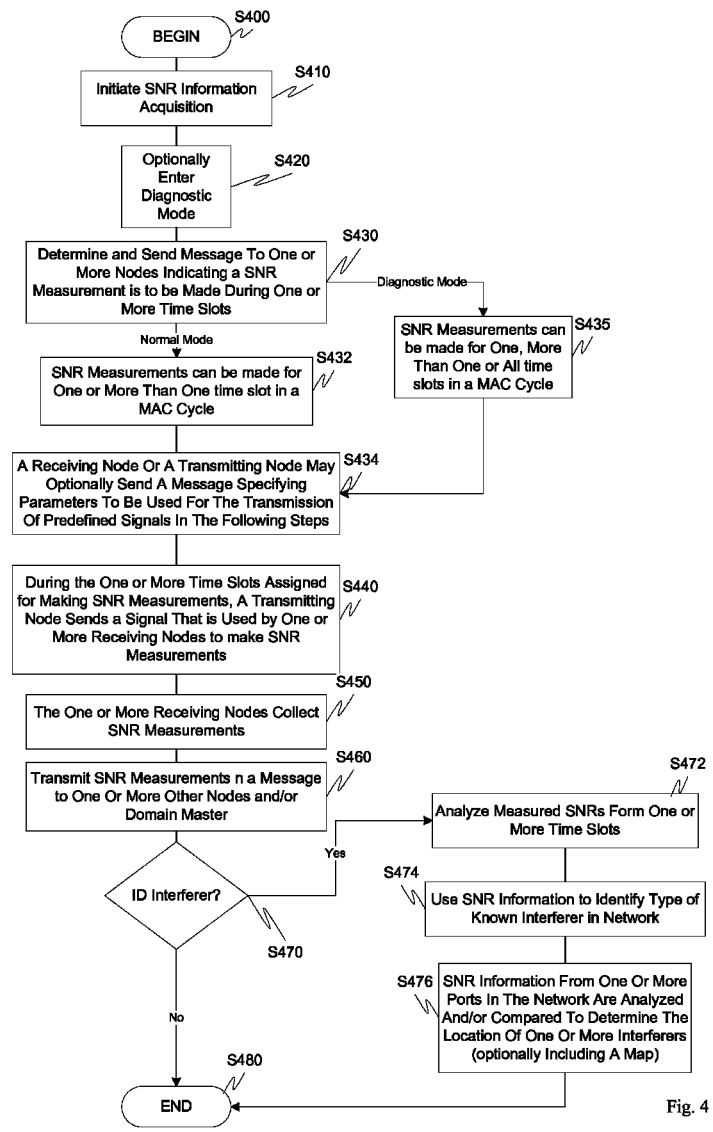
FIG. 4 is a flowchart illustrating an exemplary method for signal-to-noise ratio per subcarrier measurements according to this invention.

FIG. 4 illustrates an exemplary method for performing signal-to-noise ratio measurements according to this invention. While FIG. 4 shows a sequence of steps, it is understood that only a subset of these steps may be performed and that the order of these steps could change. In particular, control begins in step S400 and continues step S410. In step S410, SNRps information acquisition is initiated. Then, in step S420, a determination is made whether an optional diagnostic mode should be entered. Next, in step S430, a message is determined and sent to one or more nodes indicating a SNRps measurement is to be made. If the optional diagnostic mode is to be entered, control continues to step S435 where the SNRps measurements can be made for one, more than one, or all time slots in a MAC cycle. If the optional diagnostic mode is not entered, control continues to step S432 where the SNRps measurements can be made for one or more than one time slot(s) in a MAC cycle. Optionally in step S434 a receiving node or a transmitting node may send a message specifying parameters to be used for the transmission of predefined signals in the following steps. Control then continues to step S440.

In step S440, during the one or more time slots assigned for making SNRps measurements, a transmitting node sends a signal that is used by one or more receiving nodes to make the SNRps measurements. The signal may be a predefined signal as described above. Control then continues to step S450.

In step S450, the one or more receiving nodes of the signal in step S440 collect the SNRps measurements. Then, in step S460, the SNRps measurements are transmitted in a message to one or more other nodes and/or a Domain Master. The message information may be represented in a format where a SNRps measurement is specified for a specific time slot or a plurality of time slots. Control then continues to step S470.

In step S470, a determination is made whether one or more interferers should be identified. As will be appreciated, this determination can be performed anywhere or outside within the communications environment once the SNRps measurements have been received. If one or more interferers are to be identified, control continues to step S472. In step S472, measured SNRps measurements from one or more time slots are analyzed to identify the existence of an interferer in the network. Next, in step S474, the SNRps information is used to identify the type of known interferes in the network by comparing the measured SNRps with stored information about the known interference (such as a noise profiles). Then, in step S476, the SNRps from one or more ports in the network are analyzed and/or compared to determine the location of one or more interferers (optionally including a map). Control then continues to step S480 where the control sequence ends.

BATVps Measurement

Figure 5:
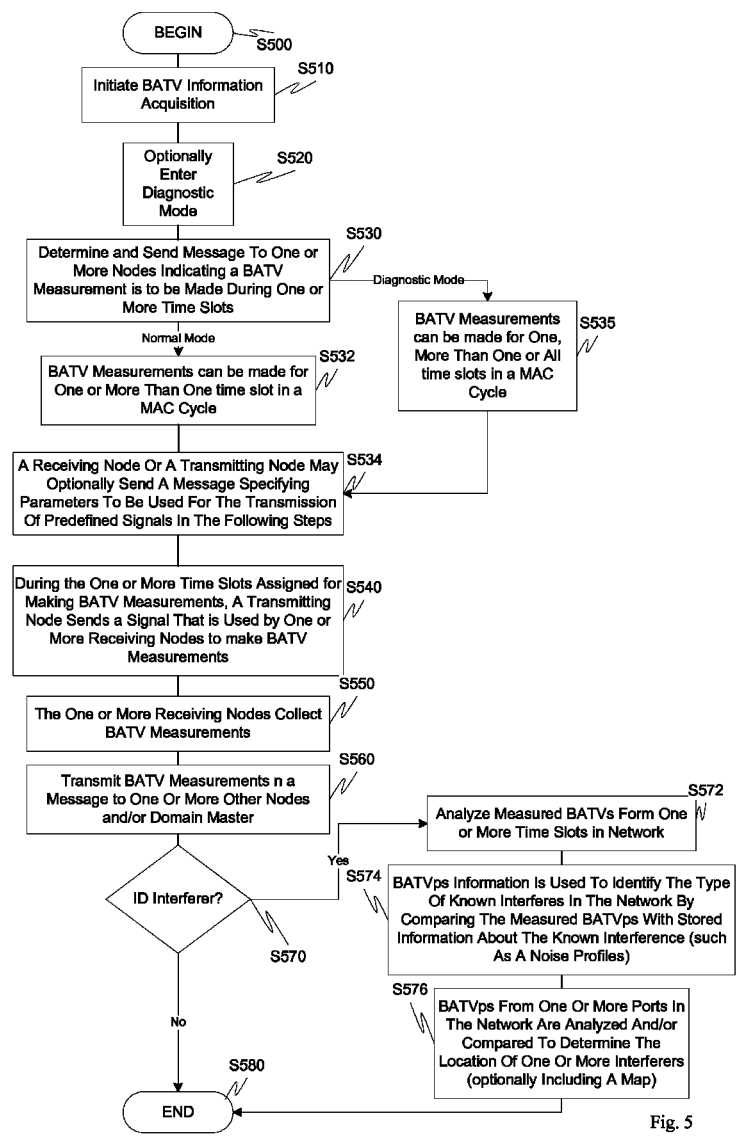
FIG. 5 is a flowchart outlining an exemplary method for bit allocation value per subcarrier measurements according to this invention.

FIG. 5 outlines an exemplary method for making bit allocation value measurements according to this invention. While FIG. 5 shows a sequence of steps, it is understood that only a subset of these steps may be performed and that the order of these steps could change. In particular, control begins in step S500 and continues step S510. In step S510, BATVps information acquisition is initiated. Then, in step S520 an optional diagnostic mode can be entered. Control then continues to step S530.

In step S530, a message is determined and sent to one or more nodes, the message indicating that BATVps measurements are to be made. Control then continues to step S530.

If the diagnostic mode is optionally entered, control continues to step S535 where the BATVps measurements can be made for one, more than one, or all time slots in a MAC cycle. If the diagnostic mode is not entered, control continues to step S532 where the BATVps measurements can be made for one or more than one time slot(s) in a MAC cycle. Then in step S534 a receiving node or a transmitting node may optionally send a message specifying parameters to be used for the transmission of predefined signals in the following steps. Control then continues to step S540.

In step S540, during the one or more time slots assigned for making BATVps measurements, a transmitting node sends a signal that is used by one or more receiving nodes to make the BATVps measurements. The signal may be a predefined signal as described above. Next, in step S550, the one or more receiving nodes collect the BATVps measurements. Then, in step S560, the BATVps measurements are transmitted in a message to one or more other nodes and/or a Domain Master. The message information may be represented in a format where a SNRps measurement is specified for a specific time slot or a plurality of time slots. Control then continues to step S570.

In step S570, a determination is made whether one or more interferes should be identified. As discussed, this procedure can be performed anywhere within or outside the communications network, provided the BATVps measurements are available. If an identification of interfere(s) is desired, control continues to step S572. In step S572, the BATVps measurements from one or more time slots are analyzed to identify the existence of interfere(s) in the network. Next, in step S574, the BATVps information is used to identify the type of known interferes in the network by comparing the measured BATVps with stored information about the known interference (such as a noise profiles). Then, in step S576, the BATVps from one or more ports in the network are analyzed and/or compared to determine the location of one or more interferers (optionally including a map). Control then continues to step S580 where the control sequence ends.

CATps Measurement

Figure 6:
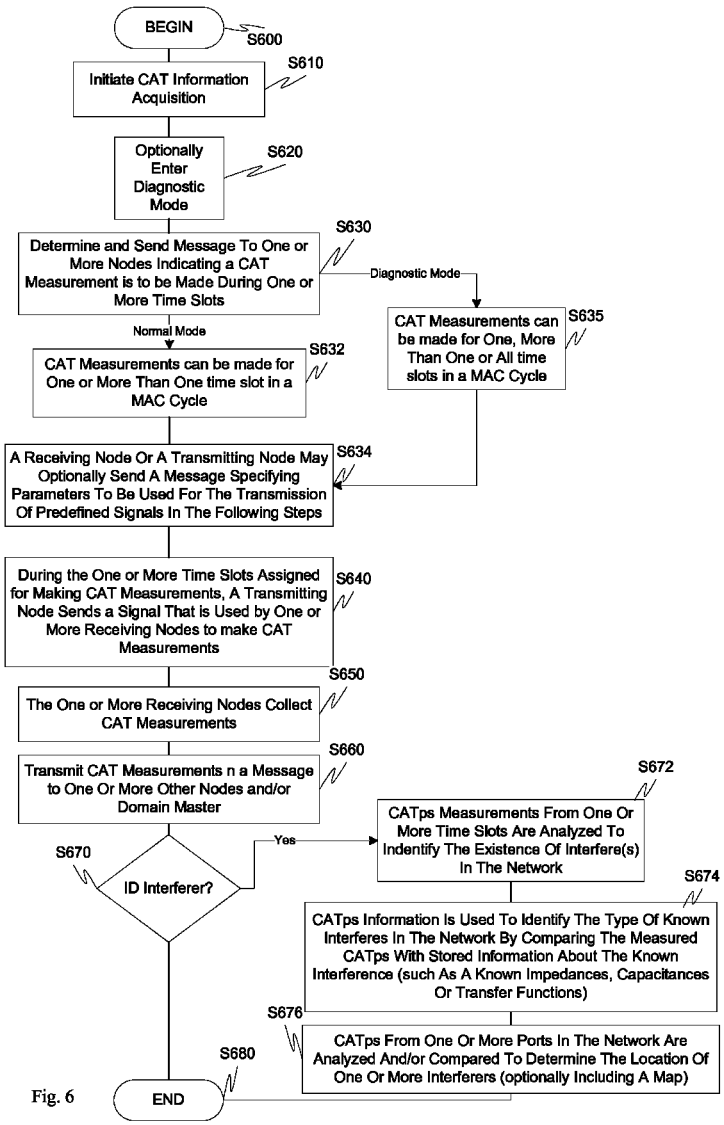
FIG. 6 is a flowchart outlining an exemplary method for channel attenuation per subcarrier measurements according to this invention.

FIG. 6 outlines an exemplary method for performing channel attenuation measurements according to this invention. While FIG. 5 shows a sequence of steps, it is understood that only a subset of these steps may be performed and that the order of these steps could change. In particular, control begins in step S600 and continues to step S610. In step S610, CATps information acquisition is initiated. Then, in step S620, a determination is made whether an optional diagnostic mode should be entered. Next, in step S630, a message is determined and sent to one or more nodes indicating that CATps measurements are to be made. If the diagnostic mode is optionally entered, control continues to step S635 where the CATps measurements can be made for one, more than one, or all time slots in a MAC cycle. If the diagnostic mode is not entered, control continues to step S632 where the CATps measurements can be made for one or more than one time slot(s) in a MAC cycle. Then in step S634 a receiving node or a transmitting node may optionally send a message specifying parameters to be used for the transmission of predefined signals in the following steps. Control then continues to step S640.

In step S640, during the one or more time slots assigned for making CATps measurements, a transmitting node sends a signal that used by one or more receiving nodes to make the CATps measurements. The signal may be a predefined signal as described above. Then in step S650, the one or more nodes that receive a signal from step S640, collect the CATps measurements. Control then continues to step S660.

In step S660, the CATps measurements are transmitted in a message to one or more other nodes and/or a Domain Master. The message information may be represented in a format where a CATps measurement is specified for a specific time slot or a plurality of time slots. Control then continues to step S670.

In step S670, a determination is made whether one or more interferes should be identified. As discussed, this procedure can be performed anywhere within or outside the communications network, provided the CATps measurements are available. If an identification of an interferer(s) is desired, control continues to step S672. In step S672, the CATps measurements from one or more time slots are analyzed to identify the existence of interfere(s) in the network. Next, in step S674, the CATps information is used to identify the type of known interferes in the network by comparing the measured CATps with stored information about the known interference (such as a known impedances, capacitances or transfer functions). Then, in step S676, the CATps from one or more ports in the network are analyzed and/or compared to determine the location of one or more interferers (optionally including a map). Control then continues to step S680 where the control sequence ends.

Measurements Over Time

Figure 7:
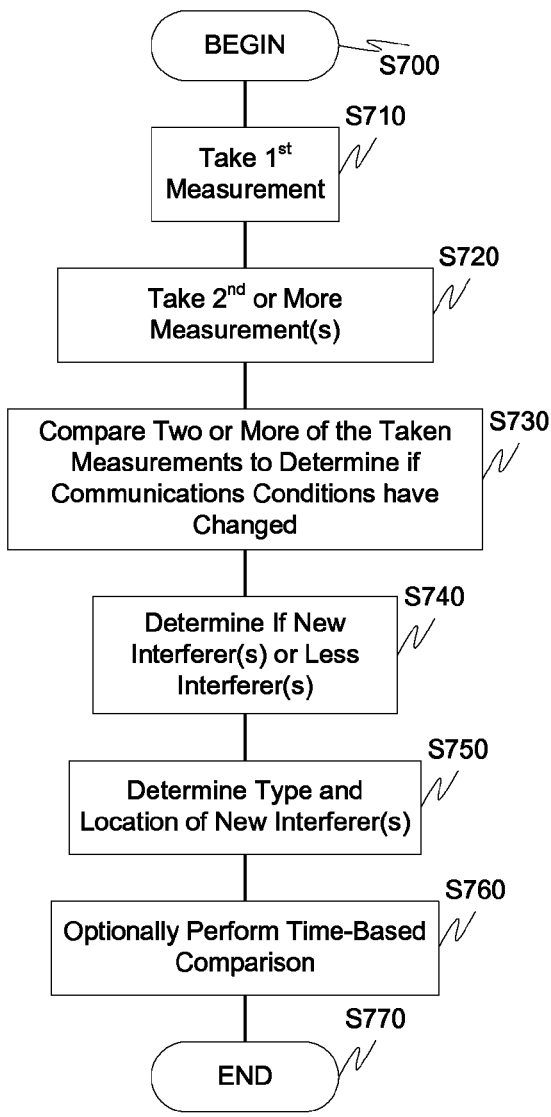
FIG. 7 is a flowchart illustrating an exemplary method of comparing time-based measurements according to this invention.

FIG. 7 outlines an exemplary method for utilizing one or more of the parameters described herein and measuring the one or more parameters over time to get more than one set of measurements for the at least one parameter. For example, the SNRps could be measured at a first time and then at a second time, and these measurements results could be compared.

In particular, control begins in step S700 and continues to step S710. In step S710, a first measurement is taken. Next, in step S720, a second (or more) measurement is taken. Then, in step S730, the two (or even more) measurements results could be stored and compared to determine if the communications conditions have changed. For example, if the comparison showed that a measured SNR had degraded from the first measurement to the second measurement, this could be used to determine that a new interferer was impacting the network. For example, the new interferer could be a new appliance that was recently installed in the home or a new device that was installed without a microfilter. Control then continues to step S740.

In step S740, and based on the comparison, a determination is made where a new interferer is present, or an interferer is no longer present. Next, in step S750, the type and location of any new interferer could be identified as described in detail in methods above. Similar measurements over time and could be done for any one or more of the parameters described above, such as the data rates, SNR, BATVps, CATps, etc. In these cases as well, the measurement results could be stored and compared to determine changes in the communications conditions, including the existence, location and type of interferer (using methods described above for each measurement parameter).

In one optional step S760, a measured parameter set (such as SNRps or data rate) has a specific time associated with it, such as a "timestamp," that indicates the day and/or time of day at which the measurement was performed. These timestamps could be used when comparing measured data to determine network issues. For example, SNRps measurements could be done every hour with a timestamp indicating the time of each measurement. These SNRps measurements with different timestamps could be compared. If the comparison showed that SNR measurements during a specific time of day were lower than most other times of day, this could indicate a problem with the network that is time related. For example, the comparison could determine that an interferer is causing problems during these time of the day (for example, an appliance such as washing machine or a heating unit that turns on during certain hours of the day). Additionally the type and location of the interferer could be identified with any of the methods described above. Also, more than one type of measurement parameter could be compared over time to determine problems in the network. For example, SNRps measurements over time could be compared with data rate measurements over time. The comparison could show that while SNRps measurements over time remained the same, the data rate measurements were lower during certain periods of time during day. The low data rate could be attributed to a high Packet Error Rate (PER) which results in packet retransmissions (thereby reducing the effective data rate). Since the SNR measurements showed that the SNR was still good during this time, the high PER can be attributed to some form of impulse noise, which typically causes packet errors without degrading average SNR. Therefore, based on this analysis, it could be determined that during certain times of the day impulse noise was degrading the data rate performance of one or more nodes. The impulse noise could be identified as being from an interferer that causes impulse noise, such as telephone ringing.

QLNps Measurements

Figure 9:
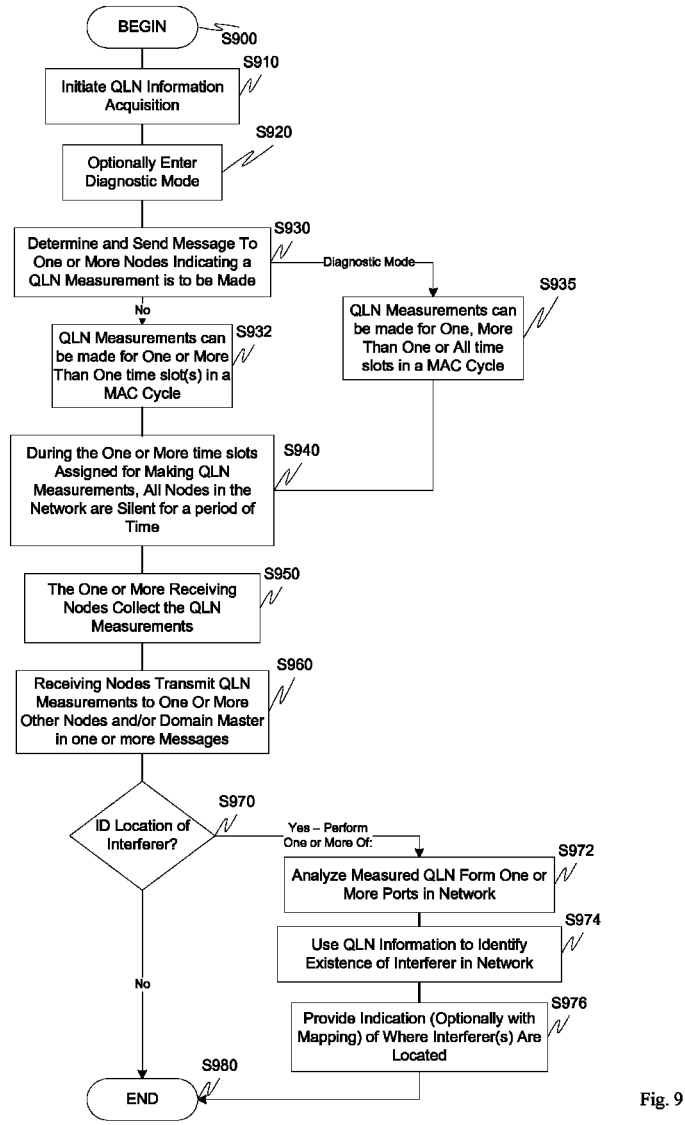
FIG. 9 is a flowchart illustrating an exemplary method for quiet line noise measurements according to this invention.

FIG. 9 outlines an exemplary method for data rate measurements according to an exemplary embodiment of this invention. While FIG. 9 shows a sequence of steps, it is understood that only a subset of these steps may be performed and that the order of these steps could change. Control begins in step S900 and continues to step S910. In step S910, QLN information acquisition is initiated. Optionally, in step S920, a determination is made whether an optional diagnostic mode should be entered. Then, in step S930, a message is determined and sent to one or more nodes, the message indicating QLN measurements are to be made during one or more time slots. If the optional diagnostic mode was entered, control continues to step S935, where the QLN measurements can be made for one, more than one, or all time slots in a MAC cycle. If the optional diagnostic mode was not selected, control continues to step S932, where the QLN measurements can be made for one or more than one time slot(s) in a MAC cycle. The period of time could be the entire time slot or a portion of the time slot.

Next, in step S950, the one or more receiving nodes collect QLN measurements, then, in step S960, the QLN measurements are transmitted in a message to one or more other nodes and/or a Domain Master. The message information may be represented in a format where a QLN measurement is specified for a specific time slot or a plurality of time slots. Control then continues to step S970.

In step S970, a determination is made whether an interferer(s) should be identified. As discussed above, it should be appreciated that this procedure can be performed anywhere within or outside the communications environment once the data rate measurements have been received. If an interferer(s) is to be identified, control continues to step S972 where the measured QLN information from the one or more ports in the network are analyzed. Next, in step S974, the QLN information from the one or more ports is used to identify the existence of one or more interferers in the network. Then, in step S976, the QLN information from one or more ports in the network are analyzed and/or compared to determine the location and/or type of one or more interferers (optionally including a map). Control then continues to step S980 where the control sequence ends.

NLNps Measurements

Figure 10:
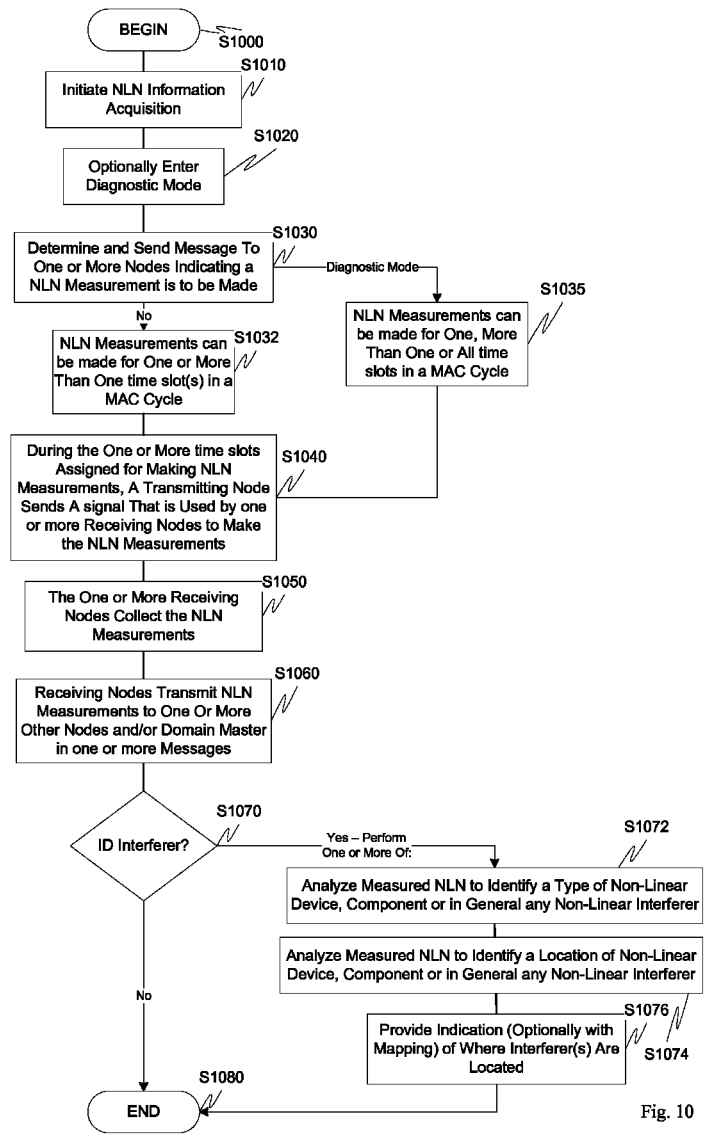
FIG. 10 is a flowchart illustrating an exemplary method for NLN measurement according to this invention.

FIG. 10 outlines an exemplary method for NLNps measurements according to an exemplary embodiment of this invention. While FIG. 10 shows a sequence of steps, it is understood that only a subset of these steps may be performed and that the order of these steps could change. Control begins in step S1000 and continues to step S1010. In step S1010, NLNps information acquisition is initiated. Then, in step S1020, a determination is made whether an optional diagnostic mode should be entered. Then, in step S1030, a message is determined and sent to one or more nodes, the message indicating a NLNps measurement is to be made during one or more time slots. If the optional diagnostic mode was entered, control continues to step S1035, where the NLNps measurements can be made for one, more than one, or all time slots in a MAC cycle. If the optional diagnostic mode was not selected, control continues to step S1032, where the NLNps measurements can be made for one or more than one time slot(s) in a MAC cycle. Then, in step S1040, during the one or more time slots assigned for making NLN measurements, a transmitting node sends a signal that is used by one or more receiving nodes to make the NLN measurements. The signal may be a predefined signal as described above. Next, in step S1050, the one or more receiving nodes collect the NLNps measurements, then, in step S1060, the NLNps measurements are transmitted in a message to one or more other nodes and/or a Domain Master. The message information may be represented in a format where a NLNps measurement is specified for a specific time slot or a plurality of time slots. Control then continues to step S1070.

In step S1070, a determination is made whether an interferer(s) should be identified. As discussed above, it should be appreciated that this procedure can be performed anywhere within or outside the communications environment once the data rate measurements have been received. If an interferer(s) is to be identified, control continues to step S1072 where the measured NLNps are analyzed to identify a type of non-linear device, component or in general any non-linear interferer. Next, in step S1074, the measured NLNps are analyzed to identify the location of non-linear device, component or in general any non-linear interferer. Then, in step S1076, an indication of where the interferer(s) are located is provided (optionally including a map). Control then continues to step S1080 where the control sequence ends.

Neighboring Network(s)

Figure 11:
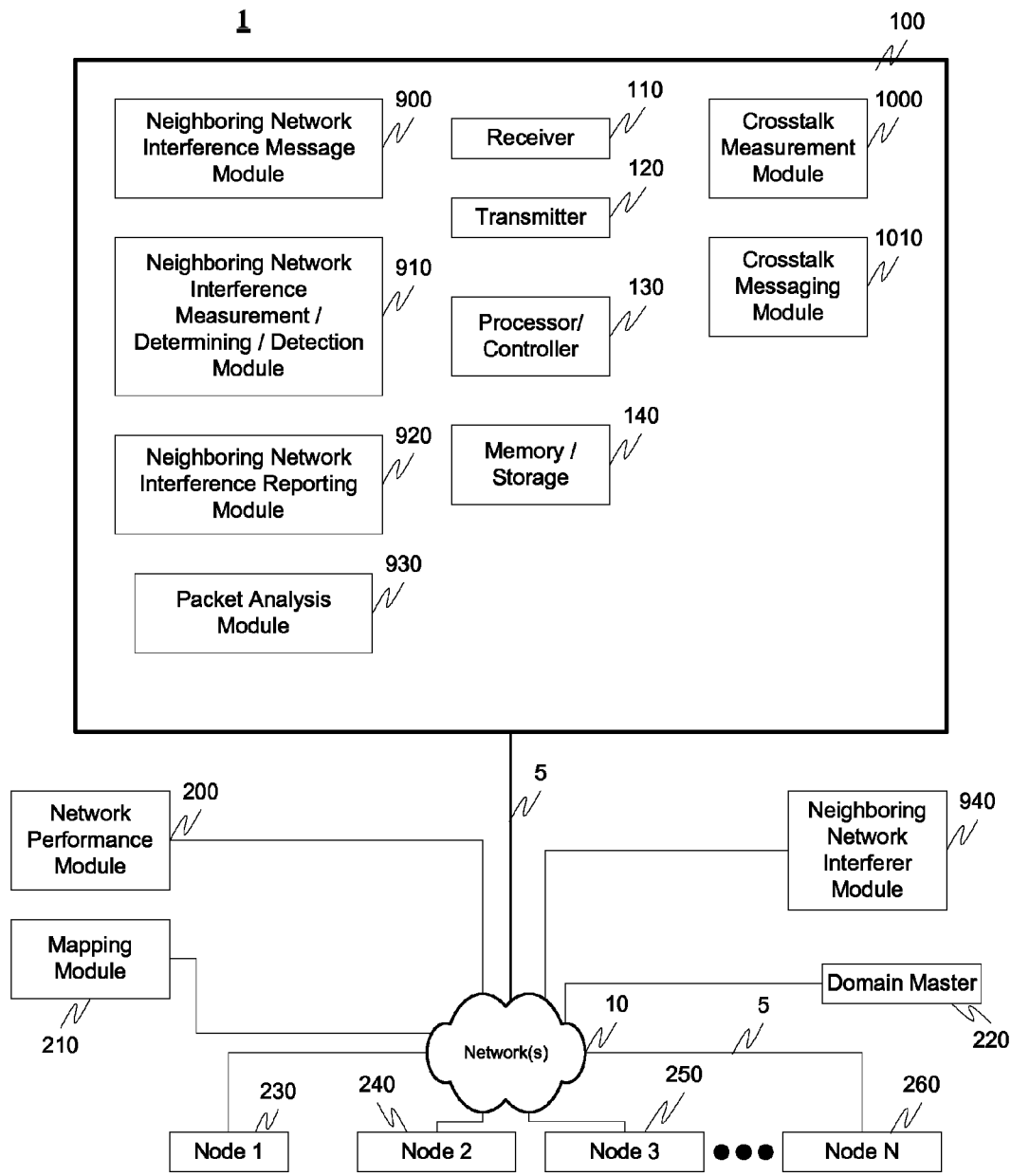
FIG. 11 illustrates an additional exemplary communications environment according to this invention.

FIG. 11 illustrates optional components that can be included in the node 100. These additional components can be provided in combination with any one or more of the modules/components illustrated in FIG. 1. The node 100 in FIG. 11 includes a neighboring network interference message module 900, a neighboring network interference measurement/determining/detection module 910, a neighboring network interference reporting module 920 and a packet analysis module 930. Similar to the above described embodiments, one or more of the functions described in relation to elements 900-930 could be performed by the neighboring network interferer module 940.

In this exemplary embodiment, one or more of the measurements described above, such as QLN measurement, are used to measure the impact of the transmission of packets on neighboring network(s) in a communication networks. As an example, power lines are often connected between home or apartments and this results in packets from one home network interfering with packets from another home network. In this case, a QLN type measurement can be used to detect the presence and measure the impact of neighbor's interfering network. Since the "noise" (or interference) from neighbor networks is in the form of packet transmission, this type of QLN (or interference) measurement may not be stored as average noise, as described above.

In this case, the noise has the form of impulse noise and could be measured by determining the maximum noise level over a time period (or interval). Therefore the interference could be represented and stored as the maximum measured power level per subcarrier over a period of time, for example, 1 second. Alternatively, or in addition, the neighbor interference measurement could be represented as the number of packets being transmitted by an interfering network. Alternatively, or in addition, the neighbor interference measurement could be represented as the amount of time that packets from a neighboring network are occupying the medium.

In operation, and similar to the above-described embodiments, the measuring of neighboring network interference could be selected by a user, technician, service provider of the like. Upon selection, the neighboring network interference message module 900 transmits or receives a message indicating one or more time slots to be used for measuring interference from neighboring networks. Then, and in cooperation with the neighboring network interference measurement/determining/detection module 910, the interference from neighboring network(s) is one or more of measured or determined or detected during the one or more time slots specified in the message. The measured or detected interference can be represented as one or more of the following:

a maximum noise level over a period of time, a number of packets being transmitted by the neighbor network, and amount of time that packets from a neighboring network are occupying the medium.

This measured or detected interference can then be reported with the cooperation of the neighboring network interference detection module 930 to one or more destinations such as a service provider, user, technician or the like.

Optionally, and in cooperation with the packet analysis module 930 interfering packets could be analyzed. More specifically, it is not uncommon for one or more packets from other networks to be received on the network under test. These "mistakenly" received packets are usually received on the network under test by virtue of crosstalk. However, these packets could also be received, for example, if there is a wiring problem.

Once these interfering packet(s) are received, the packet analysis module can analyze the mistakenly received packets. This analysis can include decoding of the header as well as an optional decrypting of the packet to assist with determining the network(s) from which that packet(s) are originating. This information can be provided to an entity, such as a service provider and/or technician and used, for example, to adjust one or more transmission parameters on the interfering network in an attempt to reduce the interference on the network under test.

Figure 12:
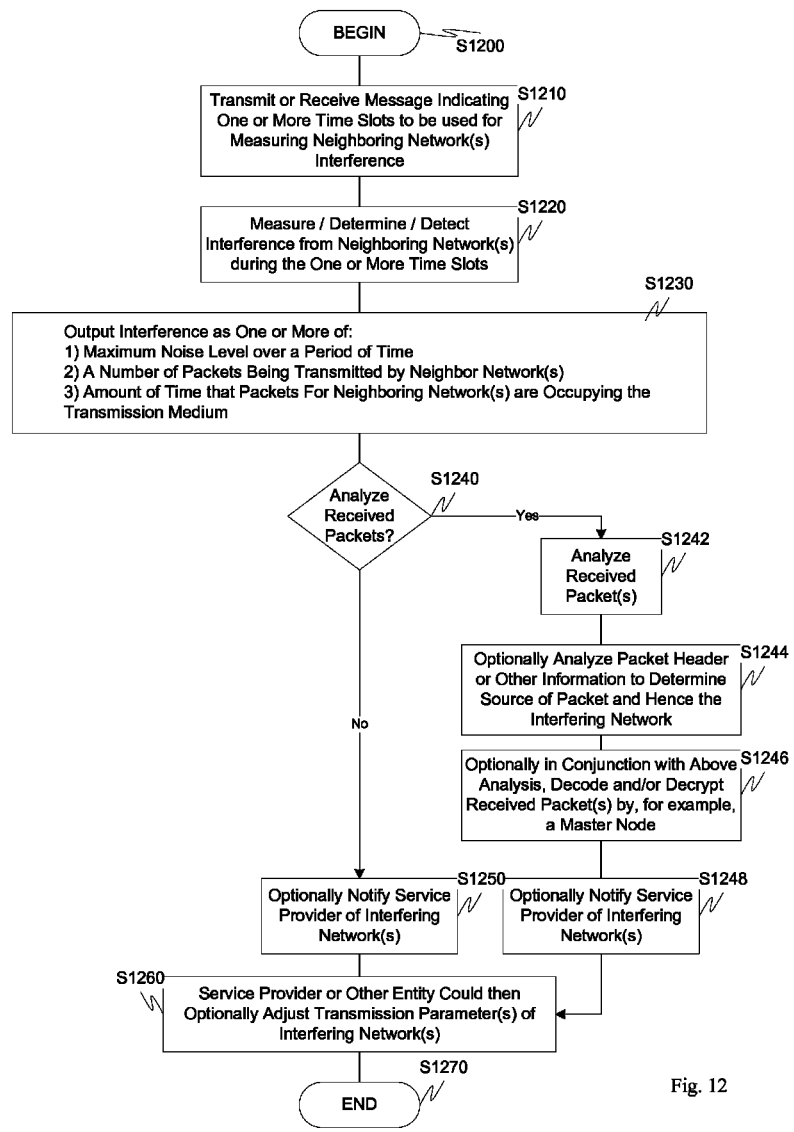
FIG. 12 is a flowchart illustrating an exemplary method for measuring and/or detecting interference from neighboring network(s)

FIG. 12 illustrates an exemplary method for measuring or determining or detecting neighboring network interference according to an exemplary embodiment of this invention. In particular control begins in step S1200. Next, in step S1210, a message is transmitted or received indicating one or more time slots to be used for measuring interference from neighboring networks. Then, in step S1220, the interference from neighboring network(s) is one or more of measured, determined or detected during the one or more time slots specified in the message. The measured or detected interference can be represented and output in step S1230 to one or more destinations such as a service provider, user, technician or the like, as one or more of the following:

a maximum noise level over a period of time, a number of packets being transmitted by the neighbor network, and an amount of time that packets from a neighboring network are occupying the medium.

Control then continues to step S1240.

In step S1240, a determination is made whether an analysis of received packets is to be performed. For example, if during the test, one or more packets are received, these interfering packets could be analyzed.

If an analysis of the interfering packets is desired, control continues to step S1242 with control otherwise jumping to step S1250 where an entity, such as a user, technician, service provider, or the like, is notified on the neighboring network interference.

In step S1242, the received interfering packet(s) are analyzed. For example, header or other information can optionally be analyzed in step S1244 in an attempt to determine the source network of the packet(s)—appreciating that there may be several interfering packet(s) from different networks. This could be done by, for example, comparing header information to known IP address information. Alternatively, or in addition, this could be done by inspecting the payload of the packet and analyzing payloads of neighboring networks for similar or related payloads. A correlation could then be drawn that a network exchanging similar payloads could be the source of the interfering packet(s).

Optionally, in step S1246, the interfering packet(s) could be decrypted by, for example, a master node, that is aware of the encryption technique(s) being used. Then, in step S1248, information about the interfering network(s) can optionally be provided to a service provider, technician, user or the like. Control then continues to step S1260.

In step S1260, a service provider, user, technician, or the like, could optionally adjust one or more transmission parameters of the network which is causing the interfering packet(s). Control then continues to step S1270 where the control sequence ends.

Measuring Crosstalk or Interference Across Media Types

In another exemplary embodiment, also described with reference to FIG. 11, dual ended measurements (where a transmitting transceiver transmits signals to a different receiving transceiver) or single ended measurements (where a transceiver simultaneously sends and receives signals to perform measurements of the channel) are performed to measure crosstalk (or interference) between different media types in network, such as G.hn network, that comprises more than one media type. For example, if a network uses power lines and coaxial cable, or power line and telephone wire (or any combination of power lines, coaxial cable, telephone wires, optical fiber and plastic optical fiber for communication) a test may be performed that measures the impact (or crosstalk) of signals from one medium onto the other medium.

The node 100 in FIG. 11 further includes an optional crosstalk measurement module 1000 and a crosstalk messaging module 1010 for these measurements.

Single Transceiver

In one exemplary test, signals are transmitted by the transmitter 120 on one medium type and received by the receiver 110 on another medium type. For example, a signal may be transmitted by a transceiver on the power line and received by the same device on a coaxial cable. This means that such a device is connected to more than one medium type. These types of measurements could be used to diagnose problems (or faults) in a network or to improve/optimize the performance of a network.

For example, first a QLN measurement or SNR measurement may be performed as described above, and this may show that a telephone wire network is experiencing high levels of noise in a particular frequency band (e.g., 20-30 MHz). Analysis of these measurements by the crosstalk measurement module 1000 may indicate that this noise may be due to crosstalk coupling from a near-by power line network. In this case, a test may be performed in cooperation with the crosstalk measurement module 1000, transmitter 120 and receiver 110, where a device that is connected to both the power line and telephone line transmits a signal on the power line and measures the received signal on the telephone line. This test could be used to verify that the noise in the 20-30 MHz band of the telephone network was indeed due crosstalk in the power line network. As a result, action could be taken, optionally in cooperation with the network performance module 200, to decrease these crosstalk effects by, for example, reducing the transmission power levels of signals transmitted on the power line.

In one embodiment, these tests are performed in a G.hn Domain Master that is connected to at least two of any of: power lines, phones lines, coaxial cable, optical fiber or POF. Since the Domain Master controls the signals transmitted in the network, the Domain Master could use this test information determine crosstalk problems between at least two media types. Based on this determination, the Domain Master could reduce the transmission power level on one or more subcarriers on at least one medium in order to reduce the crosstalk on at least one other medium.

Two or More Transceivers

In an alternate embodiment, the crosstalk test is performed using two or more transceivers. In this case, signals are transmitted by a first transceiver connected to a first media type and received by a second transceiver connected to a second media type. For example, the first transceiver could be associated with a first node and the second transceiver associated with a second node. This test with two transceivers could be used in a manner similar to that described above for the single transceiver test to measure and reduce crosstalk in the network.

The measured data from the tests involving a two transceivers or two or more transceivers may be sent to another entity, with the cooperation of the crosstalk messaging module 1010 (such as a Domain Master or a Network Management/Operation device controlled by a service or utility provider) where they are stored, analyzed and compared. Based on theses analyses and comparisons, actions may be taken to reduce the levels of crosstalk. For example, and as discussed above, actions could be taken to reduce the transmission power level on one or more subcarriers on at least one medium in order to reduce the crosstalk on at least one other medium.

Figure 13:
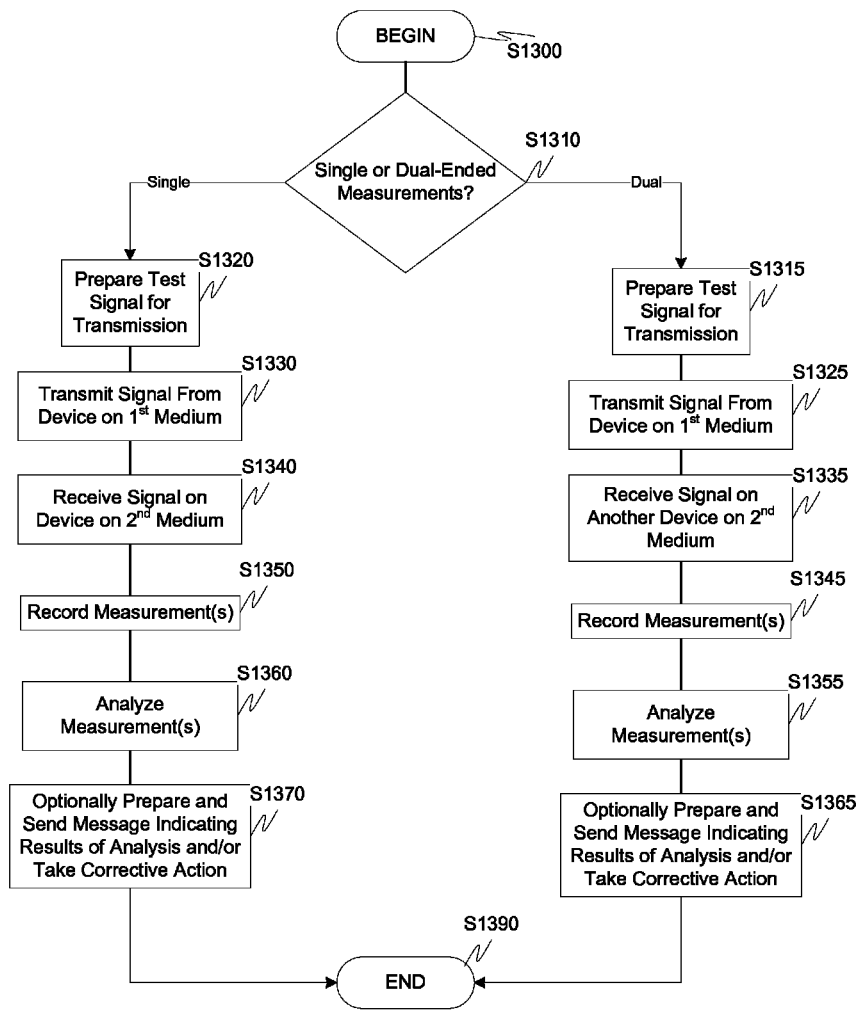
FIG. 13 illustrates an exemplary method for measuring crosstalk or interference across media types according to this invention.

FIG. 13 illustrates an exemplary embodiment for measuring interference or crosstalk across media types. In particular, control begins in step S1300 and continues to step S1310. As with the other embodiments, this test could be initiated by a technician, user, service provider or the like. In Step S1310, a determination is made whether a single-ended or dual-ended test is desired. If a single-ended test is desired, control continues to step S1320. For a dual-ended test, control continues to step S1315.

In step S1320, a test signal(s) is prepared for transmission. Next, in step S1330, the signal(s) are transmitted on a first medium type and received, in step S1340, by a receiver on another medium type. For example, a signal may be transmitted by a transceiver on a power line and received by the same device on a coaxial cable. This means that such a device is connected to more than one medium type. Then, in step S1350, the measurement(s) are recorded and analyzed in step S1360. As a result of the analysis, in step S1370, the measured data from the tests may be sent to another entity (such as a Domain Master or a Network Management/Operation device controlled by a service or utility provider) where they are stored, analyzed and compared. Based on theses analyses and comparisons, actions may be taken to reduce the levels of crosstalk. For example, and as discussed above, actions could be taken to reduce the transmission power level on one or more subcarriers on at least one medium in order to reduce the crosstalk on at least one other medium. Control then continues to step S1390 where the control sequence ends.

If a dual-ended test is desired, control continues top step S1315. In step S1315, a test signal(s) is prepared for transmission. Next, in step S1325, the signal(s) are transmitted by a first device on a first medium type and received, by a second device, in step S1335, on a second medium type. For example, a signal may be transmitted by a transceiver on a first device on a power line and received by another device on a fiber optic cable. Then, in step S1345, the measurement(s) are recorded and analyzed in step S1355. As a result of the analysis, in step S1365, the measured data from the tests may be sent to another entity (such as a Domain Master or a Network Management/Operation device controlled by a service or utility provider) where they are stored, analyzed and compared. Based on theses analyses and comparisons, actions may be taken to reduce the levels of crosstalk. For example, and as discussed above, actions could be taken to reduce the transmission power level on one or more subcarriers on at least one medium in order to reduce the crosstalk on at least one other medium. Control then continues to step S1390 where the control sequence ends.

The measured data from the tests involving a two transceivers or two or more transceivers may be sent to another entity, with the cooperation of the crosstalk messaging module 1010 (such as a Domain Master or a Network Management/Operation device controlled by a service or utility provider) where they are stored, analyzed and compared. Based on theses analyses and comparisons, actions may be taken to reduce the levels of crosstalk. For example, and as discussed above, actions could be taken to reduce the transmission power level on one or more subcarriers on at least one medium in order to reduce the crosstalk on at least one other medium.

Figure 14:
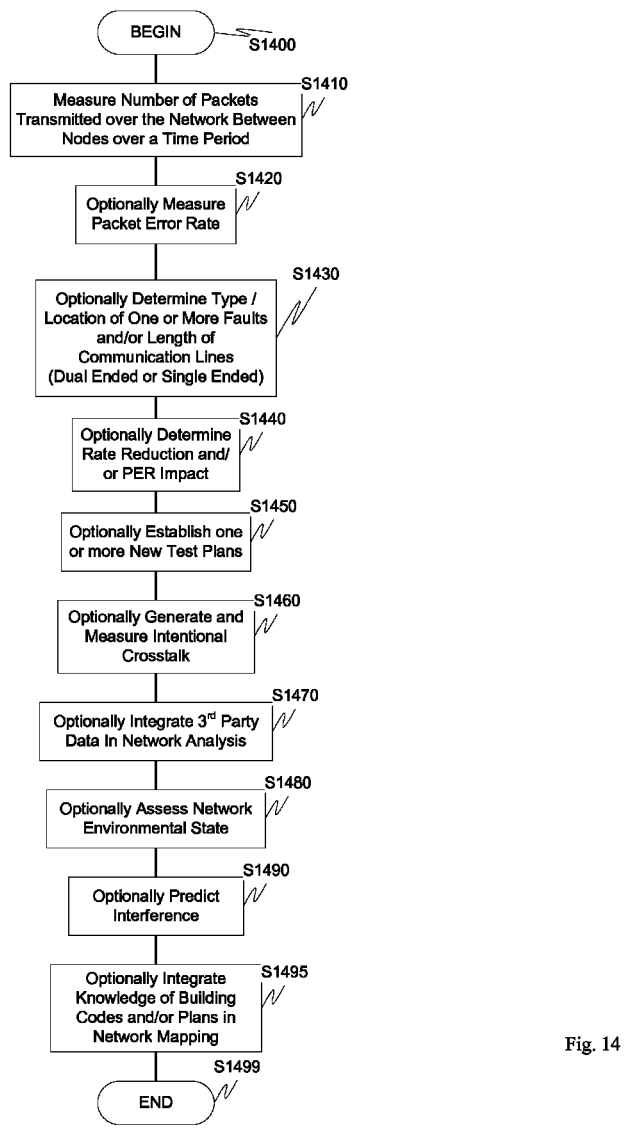
FIG. 14 illustrates exemplary optional tests, measurements and data integration according to this invention.

FIG. 14 outlines a plurality of optional tests, measurements and data integration options that can be used in conjunction with any one or more of the techniques discussed herein, or as a stand-alone technique.

Control begins in step S1400 and continues to step S1410. In step S1410, and in addition to the measured parameters described above, other parameters may be measured or determined. For example, the number of packets being transmitted over the network between nodes over time may be measured or detected. For example, the number of packets being transmitter over the network per second (or any other time period) over an entire day (or any other time period) can be measured. Alternatively, or additionally, in step S1420, the packets error rate (PER) of packets being transmitted over the network between nodes over time may be measured or detected.

The packet error rate is often defined as the ratio of the number of packets received in error over the number of packets received without error—but any other metric that is used to determine packet error rate could be used. For example, the number of packet error rate packets of the network per second (or any other time period) over an entire day (or any other time period) can be measured. In accordance with one exemplary embodiment, the packet error rate could be determined passively by one or more devices in the network by monitoring the number of packets being transmitted and/or the number of packets that are being retransmitted (indicating an error in a previously transmitted packet) and/or the number of positive acknowledgments (indicating a packet was received correctly) and/or the number of negative acknowledgments (indicating a packet was not received correctly).

Then, in step S1430, and in addition to using the measured parameter(s) to determine the type and/or location of interferers, any one or more of the parameters described herein may be used to determine the type and/or location of a fault in the network. For example the parameters may be used to detect faults such as bad slices, shorts, opens, unshielded wires, bad electrical outlets, lossy cable splitters, broken/bent fiber line and, in general, any characteristics of the channel that is degrading performance. The presence of bad splices (or improperly grounded or terminated devices) may be determined using, for example, the measured NLN data because faults typically have non-linear responses. After the fault or interferer is detected, a technician or user can be instructed to fix the problem in order to improve network performance.

In addition to using the measured parameters to determine the type and/or location of interferers, any one or more of the parameters described herein may be use to determine the lengths of communication lines (e.g., loop length in phone lines) and/or topology (e.g., bridged tap location and/or length). For example, models exist for the response of telephone wires, electrical wires, optical fiber or coax cable to certain known signals as function of length of the medium, presence of bridged taps, bends or bad splices, wire gauge, optical fiber diameter, etc. Using these models, a comparison can be made between the measured response data from a medium with unknown characteristics (e.g., length, gauge, etc.) and the model data. This approach can be used for determining static channel characteristics and using this information to better determine means to reliably utilize the communications channel. This information can also be used to repair aspects of the static channel in order to improve communications characteristics such as data rate or error rates.

The measurements described above may be performed using a dual ended test, i.e., where a transmitting transceiver transmits signals to a receiving transceiver (as described above) or may be performed using a single ended test, i.e., where a transceiver simultaneously sends and receives signals to perform measurements of the channel. In the case of single ended test, a device may transmit a signal and measure (or detect) the received signal as a reflection or echo of the transmitted signal. This type of single ended measurement could be used to measure the non-linear noise as described above. For example, a signal with only a subset of the subcarriers (i.e., only a subset of carriers would have transmission power or energy) could be transmitted and received by a device in a single-ended test. These subcarriers could be modulated with a PRBS sequence or sent as pure tones (unmodulated). The remaining subcarriers could be inactive (no transmission energy or power). This type of signal is effective in measuring non-linear noise because non-linear devices or components generate energy in frequencies other than those that were used to stimulate the device. For example, a single subcarrier can be use as the transmitted signal. In this case only one subcarrier has energy and all other subcarriers are disabled (no transmission energy). In the case of a nonlinearity, the received echo signal includes not only a component at the frequency of the transmitted subcarrier, but also at integer multiples of the transmitted subcarrier frequency (also known as harmonic frequencies). In general, any of the methods for measuring SNR, data rate, BATps, CATps, NLNps, etc. as described herein and shown in FIGS. 3-6 and 9 may be performed as a single-ended test where the transmitting node that transmits the signal used for measurement and the receiving node that receives the signal for measurement is actually the same node. Control then continues to step S1440.

In step S1440, the measured data can be used to determine or estimate the data rate loss ("Rate Reduction) and/or PER impact of the faults or interferers which are identified as described above. For example, it could be determined how much data rate was decreased due to the fault or interferer and therefore how much the data rate could increase if the fault was fixed. The data rate reduction could be done, for example, by estimating how much the SNR would increase if the fault or interferer was removed from the network. Additionally, it could be determined what the PER would be if the fault was fixed or the interferer was removed ('PER Impact"). The PER impact could be determined by estimating how much the SNR would increase if the fault was fixed or the interferer was removed.

One exemplary method for estimating the SNR increase is to estimate the noise caused by the interferer or fault using, for example, the QLN measurement. Using this noise estimate in combination with, for example, the SNRps and/or CATps measurement, a new SNRps could determined, wherein this new SNRps reflects the estimated SNRps if the interferer or fault was removed from the network.

Next, in step S1450, a consequence of test measurements can be the decision to take new measurements to better identify the location or impact of an interferer. For example, stored QLNps measurements may show the presence of an interferer on a certain link in the home network from previous tests. By identifying the link where the interference was identified, new tests can be set up over links that are in proximity to the link that was interfered with. These new tests can also be set to occur with a greater frequency of occurrence than the prior tests to better identify the frequency of occurrence of the interference, and can be dynamic and performed iteratively. For example, multiple QLNps measurements can be repeated at periodic intervals on the link that was previously interfered with as well as other link(s) that are geographically near the interfered link. The resulting data can be stored and analyzed to determine the location of the source of the interference and the frequency of occurrence of the interference. For example, the interference could be the result of a garage door opener that opens at certain times during the day (when occupants enter or leave the house in the morning and evening) and this could be identified.

In general, based upon either raw or analyzed data it may be decided that additional test(s) should be run to either i) better identify the location of a problem or (ii) better identify the time or frequency of occurrence. These additional tests may be "smart tests" where multiple tests are run at the same time out of different nodes to triangulate the presence of an issue—or time scheduled tests out of a node (where the timing is specifically chosen to determine a problem, e.g., multiple tests very close to each other in time to detect the frequency of occurrence of a disturber with better resolution), or a combination of both multiple nodes and multiple times.

Then, in step S1460, a device (such as a signal generator) is capable of intentionally generating crosstalk that is used to diagnose and/or test the network. For example, a network may be experiencing problems (e.g., high PER or low data rate) and a measurement (e.g., QLN) may used to detect and measure the characteristics of the crosstalk signal causing these problems. This crosstalk signal may be intermittent and it may not be apparent where it is from, but it has been observed. Based on these measurements, the device may transmit a signal that has characteristics that are similar to the measured crosstalk signal in order to analyze the impact of this signal on the network. In effect, the device is intentionally causing the same crosstalk on the network as was measured before. The benefit of this approach is that it enables the analysis of the problem in the network in a controlled and managed manner. These methods also may be combined with any of the methods described herein for measuring crosstalk between media types. For example, the crosstalk signal may be transmitted on one media type (e.g., power line network) and the impact may be determined on another media type (e.g., phone line network). These methods may be implemented in a Domain Master because this device may be connected to multiple media types and may have the processing capability to measure the crosstalk signals and generate the signal that is transmitted to generate the intentional crosstalk. Control then continues to step S1470.

In step S1470, third party data can be used to assist with determining a home network environment. The home networking channel is challenging because it can involve multiple media types, multiple nodes, interference from signals intended for the home network, interference from signals or devices not intended for the home network (e.g., radio signals, electrical motors, light dimmers, other network(s), other ingress noise, etc.), and interference from signals on an adjacent home network. The home network typically utilizes the electrical wires in the home or business and therefore is also potentially subjected to any activity on the electrical grid. Often this activity is scheduled or periodic in nature and knowledge of this activity from the power utility (the "third party") can help manage home networking reliability. If the timing of the occurrence of meter reading signals, or more generally of any maintenance or billing activities, relating to the power service to the home is known, this information can be utilized by the Domain Master in its management of the home network.

Other third party data that is useful is maintenance of the cable network by the cable company, knowledge of construction or remodeling activities in locations that share the electrical grid with the home network.

Next, in step S1480, the network environmental state can be assessed.

More specifically, the parameters described herein (measured parameters and/or additional parameter provided by third parties) are stored, analyzed and compared, to derive a "network environmental state"—that indicates how the network has behaved over time, and in particular, what network characteristics, if any, have changed over time. Based upon this, it can be determined what portions of the network are prone to environmental challenges or times that portions of the network or the whole network may be prone to environmental challenges. This "state" can be analogized to a diagram of the network that varies with time, and may provide characteristics for one or more links in the network relating to static channel characteristics (loop length, losses from bad splices, etc.) and dynamic environmental characteristics (from disturbers, crosstalk, ingress, etc.) over time. This diagram may be combined with any of the features of the network topology map described herein. Utilizing this diagram, the best case, average case and worst case "link" (or channel) characteristics can be determined (where link is the combination of static channel and dynamic environment) for each pair of nodes in the network. The worst case assumptions (based on historical or predictive models) for the link characteristics can be used in order to communicate with the highest level of immunity to potential impairments. This way, for example, the network could always provide a certain guaranteed level of performance (or QOS), such a guaranteed PER, latency or data rate. Alternatively, a greater than worst case assumption (e.g., a best case assumption) for the link characteristics can be used in order to provide higher network performance (e.g., data rate and coverage) but with more risk of more network problems. In this case, the network could operate at high data rate or low PER at certain times of the day but may suffer from low data rate or high PER when the channel is degraded due to dynamic impairments, such as crosstalk or radio ingress. Control then continues to step S1490.

In step S1490, predictions regarding interference on a link based on observations from other links can be performed.

More specifically, the home network or electrical grid can be envisioned as a plurality of links between nodes. These are either in a star configuration, a daisy chain configuration or a combination of both. Links are often subjected to the same interference sources, whether these are crosstalk or other disturbances. By creating a database of impairments or interference for certain links, it is possible to predict the interference or impairment environment for other links that have not yet been tested. This is especially true for links that are in close proximity to one another, links that have similar physical characteristics (such as wire gauge, amount of insulation, etc) and links that are connected to the same or like devices (e.g., two links that are each connected to the same type of electric motor, such as, a certain model refrigerator—one located in the kitchen and a second located in a garage). By observing and determining interference and impairments on link set x, it is possible to predict such characteristics for link y—where y and x are sets of one or more different links in the home network or electric grid.

Next, in step S1495, knowledge of building codes and/or plans can be utilized to assist with network mapping.

In particular, electrical wires in a home are typically installed according to building codes, which dictate, among other things, the location of plugs within rooms, the distance of plugs from the floor, the location of circuit breakers, etc. Knowledge of these codes is useful in determining the likely map of a home network (as described above). In the situation where the electrical network blueprint for a specific home is available, it can be made available to the Domain Master to assist in managing the home network. In the instances where it is not available, knowledge of building code rules can help increase the likelihood of predicting a more accurate map of the links in the home network. In particular, certain network configurations that are not allowed by the code can be eliminated as candidate links. This is also true of the electric grid outside the home.

As used herein the terms network and domain have the same meaning and are used interchangeably. Also, the terms receiver, receiving node and receiving transceiver have the same meaning and are used interchangeably. Similarly, the terms transmitter, transmitting node and transmitting transceiver have the same meaning and are used interchangeably. The terms transceiver and modem also have the same meaning and are used interchangeably. While the term home network has been used in this description, the description is not limited to home networks but in fact applies also to any network, such as enterprise networks, business networks, or any network with a plurality of connected nodes. The terms time slots, time periods and time interval also have the same meaning and are used interchangeably. While the above-described methods and systems have been described with respect to a port in a network, they can also be implemented in a dedicated module such as a test or network optimization module. This dedicated module could plugged into the network and act as a Domain Master or with the cooperation of the Domain Master could initiate the various measurement techniques, gather the measurements from the port(s) in the network, analyze the measurements and use the measured information to detect and diagnose problems in the network and/or to optimize or improve the performance of a network (as described above). Additionally, any one or more of the modules described herein can be claimed as one or more means that perform a comparable function.

The above-described methods and systems and can be implemented in a software module, a software and/or hardware testing module, a telecommunications test device, a modem, a transceiver, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, one or more network-based communication systems, such as an IP, Ethernet or ATM system, a modem equipped with diagnostic capabilities, or the like, and/or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug®, or the like.

Additionally, one or more the systems, methods, protocols and techniques described herein can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, a test device(s), a measurement device(s), a test or measurement device(s) with an interface (such as a graphical user interface) and a display, any comparable means, or the like. In general, any device capable of implementing a state machine that is in turn capable of implementing the methodology illustrated herein can be used to implement the various communication/measurement methods, protocols and techniques according to this invention.

Furthermore, the disclosed methods may be readily implemented in software. The disclosed methods may also be readily implemented in software stored on a computer-readable storage media using, for example, object or object-oriented software development environments, that provide portable source code that can be used on a variety of computer or workstation platforms. Alternatively, the disclosed system may be implemented partially or fully in hardware using standard logic circuits or VLSI design. Whether software or hardware is used to implement the systems and methods described herein is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a computer-readable storage medium, executed on programmed general-purpose computer with the cooperation of a controller/processor and memory, a special purpose computer, a microprocessor, or the like. The systems and methods of this invention can be implemented as program embedded on computing device such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a test/modeling/mapping/communications device.

The flowcharts and block diagrams illustrated herein show the architecture, functionality, and operation of possible implementations of exemplary systems, methods, and computer program products according to various exemplary embodiments of the present invention. In this regard, each block in the flowcharts or block diagrams may represent a module(s), segment, or portion of program code, which comprises one or more executable instructions for implementing the specified logical function(s). The functions noted in the blocks may occur out of the order noted in the figures. For example, two or more blocks shown in succession may be executed substantially concurrently, concurrently, or the blocks may sometimes be executed in the reverse or a different order, depending upon the functionality involved. Furthermore, two blocks shown in succession may have one or more functions executed there between (that may or may not be illustrated) depending upon the functionality involved. In addition, each block of the block diagrams or flowchart illustration, and combinations of blocks in the block diagrams or flowcharts, can be implemented by one or more special purpose hardware-based systems that perform the specified functions or acts, or combinations of special purpose hardware and computer instructions.

While the invention is described in terms of exemplary embodiments, it should be appreciated that each individual aspect of the invention can be separately claimed, and any one or more of the features of the various embodiments can be combined.

While some of the exemplary embodiments illustrated herein illustrate the various components as being collocated, it is to be appreciated that the various components of the system can be located at distant portions of a distributed network, or in general at any location, such as a telecommunications network and/or the Internet or within a dedicated communications network. Thus, it should be appreciated that the components of the system can be combined into one or more devices or collocated on a particular node of a distributed network, such as a telecommunications network. As will be appreciated from the preceding description, and for reasons of computational efficiency, the components of the communications network can be arranged at any location within a distributed network without affecting the operation of the system.

It is therefore apparent that there has been provided, in accordance with the present invention, systems and methods for measuring and testing networks. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method of measuring data rate in a network that divides transmission time into a plurality of time slots comprising:
   transmitting or receiving a first message indicating one or more parameters to be used for transmitting or receiving a second message indicating one or more time slots to be used for data rate measurement;
   transmitting or receiving the second message indicating the one or more time slots to be used for the data rate measurement;
   transmitting or receiving a signal to be used for the data rate measurement during the one or more time slots; and
   measuring one or more data rates during the one or more time slots using the signal.

2. The method of claim 1, wherein the signal includes a data rate measurement parameter that is represented as a plurality of data rate values, where each data rate value represents the data rate that is achievable in one of the plurality of time slots.

3. The method of claim 1, wherein a media access plan, in a network that divides transmission time into a plurality of TXOPs, is determined using a plurality of data rate values to allocate TXOPs to ports in the network, wherein each data rate value represents the data rate that is achievable by a port in the network in one of the plurality of TXOPs.

4. The method of claim 1, wherein a media access plan, in a network that divides transmission time into a plurality of TXOPs, is determined using a plurality of data rate values to allocate TXOPs to ports in the network, wherein each data rate value represents a data rate that is achievable by a port in the network in one of the plurality of TXOPs for receiving data from one of a plurality of transmitting nodes.

5. The method of claim 1, wherein the one or more parameters indicates whether Pseudo-Random Bit Sequence (PRBS) reinitialization is to be used for transmitting or receiving the second message.

6. The method of claim 1, wherein the one or more parameters indicates a cyclic prefix length to be used for transmitting or receiving the second message.

7. The method of claim 1, wherein the one or more parameters indicates a window length to be used for transmitting or receiving the second message.

8. The method of claim 1, wherein the one or more parameters indicates active carriers to be used for transmitting or receiving the second message.

9. The method of claim 1, wherein the one or more parameters indicates a signal/subcarrier power level to be used for transmitting or receiving the second message.

10. A system capable of measuring data rate in a network that divides transmission time into a plurality of time slots comprising:
    means for transmitting or receiving a first message indicating one or more parameters to be used for transmitting or receiving a second message indicating one or more time slots to be used for data rate measurement;

means for transmitting or receiving the second message indicating the one or more time slots to be used for the data rate measurement;

means for transmitting or receiving a signal to be used for the data rate measurement during the one or more time slots; and means for measuring one or more data rates during the one or more time slots using the signal.

11. The system of claim 10, wherein the system is a device comprising a transceiver configured to receive, from a second device, the first message indicating one or more parameters to be used for transmitting the second message.

12. The system of claim 11, wherein the transceiver is configured to transmit, to the second device, the second message indicating the one or more time slots to be used for the data rate measurement.

13. The system of claim 12, wherein the transceiver is configured to receive, from the second device, the signal to be used for the data rate measurement during the one or more time slots.

14. The system of claim 13, wherein the one or more parameters indicates at least one of: whether Pseudo-Random Bit Sequence (PRBS) reinitialization is to be used for transmitting or receiving the second message, a cyclic prefix length to be used for transmitting or receiving the second message, a window length to be used for transmitting or receiving the second message, active carriers to be used for transmitting or receiving the second message, and a signal/subcarrier power level to be used for transmitting or receiving the second message.

15. A system capable of measuring data rate in a network that divides transmission time into a plurality of time slots comprising:

a transceiver configured to
transmit or receive a first message indicating one or more parameters to be used for transmitting or receiving a second message indicating one or more time slots to be used for data rate measurement; and
transmit or receive the second message indicating the one or more time slots to be used for the data rate measurement; and
transmit or receive a signal to be used for the data rate measurement during the one or more time slots; and a measurement module, processor and memory capable of measuring one or more data rates during the one or more time slots using the signal.

16. A diagnostic mode, in a network that divides transmission time into a plurality of time slots, comprising:
transmitting or receiving a message indicating entry into the diagnostic mode;
transmitting or receiving a first message indicating one or more parameters to be used for transmitting or receiving a second message indicating one or more time slots to be used for data rate measurement;
transmitting or receiving the second message indicating the one or more time slots to be used for the data rate measurement;
transmitting or receiving a predefined signal to be used for the data rate measurement during the one or more time slots;
measuring one or more data rates during the one or more time slots using the predefined signal; and
transmitting or receiving a message comprising the one or more data rates.

17. A method of measuring Signal-to-Noise Ratio per subcarrier (SNRps) in a network that divides transmission time into a plurality of time slots, the method comprising:
transmitting or receiving a first message indicating one or more parameters to be used for transmitting or receiving a second message indicating one or more time slots to be used for SNRps measurement;
transmitting or receiving the second message indicating the one or more time slots to be used for the SNRps measurement;
transmitting or receiving a signal to be used for SNRps measurement during the one or more time slots; and
measuring one or more SNRps during the one or more time slots using the signal.

18. A system capable of measuring Signal-to-Noise Ratio per subcarrier (SNRps) in a network that divides transmission time into a plurality of time slots comprising:
means for transmitting or receiving a first message indicating one or more parameters to be used for transmitting or receiving a second message indicating one or more time slots to be used for SNRps measurement;
means for transmitting or receiving the second message indicating the one or more time slots to be used for the SNRps measurement;
means for transmitting or receiving a signal to be used for SNRps measurement during the one or more time slots; and
means for measuring one or more SNRps during the one or more time slots using the signal.

19. A system capable of measuring Signal-to-Noise Ratio per subcarrier (SNRps) in a network that divides transmission time into a plurality of time slots comprising:
an SNR message module, transceiver, processor and memory configured to:
transmit or receive a first message indicating one or more parameters to be used for transmitting or receiving a second message indicating one or more time slots to be used for SNRps measurement;
a transmit or receive the second message indicating the one or more time slots to be used for the SNRps measurement;
transmit or receive a signal to be used for the SNRps measurement during the one or more time slots and
measure one or more SNRps during the one or more time slots using the signal.

* * * * *

UNITED STATES PATENT AND TRADEMARK OFFICE
CERTIFICATE OF CORRECTION

PATENT NO. : 9,042,245 B2  
APPLICATION NO. : 13/146445  
DATED : May 26, 2015  
INVENTOR(S) : Marcos Tzannes et al.

Page 1 of 1

It is certified that error appears in the above-identified patent and that said Letters Patent is hereby corrected as shown below:

In the claims

Column 80, line 49 delete "a" before transmit or receive the second message

Signed and Sealed this
Twenty-second Day of December, 2015

Michelle K. Lee
*Director of the United States Patent and Trademark Office*